(12) United States Patent
Barros et al.

(10) Patent No.: US 12,710,773 B2
(45) Date of Patent: Aug. 18, 2026

(54) FLUID DELIVERY SYSTEM

(71) Applicant: Ichor Systems, Inc., Fremont, CA (US)

(72) Inventors: Philip Ryan Barros, Pleasanton, CA (US); Greg Patrick Mulligan, Milpitas, CA (US); Dustin Tomhave, Sartell, MN (US); Christopher Bryant Davis, Georgetown, TX (US)

(73) Assignee: Ichor Systems, Inc.

( * ) Notice: Subject to any disclaimer, the term of this patent is extended or adjusted under 35 U.S.C. 154(b) by 133 days.

(21) Appl. No.: 18/408,832

(22) Filed: Jan. 10, 2024

(65) Prior Publication Data

US 2024/0183463 A1 Jun. 6, 2024

Related U.S. Application Data

(63) Continuation-in-part of application No. 17/865,553, filed on Jul. 15, 2022, and a continuation-in-part of (Continued)

(51) Int. Cl.

| | |
|---|---|
| ***G05D 7/06*** | (2006.01) |
| ***F16K 11/22*** | (2006.01) |
| ***F16K 27/00*** | (2006.01) |

(52) U.S. Cl.

CPC ............ *G05D 7/0635* (2013.01); *F16K 11/22* (2013.01); *F16K 27/003* (2013.01)

(58) Field of Classification Search

CPC ..... F16K 11/22; F16K 27/003; G05D 7/0635; G05D 7/0641; G05D 7/0647; G05D 7/0652; G05D 7/0658

See application file for complete search history.

(56) References Cited

U.S. PATENT DOCUMENTS 2,666,297 A 1/1954 Skousgaard
3,271,994 A 9/1966 Fournier et al.
(Continued)

FOREIGN PATENT DOCUMENTS

CN 1461429 A 12/2003
CN 1816733 8/2006
(Continued)

OTHER PUBLICATIONS

Ieki, Atsushi, *Design Method of PID Compensator* , International Model Control, English Edition No. 43, May 2015, pp. 49-52.
(Continued)

*Primary Examiner* — David Colon-Morales
(74) *Attorney, Agent, or Firm* — The Belles Group, P.C.

(57) ABSTRACT

Systems for processing articles are essential for semiconductor fabrication. In one embodiment, a system is disclosed comprising a plurality of fluid supplies configured to supply process fluids, a plurality of apparatuses for controlling flow, a plurality of mounting substrates, a vacuum manifold fluidly coupled to the plurality of mounting substrates, an outlet manifold fluidly coupled to the plurality of mounting substrates, a vacuum source fluidly coupled to the vacuum manifold, and a processing chamber fluidly coupled to the outlet manifold. The plurality of apparatuses for controlling flow have a bleed port and an outlet. The outlets of the plurality of apparatuses are fluidly coupled to corresponding outlet ports of the plurality of mounting substrates. The bleed ports of the plurality of apparatuses are fluidly coupled to the corresponding vacuum ports of the plurality of mounting substrates.

7 Claims, 39 Drawing Sheets

Related U.S. Application Data application No. 17/670,723, filed on Feb. 14, 2022, now Pat. No. 11,899,477.

(60) Provisional application No. 63/320,326, filed on Mar. 16, 2022, provisional application No. 63/225,148, filed on Jul. 23, 2021, provisional application No. 63/155,861, filed on Mar. 3, 2021.

(56) References Cited

U.S. PATENT DOCUMENTS 3,335,748 A 8/1967 Klemm et al.
3,453,861 A 7/1969 Levasseur
3,491,946 A 1/1970 Muller
3,504,692 A 4/1970 Goldstein
3,559,482 A 2/1971 Baker et al.
3,570,807 A 3/1971 Sturman et al.
3,807,456 A 4/1974 Colletti
3,814,541 A 6/1974 Dent et al.
3,841,520 A 10/1974 Bryant et al.
3,910,113 A 10/1975 Brown
4,015,626 A 4/1977 Thordarson
4,096,746 A 6/1978 Wilson et al.
4,118,009 A 10/1978 Chmura
4,203,465 A 5/1980 Rissi
4,253,156 A 2/1981 Lisle et al.
4,275,752 A 6/1981 Collier et al.
4,304,263 A 12/1981 Choate
4,315,523 A 2/1982 Mahawili et al.
4,327,757 A 5/1982 Weevers
4,406,161 A 9/1983 Locke et al.
4,462,915 A 7/1984 Friedman
4,527,600 A 7/1985 Fisher et al.
4,576,043 A 3/1986 Nguyen
4,589,440 A 5/1986 Panet
4,718,443 A * 1/1988 Adney .................... G01F 15/02 137/8
4,741,359 A 5/1988 Siebald
4,796,651 A 1/1989 Ginn et al.
4,858,643 A 8/1989 Vavra et al.
4,888,117 A 12/1989 Brown et al.
4,904,285 A 2/1990 Yamada et al.
4,918,995 A 4/1990 Pearman et al.
5,003,810 A 4/1991 Jepson et al.
5,044,199 A 9/1991 Drexel et al.
5,052,363 A 10/1991 Stiles
5,062,446 A 11/1991 Anderson
5,080,131 A 1/1992 Ono et al.
5,100,100 A 3/1992 Benson et al.
5,100,551 A 3/1992 Pall et al.
5,114,447 A 5/1992 Davis et al.
5,123,439 A 6/1992 Powers
5,129,418 A 7/1992 Shimomura et al.
5,152,483 A 10/1992 Maeng
5,159,951 A 11/1992 Ono et al.
5,161,576 A 11/1992 Hekkert et al.
5,187,771 A 2/1993 Uchida
5,187,972 A 2/1993 Defriez
5,190,068 A 3/1993 Philbin
5,259,243 A 11/1993 Drexel et al.
5,280,773 A 1/1994 Becker
5,285,673 A 2/1994 Drexel et al.
5,297,427 A 3/1994 Shambayati
5,305,638 A 4/1994 Saghatchi et al.
5,311,762 A 5/1994 Drexel
5,321,992 A 6/1994 Mudd et al.
5,325,705 A 7/1994 Tom
5,329,966 A 7/1994 Fenimore et al.
5,359,878 A 11/1994 Mudd
5,419,133 A 5/1995 Schneider
5,439,026 A * 8/1995 Moriya ................ G05D 7/0635 137/884
5,445,035 A 8/1995 Delajoud
5,511,585 A 4/1996 Lee
5,542,284 A 8/1996 Layzell et al.
5,549,272 A 8/1996 Kautz
5,583,282 A 12/1996 Tom
5,605,179 A 2/1997 Strong, Jr. et al.
5,624,409 A 4/1997 Seale
5,653,259 A 8/1997 Ramstad
5,660,207 A 8/1997 Mudd
5,669,408 A 9/1997 Nishino et al.
5,711,786 A 1/1998 Hinishaw
5,725,024 A 3/1998 Nimberger
5,730,181 A 3/1998 Doyle et al.
5,762,086 A 6/1998 Ollivier
5,804,717 A 9/1998 Lucas
5,816,285 A 10/1998 Ohmi et al.
5,819,782 A 10/1998 Itafuji
5,865,205 A 2/1999 Wilmer
5,868,159 A 2/1999 Loan et al.
5,904,170 A 5/1999 Harvey et al.
5,911,238 A 6/1999 Bump et al.
5,917,066 A 6/1999 Eisenmann et al.
5,918,616 A 7/1999 Sanfilippo et al.
5,935,418 A 8/1999 Chakrabarty et al.
5,944,048 A 8/1999 Bump et al.
5,970,801 A 10/1999 Ciobanu et al.
5,975,126 A 11/1999 Bump et al.
5,988,211 A 11/1999 Cornell
6,015,590 A 1/2000 Suntola
6,026,834 A 2/2000 Azima
6,026,847 A 2/2000 Reinicke et al.
6,062,246 A 5/2000 Tanaka et al.
6,062,256 A 5/2000 Miller et al.
6,074,691 A 6/2000 Schmitt et al.
6,080,219 A 6/2000 Jha et al.
6,116,269 A 9/2000 Maxson
6,119,710 A 9/2000 Brown
6,125,869 A 10/2000 Horiuchi
6,138,708 A 10/2000 Waldbusser
6,152,162 A 11/2000 Balazy et al.
6,178,995 B1 1/2001 Ohmi et al.
6,209,571 B1 4/2001 Itoh et al.
6,269,692 B1 8/2001 Drexel et al.
6,298,881 B1 10/2001 Curran et al.
6,303,501 B1 10/2001 Chen et al.
6,314,991 B1 11/2001 Gill
6,352,001 B1 3/2002 Wickert et al.
6,374,859 B1 4/2002 Vu et al.
6,422,256 B1 7/2002 Balazy et al.
6,422,264 B2 7/2002 Ohmi et al.
6,425,281 B1 7/2002 Sheriff et al.
6,443,174 B2 9/2002 Mudd
6,520,190 B2 2/2003 Thompson et al.
6,539,968 B1 4/2003 White et al.
6,561,218 B2 5/2003 Mudd
6,564,825 B2 5/2003 Lowery et al.
6,631,334 B2 10/2003 Grosshart
6,642,281 B1 11/2003 Long et al.
6,655,408 B2 12/2003 Linthorst
6,712,084 B2 3/2004 Shajii et al.
6,752,166 B2 6/2004 Lull et al.
6,799,603 B1 10/2004 Moore
6,832,628 B2 12/2004 Thordarson et al.
6,868,862 B2 3/2005 Shajii et al.
6,881,263 B2 4/2005 Lindfors et al.
6,948,508 B2 9/2005 Shajii et al.
7,037,372 B2 5/2006 Lindfors et al.
7,073,392 B2 7/2006 Lull et al.
7,136,767 B2 11/2006 Shajii et al.
7,216,019 B2 5/2007 Tinsley et al.
7,252,032 B2 8/2007 Scheffel et al.
7,314,506 B2 1/2008 Viniski et al.
7,334,602 B2 2/2008 Ahn
7,337,805 B2 3/2008 Brown et al.
7,353,841 B2 4/2008 Kono et al.
7,370,664 B2 5/2008 Glite
7,424,346 B2 9/2008 Shajii et al.
7,431,045 B2 10/2008 Mudd et al.
7,474,968 B2 1/2009 Ding et al.
7,552,015 B2 6/2009 Shajii et al.
7,615,120 B2 11/2009 Shajii et al.
7,628,861 B2 12/2009 Clark

(56) References Cited

U.S. PATENT DOCUMENTS 7,662,233 B2 2/2010 Sneh
7,680,399 B2 3/2010 Buchanan et al.
7,682,946 B2 3/2010 Ma et al.
7,693,606 B2 4/2010 Ahmad et al.
7,706,925 B2 4/2010 Ding et al.
7,717,061 B2 5/2010 Ishizaka et al.
7,757,554 B2 7/2010 Ding et al.
7,784,496 B2 8/2010 Taskar
7,809,473 B2 10/2010 Shajii et al.
7,826,986 B2 11/2010 McDonald
7,850,779 B2 12/2010 Ma et al.
7,874,208 B2 1/2011 Redemann et al.
7,881,829 B2 2/2011 Yoneda et al.
7,891,228 B2 2/2011 Ding et al.
7,905,139 B2 3/2011 Lull
7,918,238 B2 4/2011 Tanaka et al.
7,922,150 B2 4/2011 Cripps et al.
7,974,544 B2 7/2011 Kobayashi
7,979,165 B2 7/2011 Gotoh et al.
8,019,481 B2 9/2011 Yamaguchi et al.
8,100,382 B2 1/2012 Robertson, III et al.
8,104,323 B2 1/2012 Yasuda
8,104,516 B2 * 1/2012 Moriya .................... F17D 1/04 137/884
8,112,182 B2 2/2012 Tokuhisa et al.
8,183,781 B2 5/2012 Sangam
8,201,989 B2 6/2012 Itoh et al.
8,205,629 B2 6/2012 Gregor et al.
8,265,795 B2 9/2012 Takahashi et al.
8,282,992 B2 10/2012 Myo et al.
8,291,857 B2 10/2012 Lam et al.
8,293,015 B2 10/2012 Lam et al.
8,340,827 B2 12/2012 Yun et al.
8,343,258 B2 1/2013 Guan
8,343,279 B2 1/2013 Myo et al.
8,356,623 B2 1/2013 Isobe et al.
8,376,312 B2 2/2013 Mudd et al.
8,382,897 B2 2/2013 Sangam
8,408,245 B2 4/2013 Feldman et al.
8,443,649 B2 5/2013 Yasuda et al.
8,460,753 B2 6/2013 Xiao et al.
8,504,318 B2 8/2013 Mendelson et al.
8,505,478 B2 8/2013 Suekane et al.
8,511,337 B2 8/2013 Nishimura
8,573,247 B2 * 11/2013 Ushigusa ............ G05D 7/0647 138/44
8,744,784 B2 6/2014 Yasuda et al.
8,746,057 B2 6/2014 Yasuda et al.
8,770,215 B1 * 7/2014 Mudd ...................... F17D 1/20 137/487
8,789,556 B2 7/2014 Yasuda et al.
8,793,082 B2 7/2014 Ding et al.
8,800,589 B2 8/2014 Minami et al.
8,851,105 B2 10/2014 Kashima et al.
8,910,656 B2 12/2014 Yasuda
8,915,262 B2 12/2014 Smirnov
8,985,152 B2 3/2015 Chandrasekharan et al.
9,027,585 B2 5/2015 Smirnov
9,081,388 B2 7/2015 Tanaka et al.
9,169,940 B2 10/2015 Yogo et al.
9,188,989 B1 * 11/2015 Mudd .................... F16K 47/08
9,207,139 B2 12/2015 Jones et al.
9,223,318 B2 12/2015 Takeuchi et al.
9,335,768 B2 5/2016 Taskar et al.
9,690,301 B2 * 6/2017 Mudd ................. G05D 7/0635
9,940,004 B2 4/2018 Mayworm
9,958,302 B2 * 5/2018 Mudd ...................... G01F 1/88
10,303,189 B2 * 5/2019 Mudd ................. G05D 7/0682
10,663,072 B2 5/2020 Birtcher et al.
10,782,165 B2 * 9/2020 Mudd .................. G01F 15/002
10,782,710 B2 * 9/2020 Mudd ................. G05D 7/0682
10,801,867 B2 10/2020 Ding
10,838,437 B2 11/2020 Penley et al.
11,003,198 B2 * 5/2021 Mudd ................. G05D 7/0641
11,899,477 B2 * 2/2024 Barros ................ G05D 7/0658
2001/0013363 A1 8/2001 Kitayama et al.
2002/0002996 A1 1/2002 Mudd
2002/0014206 A1 2/2002 Mudd
2002/0046612 A1 4/2002 Mudd
2002/0095225 A1 7/2002 Huang et al.
2004/0007180 A1 1/2004 Yamasaki et al.
2004/0083807 A1 5/2004 Mudd et al.
2004/0194830 A1 10/2004 Honeyman et al.
2005/0056211 A1 3/2005 Lindfors et al.
2005/0087299 A1 4/2005 Okabe et al.
2005/0098906 A1 5/2005 Satoh et al.
2005/0284529 A1 12/2005 Iwabuchi
2006/0005883 A1 1/2006 Mudd et al.
2006/0037644 A1 2/2006 Nishikawa et al.
2006/0060139 A1 3/2006 Meneghini et al.
2006/0060253 A1 3/2006 Yoshida et al.
2006/0124173 A1 6/2006 An
2006/0130755 A1 6/2006 Clark
2006/0185746 A1 * 8/2006 Doyle ................ F15B 13/0896 137/884
2007/0089789 A1 4/2007 Mudd et al.
2007/0110636 A1 5/2007 Lee et al.
2007/0227659 A1 10/2007 Iizuka
2008/0012292 A1 1/2008 Bennett
2008/0041481 A1 2/2008 Mudd et al.
2008/0302434 A1 12/2008 Taskar
2008/0305014 A1 12/2008 Honda
2009/0101217 A1 4/2009 Ushigusa et al.
2010/0005904 A1 1/2010 Igarashi
2010/0110399 A1 5/2010 Lyons
2010/0138051 A1 6/2010 Glime
2010/0154895 A1 6/2010 Igarashi
2010/0163135 A1 7/2010 Safronovs
2010/0224264 A1 9/2010 Homan et al.
2010/0269924 A1 10/2010 Yasuda
2011/0108126 A1 5/2011 Monkowski et al.
2012/0116596 A1 5/2012 Yoneda et al.
2012/0132291 A1 5/2012 Monkowski et al.
2012/0180876 A1 7/2012 Hayashi et al.
2012/0318383 A1 12/2012 Yasuda et al.
2013/0092256 A1 4/2013 Yasuda et al.
2013/0092258 A1 4/2013 Yasuda et al.
2013/0118596 A1 5/2013 Horsky
2013/0186499 A1 7/2013 Yada et al.
2014/0034164 A1 2/2014 Yasuda
2014/0069527 A1 3/2014 Mudd et al.
2014/0083514 A1 3/2014 Ding
2014/0137519 A1 5/2014 Goodwin et al.
2014/0158211 A1 6/2014 Ding et al.
2014/0182689 A1 7/2014 Shareef et al.
2014/0182692 A1 7/2014 Hirata et al.
2014/0190578 A1 7/2014 Hayashi
2014/0230915 A1 * 8/2014 Mudd ................. G05D 7/0647 137/15.08
2014/0260963 A1 9/2014 Wang
2015/0007897 A1 1/2015 Valentine et al.
2015/0027558 A1 1/2015 Kehoe et al.
2015/0047738 A1 2/2015 Wilson et al.
2015/0121988 A1 5/2015 Banares et al.
2015/0212524 A1 7/2015 Kehoe et al.
2015/0362391 A1 12/2015 Suzuki et al.
2016/0011604 A1 1/2016 Mudd et al.
2016/0018828 A1 * 1/2016 Mudd .................... G05B 15/02 700/282
2016/0041564 A1 * 2/2016 Mudd ................. G05D 7/0641 700/275
2016/0124439 A1 5/2016 Yasuda et al.
2016/0334027 A1 11/2016 Garvey et al.
2017/0082076 A1 3/2017 Ge
2019/0243393 A1 8/2019 Mudd
2019/0390811 A1 12/2019 Shibata et al.
2020/0258764 A1 * 8/2020 Penley ................. B05B 1/3013
2020/0400470 A1 12/2020 Mudd et al.

FOREIGN PATENT DOCUMENTS

CN 102096420 A1 6/2011
CN 101256935 8/2011

(56) References Cited

FOREIGN PATENT DOCUMENTS

| | | | | |
|---|---|---|---|---|
| CN | 102354228 | | 2/2012 | |
| CN | 103838261 | | 6/2014 | |
| DE | 69535683 | | 1/2009 | |
| EP | 0468793 | | 1/1992 | |
| EP | 0671484 | | 9/1995 | |
| EP | 0689040 | | 12/1995 | |
| JP | H06163425 | A | 6/1994 | |
| JP | 11119835 | | 4/1999 | |
| JP | H11223538 | | 8/1999 | |
| JP | 2000018407 | | 1/2000 | |
| JP | 3442604 | | 9/2003 | |
| JP | 2004157719 | | 6/2004 | |
| JP | 2004-183743 | A | 7/2004 | |
| JP | 2004302914 | | 10/2004 | |
| JP | 2006-521522 | A | 9/2006 | |
| JP | 2007041870 | | 2/2007 | |
| JP | 4137666 | | 8/2008 | |
| JP | 4146746 | | 9/2008 | |
| JP | 4173519 | | 10/2008 | |
| JP | 2009079667 | | 4/2009 | |
| JP | 4351495 | | 10/2009 | |
| JP | 2009300403 | | 12/2009 | |
| JP | 4572139 | | 10/2010 | |
| JP | 4589846 | | 12/2010 | |
| JP | 4700095 | B2 | 6/2011 | |
| JP | 4705140 | | 6/2011 | |
| JP | 2011171337 | | 9/2011 | |
| JP | 4974000 | | 7/2012 | |
| JP | 5090559 | | 12/2012 | |
| JP | 5091821 | | 12/2012 | |
| JP | 2016035462 | | 3/2016 | |
| TW | 200846860 | | 12/2008 | |
| TW | 201414990 | | 4/2014 | |
| TW | 201631429 | | 9/2016 | |
| TW | 201718934 | | 6/2017 | |
| TW | 201843712 | A | 12/2018 | |
| WO | WO8700267 | | 1/1987 | |
| WO | WO2003081361 | | 10/2003 | |
| WO | WO200401516 | | 12/2003 | |
| WO | WO2005114016 | A1 | 1/2005 | |
| WO | WO2011040409 | | 4/2011 | |
| WO | WO2014/152755 | A2 | 9/2014 | |
| WO | WO-2020214616 | A1 * | 10/2020 | ....... H01L 21/67253 |

OTHER PUBLICATIONS

Couturier, Pierre, *Optimising the Control Parameters in a Digital Mass Flow Controller* , LG12P Research Center, Print date Sep. 2, 2016, pp. 1-6.

International Search Report PCT/US2022/16286 Issued Jul. 8, 2022.

International Search Report PCT/US2022/37269 Issued Oct. 13, 2022.

McDonald, Mike R., Beyond Pressure Transients: Using Pressure-Insentive Mass Flow Controllers to Control Gases in Semiconductor Manufacturing, Semiconductor Manufacturing, vol. 7, Issue 3, Mar. 2006, pp. 1-5.

Examination Report issued for Corresponding Indian Patent Application No. 202317060282; Issued on Mar. 13, 2025.

Examination Report issued for Corresponding Taiwan Patent Application No. 113146710; Issued on Aug. 8, 2025.

* cited by examiner 322
320
326
335
333
322
332
328
325
334
332
327

333
320
326
328
327
324
324
335
334
332
325

320
325
322
327
322
322
322
322

FLUID DELIVERY SYSTEM

CROSS-REFERENCE TO RELATED APPLICATIONS

This application is 1) a continuation in part of U.S. patent application Ser. No. 17/670,723, filed on Feb. 14, 2022, which claims the benefit of U.S. Provisional Application 63/155,861, filed Mar. 3, 2021; and 2) a continuation in part of U.S. patent application Ser. No. 17/865,553, filed on Jul. 15, 2023, which claims the benefit of U.S. Provisional Application 63/320,326, filed Mar. 16, 2022, and U.S. Provisional Application 63/225,148, filed Jul. 23, 2021, which are incorporated herein by reference in their entireties.

BACKGROUND OF THE INVENTION

Mass flow control has been one of the key technologies used in semiconductor chip fabrication. Apparatuses for controlling mass flow are important for delivering known flow rates of process gases and liquids for semiconductor fabrication and other industrial processes. Such devices are used to measure and accurately control the flow of fluids for a variety of applications. In a given fabrication tool, a variety of liquids and gases might be required. As a result, efficient gas and liquid handling is essential to modern semiconductor fabrication equipment.

As the technology of chip fabrication has improved, so has the demand on the apparatuses for controlling flow. Semiconductor fabrication processes increasingly require increased performance, a greater range of flow capability, more process gases and liquids, and more compact installation of the necessary equipment. Improved gas and liquid handling for a variety of flow apparatuses is desirable to deliver enhanced performance in reduced space and at a reduced cost.

SUMMARY OF THE INVENTION

The present technology is directed to systems for processing articles such as semiconductors. In other embodiments, the present technology is directed to systems for controlling process fluids. In yet other embodiments, the present technology is directed to systems for transporting process fluids. In other embodiments, the present technology is directed to apparatuses for controlling flow of process fluids. The present systems and manifold assemblies may be used in a wide range of processes such as semiconductor chip fabrication, solar panel fabrication, etc.

In one implementation, the invention is a system for processing articles. The system has a first fluid supply configured to supply a first process fluid and a second fluid supply configured to supply a second process fluid. The system has a first apparatus for controlling flow, the first apparatus having an inlet, an outlet, and a bleed port, the inlet of the first apparatus fluidly coupled to the first fluid supply. The system has a second apparatus for controlling flow, the second apparatus having an inlet, an outlet, and a bleed port, the inlet of the second apparatus fluidly coupled to the second fluid supply. The apparatus has first and second mounting substrates, the first mounting substrate having a first vacuum port and a first outlet port, the first apparatus for controlling flow attached to the first mounting substrate such that the bleed port of the first apparatus for controlling flow is fluidly coupled to the first vacuum port and the outlet of the first apparatus for controlling flow is fluidly coupled to the first outlet port. The second mounting substrate has a second vacuum port and a second outlet port, the second apparatus for controlling flow attached to the second mounting substrate such that the bleed port of the second apparatus for controlling flow is fluidly coupled to the second vacuum port and the outlet of the second apparatus for controlling flow is fluidly coupled to the second outlet port. The system has a vacuum manifold fluidly coupled to the first and second vacuum ports, an outlet manifold fluidly coupled to the first and second outlet ports, a vacuum source fluidly coupled to the vacuum manifold, and a processing chamber fluidly coupled to the outlet manifold.

In another implementation, the invention is a system for controlling process fluids. The system has a first apparatus for controlling flow, the first apparatus having an inlet, an outlet, and a bleed port, the inlet of the first apparatus configured to receive a first process fluid. The system has a second apparatus for controlling flow, the second apparatus having an inlet, an outlet, and a bleed port, the inlet of the second apparatus configured to receive a second process fluid. The apparatus has first and second mounting substrates, the first mounting substrate having a first vacuum port and a first outlet port, the first apparatus for controlling flow attached to the first mounting substrate such that the bleed port of the first apparatus for controlling flow is fluidly coupled to the first vacuum port and the outlet of the first apparatus for controlling flow is fluidly coupled to the first outlet port. The second mounting substrate has a second vacuum port and a second outlet port, the second apparatus for controlling flow attached to the second mounting substrate such that the bleed port of the second apparatus for controlling flow is fluidly coupled to the second vacuum port and the outlet of the second apparatus for controlling flow is fluidly coupled to the second outlet port. The system has a vacuum manifold fluidly coupled to the first and second vacuum ports and an outlet manifold fluidly coupled to the first and second outlet ports.

In yet a further implementation, the invention is a system for transporting process fluids. The system has a plurality of mounting substrates, each mounting substrate having a vacuum port and an outlet port. The system has a vacuum manifold fluidly coupled to the vacuum ports of the plurality of mounting substrates. The system also has an outlet manifold fluidly coupled to the outlet ports of the plurality of mounting substrates. The vacuum manifold has a plurality of primary channels extending along a first longitudinal axis and a plurality of feed channels, the vacuum ports of the plurality of mounting substrates fluidly coupled to the plurality of primary channels via the plurality of feed channels. The outlet manifold has a plurality of primary channels extending along a second longitudinal axis, the first and second longitudinal axes being parallel.

In another implementation, the invention is an apparatus for controlling flow of a process fluid. The apparatus has an inlet, an outlet, a bleed port, a flow path extending from the inlet to the outlet, a first valve, a flow restrictor, a second valve, and a mounting portion. The first valve is operably coupled to the flow path and located between the inlet and the outlet, the first valve configured to control flow of a process fluid in the flow path. The flow restrictor has a flow impedance and is operably coupled to the flow path and located between the inlet and the outlet. The second valve is operably coupled to the flow path and located between the inlet and the outlet, the second valve configured to control flow of the process fluid from the flow path to the bleed port. The mounting portion comprises the outlet and the bleed port.

In yet another implementation, the invention is a method of manufacturing articles. The method involves providing a first apparatus for controlling flow of a first process fluid, the first apparatus for controlling flow having a mounting portion. The method further involves providing a first mounting substrate having a surface, the surface having an outlet port and a vacuum port, the outlet port fluidly coupled to an outlet manifold and the vacuum port fluidly coupled to a vacuum manifold. The mounting portion of the first apparatus for controlling flow is secured to the surface of the first mounting substrate. The outlet manifold is fluidly coupled to a processing chamber, and the vacuum manifold is fluidly coupled to a vacuum source. The first process fluid is supplied to the first apparatus for controlling flow. The first process fluid is flowed through the first apparatus for controlling flow. The first process fluid is delivered from the first apparatus for controlling flow to the vacuum port of the first mounting substrate. The first process fluid is discharged through the vacuum manifold to the vacuum source. The first process fluid is delivered from the first apparatus for controlling flow to the outlet port on the first mounting substrate. Finally, a process is performed on an article within the processing chamber.

In one implementation, the invention is a fluid delivery module. The fluid delivery module has a support structure and a substrate block mounted to the support structure. The substrate block has a monolithic body, a component receiving port formed in the monolithic body. The substrate block further has a first fluid pathway formed in the monolithic body and extending from a first inlet opening to a first outlet opening at the component receiving port. A second fluid pathway is formed in the monolithic body and extends from a second inlet opening at the component receiving port to a second outlet opening. A filter media positioned within the second fluid pathway divides the second fluid pathway into a pre-filter section and a post-filter section. A first active flow component is mounted on the monolithic body of the substrate block at the component receiving port and fluidly coupled to each of the first outlet opening and the second inlet opening.

In another implementation, the invention is a fluid delivery module. The fluid delivery module has a substrate block. The substrate block has a monolithic body, a component receiving port formed in the monolithic body. The substrate block further has a first fluid pathway formed in the monolithic body and extending from a first inlet opening to a first outlet opening at the component receiving port. A second fluid pathway is formed in the monolithic body and extends from a second inlet opening at the component receiving port to a second outlet opening. A filter media is positioned within the second fluid pathway, the filter media dividing the second fluid pathway into a pre-filter section and a post-filter section. A first active flow component is mounted on the monolithic body of the substrate block at the component receiving port and fluidly coupled to each of the first outlet opening and the second inlet opening.

In yet another implementation, the invention is a system for processing semiconductor wafers. The system includes a fluid source and the fluid delivery module disclosed above, the first inlet opening of the fluid delivery module fluidly coupled to the fluid source. The system further includes a process chamber fluidly coupled to the fluid delivery module to receive outgoing fluid from the fluid delivery module.

In an alternate implementation, the invention is a method of manufacturing semiconductor chips. First, one or more semiconductor wafers are supported in a process chamber. Second, fluid is supplied to the process chamber using the fluid delivery module disclosed above. Third, one or more semiconductor wafers are contacted with the fluid to perform a processing step.

Further areas of applicability of the present technology will become apparent from the detailed description provided hereinafter. It should be understood that the detailed description and specific examples, while indicating the preferred implementation, are intended for purposes of illustration only and are not intended to limit the scope of the technology.

BRIEF DESCRIPTION OF THE DRAWINGS

The invention of the present disclosure will become more fully understood from the detailed description and the accompanying drawings, wherein.

Figure 1:
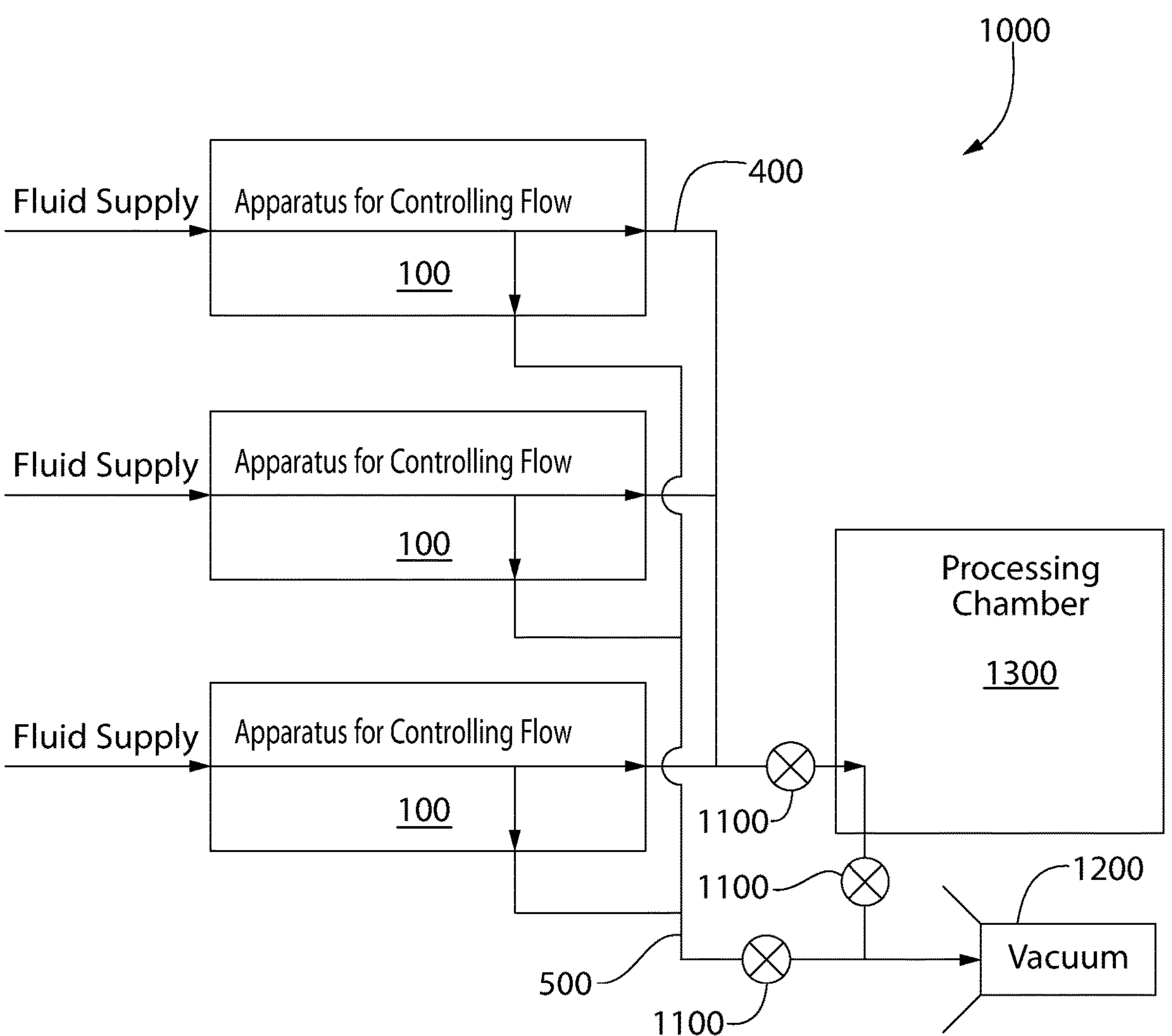
FIG. 1 is a schematic of a system for manufacturing semiconductor devices utilizing one or more apparatuses for controlling flow.

All drawings are schematic and not necessarily to scale. Features shown numbered in certain figures which may appear un-numbered in other figures are the same features unless noted otherwise herein.

DETAILED DESCRIPTION

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "left," "right," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combinations of features that may exist alone or in other combinations of features; the scope of the invention being defined by the claims appended hereto.

The disclosure is divided into two sections. Section I discusses systems for handling a plurality of gas flows. Section II discusses systems which increase packaging density. Different embodiments disclosed in the respective sections can be used together as part of a gas delivery apparatus, method, or system. To the extent a term, reference number, or symbol is used differently in different sections, context should be taken from the relevant section and not the other sections.

Section I

The present invention is directed to systems for processing articles, these systems having apparatuses for controlling fluid flow. In some embodiments, the apparatus may function as a mass flow controller to deliver a known mass flow of gas or liquid to a semiconductor or similar process. Semiconductor fabrication is one industry which demands high performance in control of fluid flows. As semiconductor fabrication techniques have advanced, customers have recognized the need for flow control devices with increased accuracy and repeatability in the mass of the delivered fluid flows. In addition, flow control devices have increased in complexity, utilizing more sophisticated arrangements that require delivery and removal of a variety of process fluids. The present systems enable rapid assembly and maintenance of systems for processing articles by utilizing standardized manifold configurations.

FIG. 1 shows a schematic of an exemplary processing system 1000 for processing articles. The processing system 1000 may utilize a plurality of apparatus for controlling flow 100 fluidly coupled to a processing chamber 1300. The plurality of apparatus for controlling flow 100 are used to supply one or more different process fluids to the processing chamber 1300 via an outlet manifold 400. Articles such as semiconductors may be processed within the processing chamber 1300. A valve 1100 isolates the apparatuses for controlling flow 100 from the processing chamber 1300, enabling the apparatuses for controlling flow 100 to be selectively connected or isolated from the processing chamber 1300. The processing chamber 1300 may contain one or more applicators to apply process fluids delivered by the plurality of apparatus for controlling flow 100, enabling selective or diffuse distribution of the fluid supplied by the plurality of apparatus for controlling flow 100. In addition, the processing system 1000 may further comprise a vacuum source 1200 which is isolated from the processing chamber 1300 by a valve 1100 to enable evacuation of process fluids or facilitate purging one or more of the apparatus for controlling flow 100 to enable switching between process fluids in the same apparatus for controlling flow 100. Each of the apparatuses for controlling flow 100 may have a separate bleed port which is coupled to a vacuum manifold 500, the vacuum manifold connected to the vacuum source 1200 via a valve 1100. Optionally, the apparatuses for controlling flow 100 may be mass flow controllers, flow splitters, or any other device which controls the flow of a process fluid in a processing system. Furthermore, valves 1100 may be integrated into the apparatus for controlling flow 100 if so desired. In some implementations this may eliminate the need for certain other valves 1100 in the processing system 1000.

Processes that may be performed in the processing system 1000 may include wet cleaning, photolithography, ion implantation, dry etching, atomic layer etching, wet etching, plasma ashing, rapid thermal annealing, furnace annealing, thermal oxidation, chemical vapor deposition, atomic layer deposition, physical vapor deposition, molecular beam epitaxy, laser lift-off, electrochemical deposition, chemical-mechanical polishing, wafer testing, or any other process utilizing controlled volumes of a process fluid.

Figure 2:
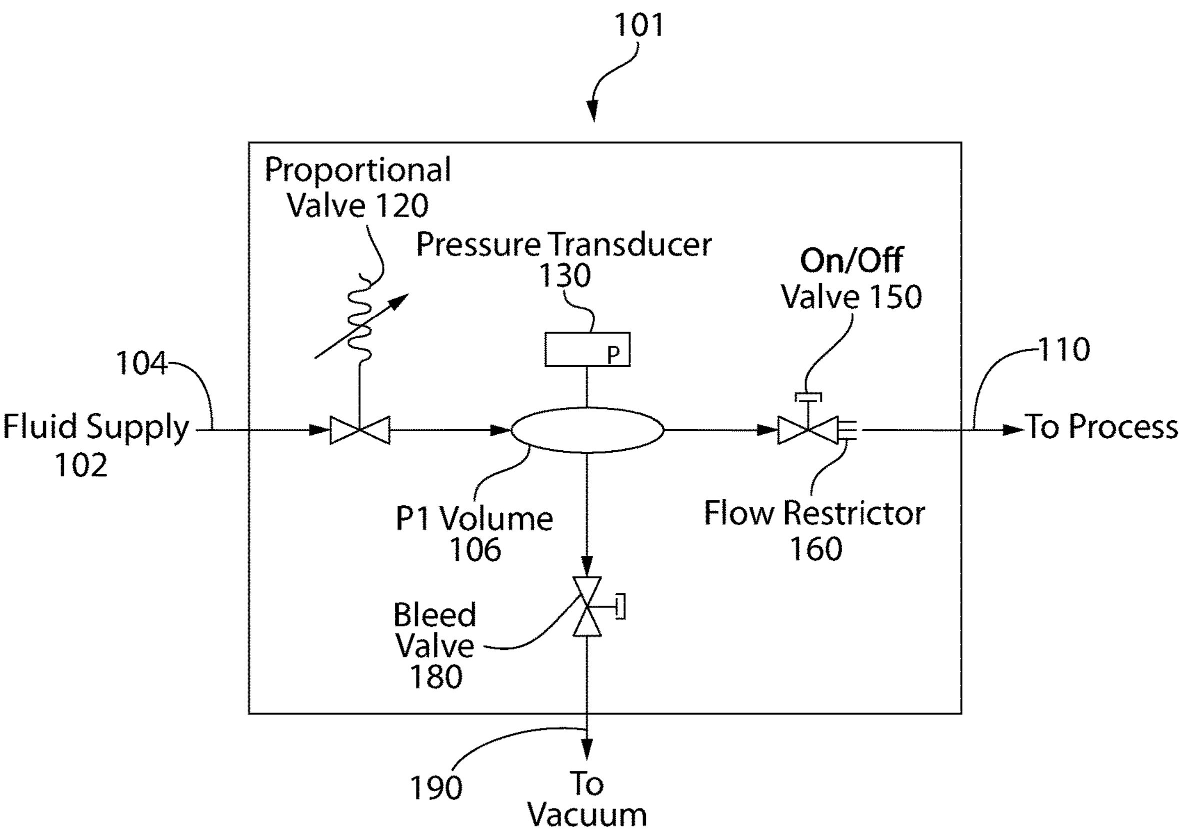
FIG. 2 is a schematic of a mass flow controller, the mass flow controller being one of the apparatuses for controlling flow as may be utilized in the process of FIG. 1.

FIG. 2 shows a schematic of an exemplary mass flow controller 101, which is one type of apparatus for controlling flow 100 that may be utilized in the processing system 1000. The mass flow controller 101 has a fluid supply 102 of a process fluid fluidly coupled to an inlet 104. The inlet 104 is fluidly coupled to a proportional valve 120 which is capable of varying the mass and volume of process fluid flowing through the proportional valve 120. The proportional valve 120 meters the mass flow of process fluid which passes to a P1 volume 106. The proportional valve 120 is capable of providing proportional control of the process fluid such that it need not be fully open or closed, but instead may have intermediate states to permit control of the mass flow rate of process fluid.

The P1 volume 106 is fluidly coupled to the proportional valve 120, the P1 volume 106 being the sum of all the volume within the mass flow controller 101 between the proportional valve 120 and a flow restrictor 160. A pressure transducer 130 is fluidly coupled to the P1 volume 106 to enable measurement of the pressure within the P1 volume 106. A shutoff valve 150 is located between the flow restrictor 160 and the proportional valve 120 and may be used to completely halt flow of the process fluid out of the P1 volume 106. Optionally, the flow restrictor 160 may be located between the shutoff valve 150 and the proportional valve 120 in an alternate configuration. The flow restrictor 160 is fluidly coupled to an outlet 110 of the mass flow controller 101. In the processing system, the outlet 110 is fluidly coupled to a valve 1100 or directly to the processing chamber 1300. In the present embodiment, the flow restrictor 160 is located between the shutoff valve 150 and the outlet 110. In an alternate embodiment, the shutoff valve 150 is located between the flow restrictor 160 and the outlet 110. Thus, the arrangement of the shutoff valve 150 and the flow restrictor 160 may be reversed. Finally, a bleed valve 180 is coupled to the P1 volume 106 and to a bleed port 190. The bleed valve 180 may be a proportional valve, on/off valve, or any other type of valve suitable for controlling fluid flow. Optionally, a second flow restrictor may be incorporated between the P1 volume and the bleed port 190.

Internal to the first shutoff valve 150 is a valve seat and a closure member. When the apparatus 100 is delivering process fluid, the first shutoff valve 150 is in an open state, such that the valve seat and the closure member are not in contact. This permits flow of the process fluid and provides a negligible restriction to fluid flow. When the first shutoff valve 150 is in a closed state the closure member and the valve seat are biased into contact by a spring, stopping the flow of process fluid through the first shutoff valve 150.

The flow restrictor 160 is used, in combination with the proportional valve 120, to meter flow of the process fluid. In most embodiments, the flow restrictor 160 provides a known restriction to fluid flow. The first characterized flow restrictor 160 may be selected to have a specific flow impedance so as to deliver a desired range of mass flow rates of a given process fluid. The flow restrictor 160 has a greater resistance to flow than the passages upstream and downstream of the flow restrictor 160.

Optionally, the mass flow controller 101 comprises one or more P2 pressure transducers downstream of the flow restrictor 160 and the shutoff valve 150. The P2 pressure transducer is used to measure the pressure differential across the flow restrictor 160. In some embodiments, the P2 pressure downstream of the flow restrictor 160 may be obtained from another apparatus 100 connected to the processing chamber, with the readings communicated to the mass flow controller 101.

Optionally, temperature sensors may be employed to further enhance the accuracy of the mass flow controller 101. They may be mounted in the base of the mass flow controller 101 near the P1 volume 106. Additional temperature sensors may be employed in a variety of locations, including adjacent the proportional valve 120, the pressure transducer 130, the shutoff valve 150, and the bleed valve 180.

Figure 3:
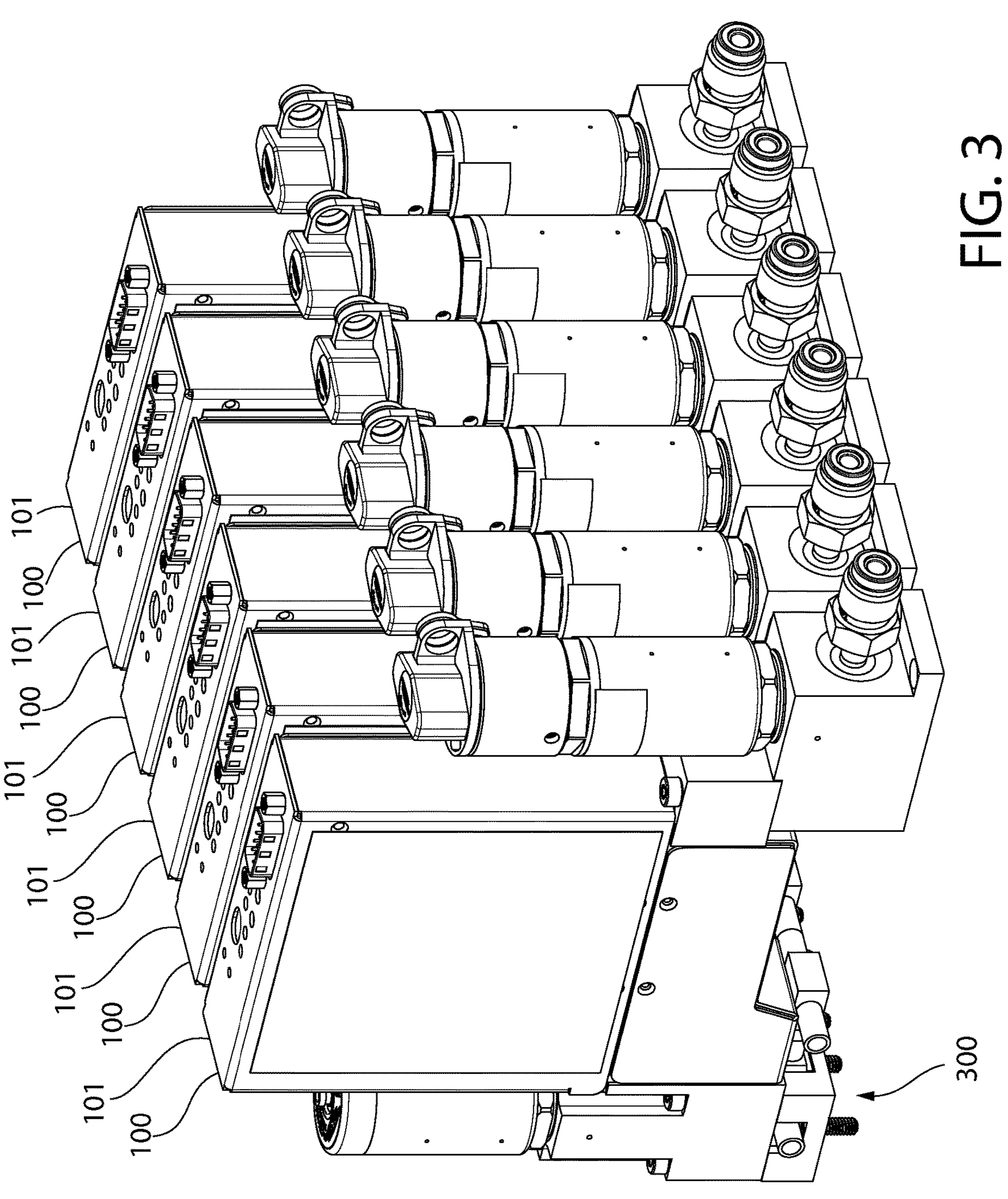
FIG. 3 is a perspective view of a plurality of apparatuses for controlling flow and a manifold system as may be utilized in the system of FIG. 1.
Figure 4:
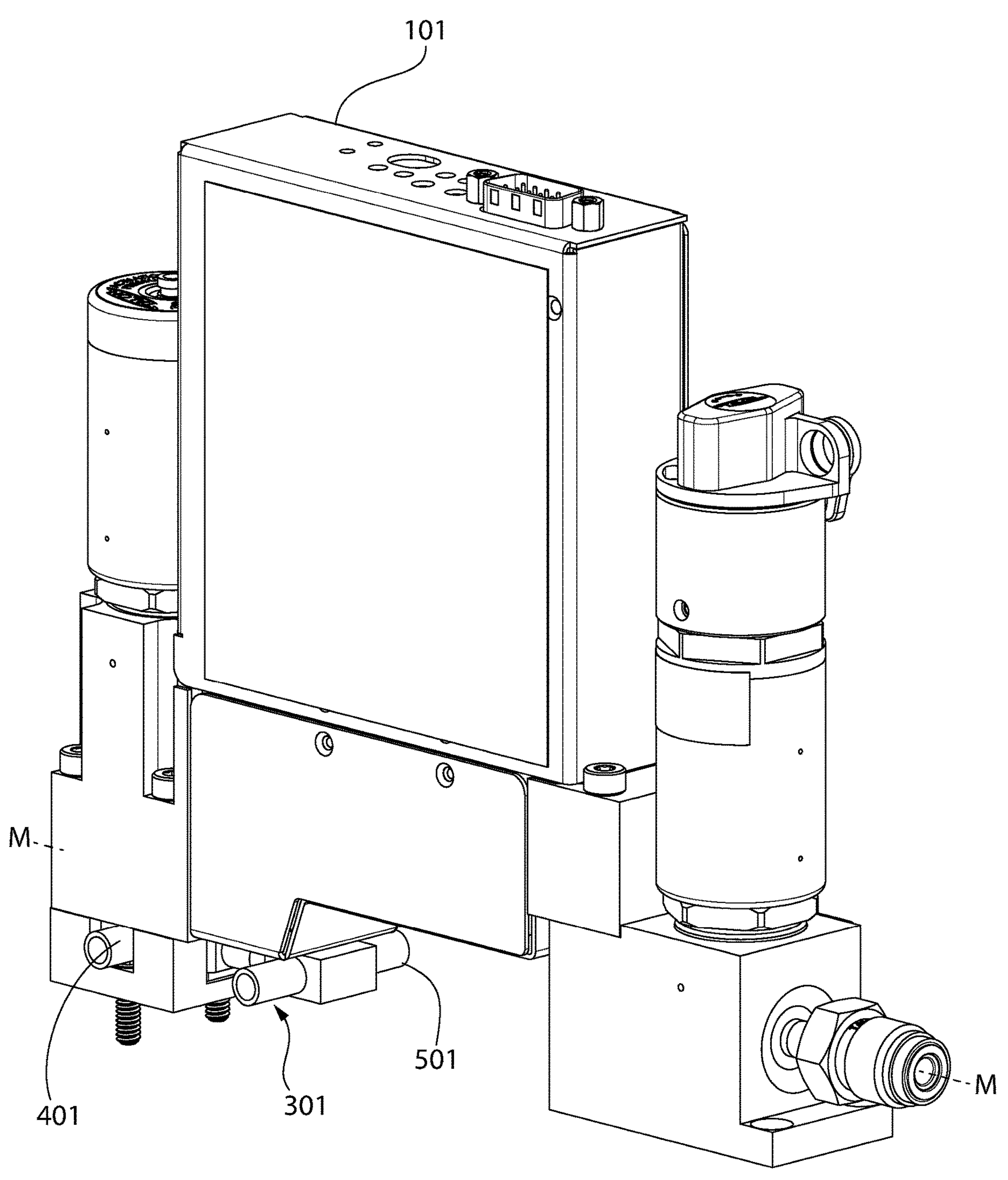
FIG. 4 is a perspective view of a mass flow controller and a portion of the manifold system, the mass flow controller being one of the apparatuses for controlling flow as may be utilized in the system of FIG. 1.
Figure 5:
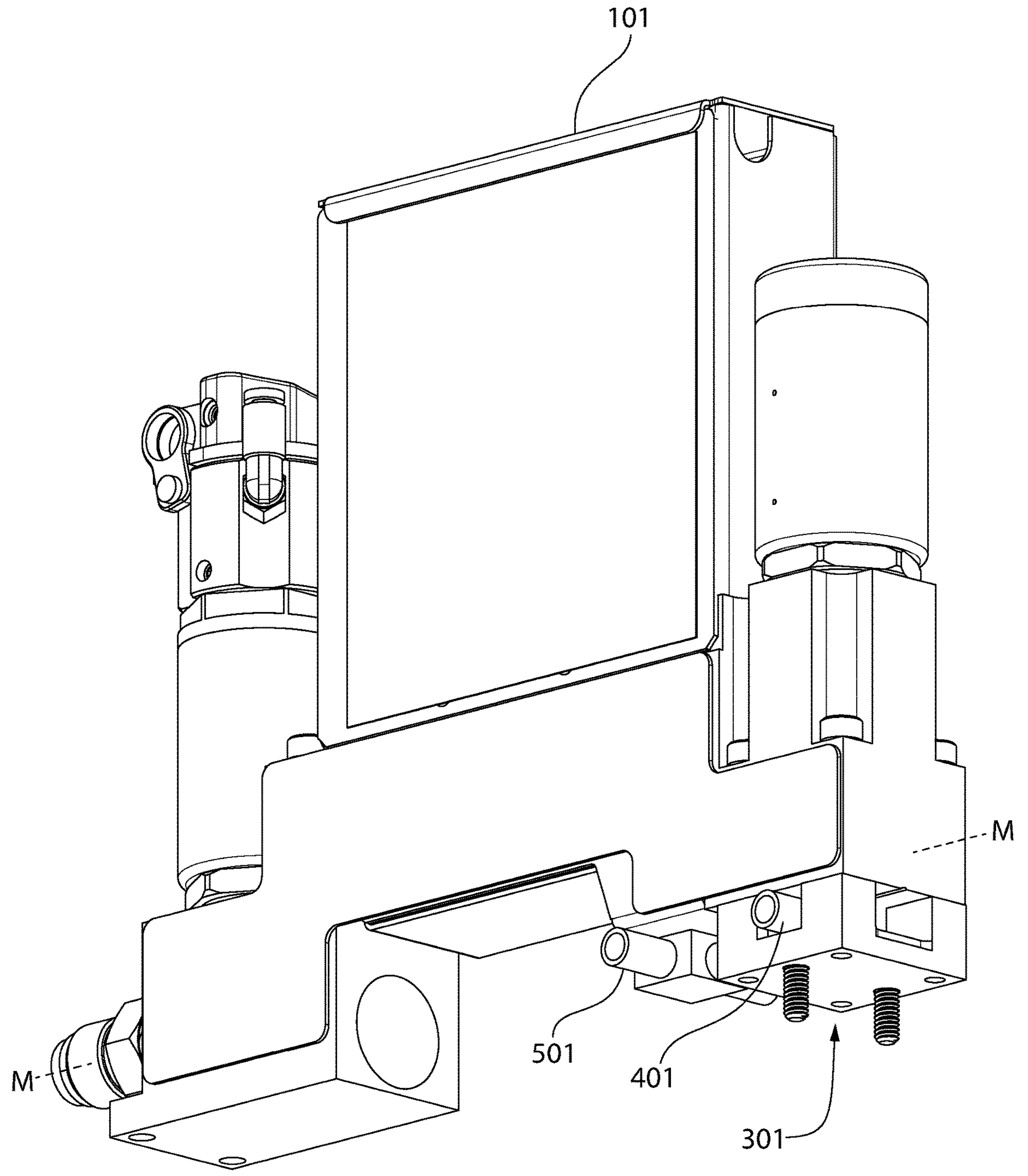
FIG. 5 is a lower perspective view of the mass flow controller and the portion of the manifold system of FIG. 4.
Figure 6:
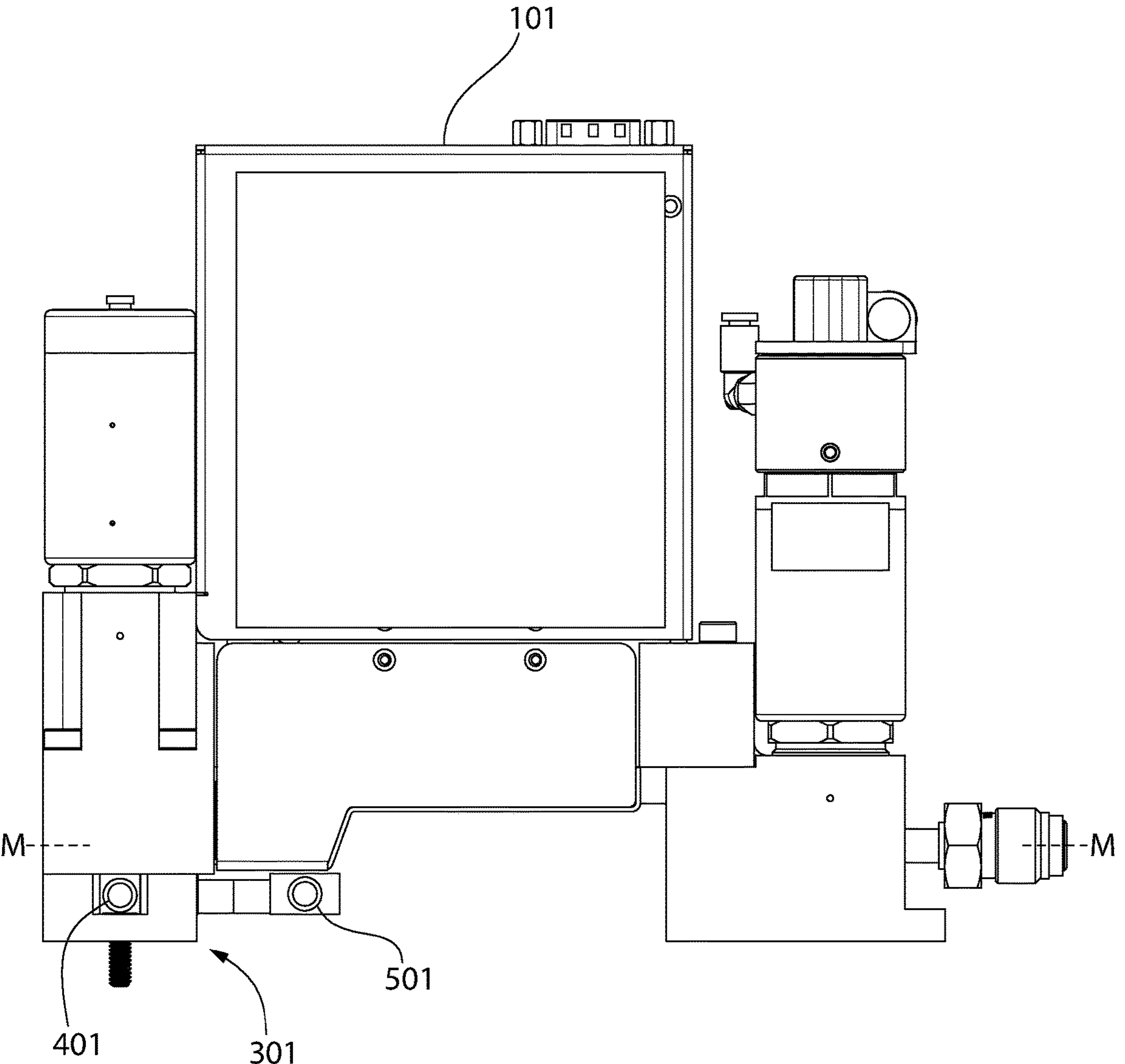
FIG. 6 is a left side view of the mass flow controller and the portion of the manifold system of FIG. 4.
Figure 7:
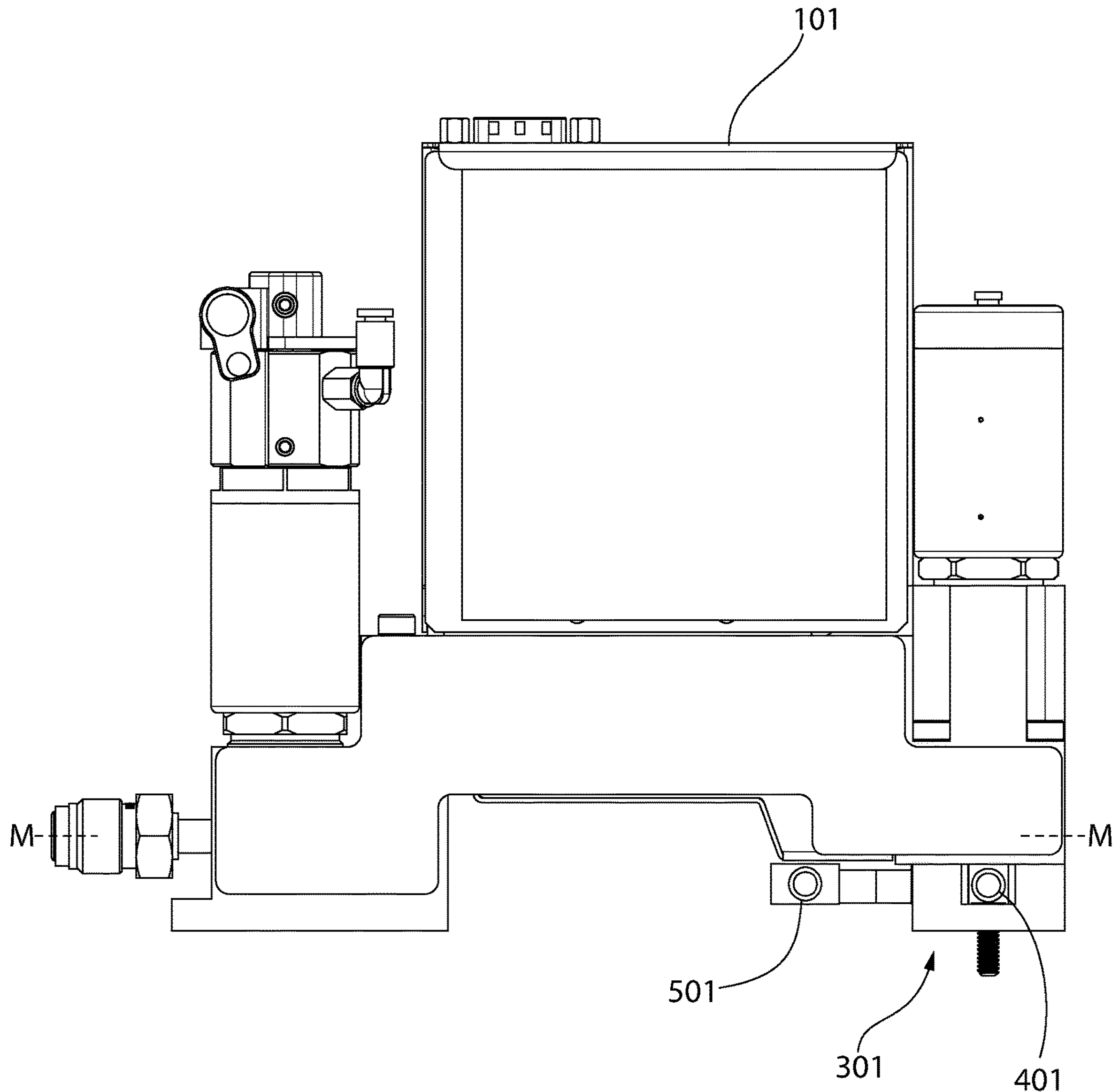
FIG. 7 is a right side view of the mass flow controller and the portion of the manifold system of FIG. 4.
Figure 8:
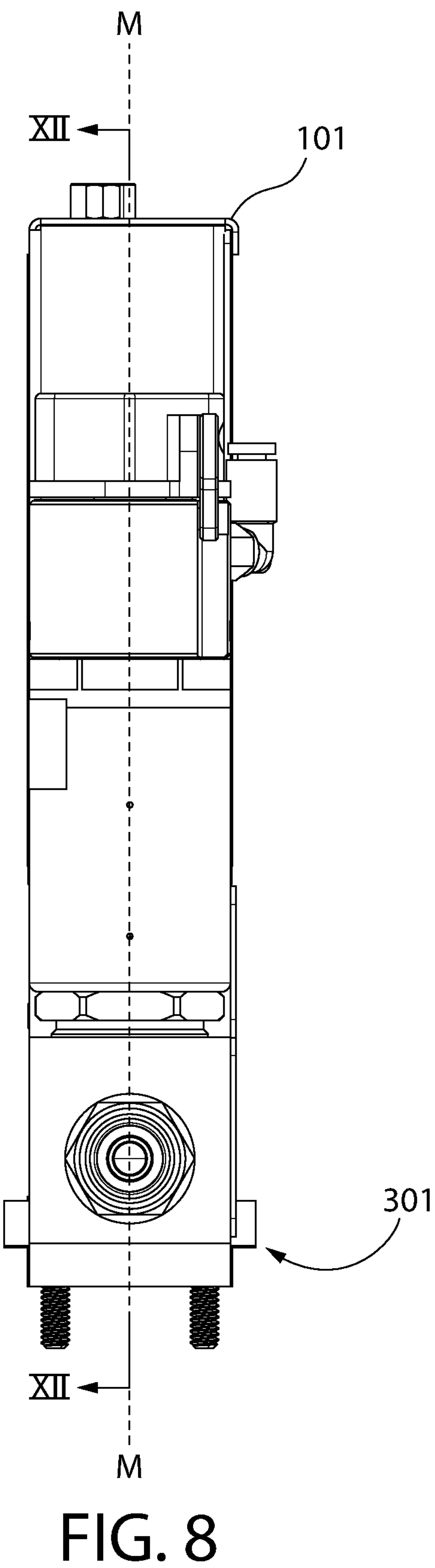
FIG. 8 is a front view of the mass flow controller and the portion of the manifold system of FIG. 4.
Figure 9:
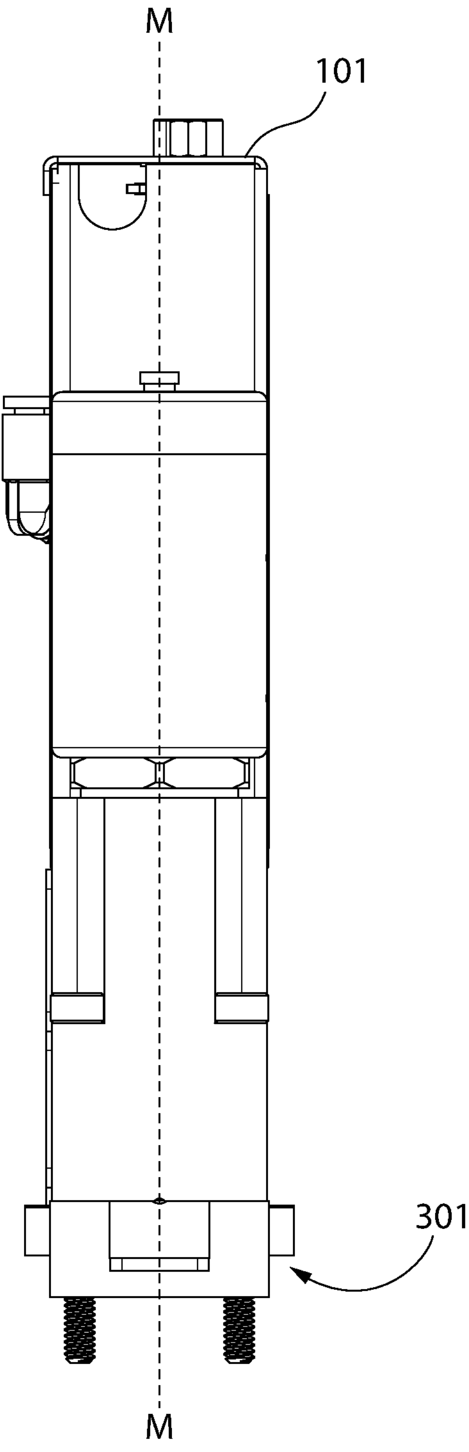
FIG. 9 is a rear view of the mass flow controller and the portion of the manifold system of FIG. 4.
Figure 10:
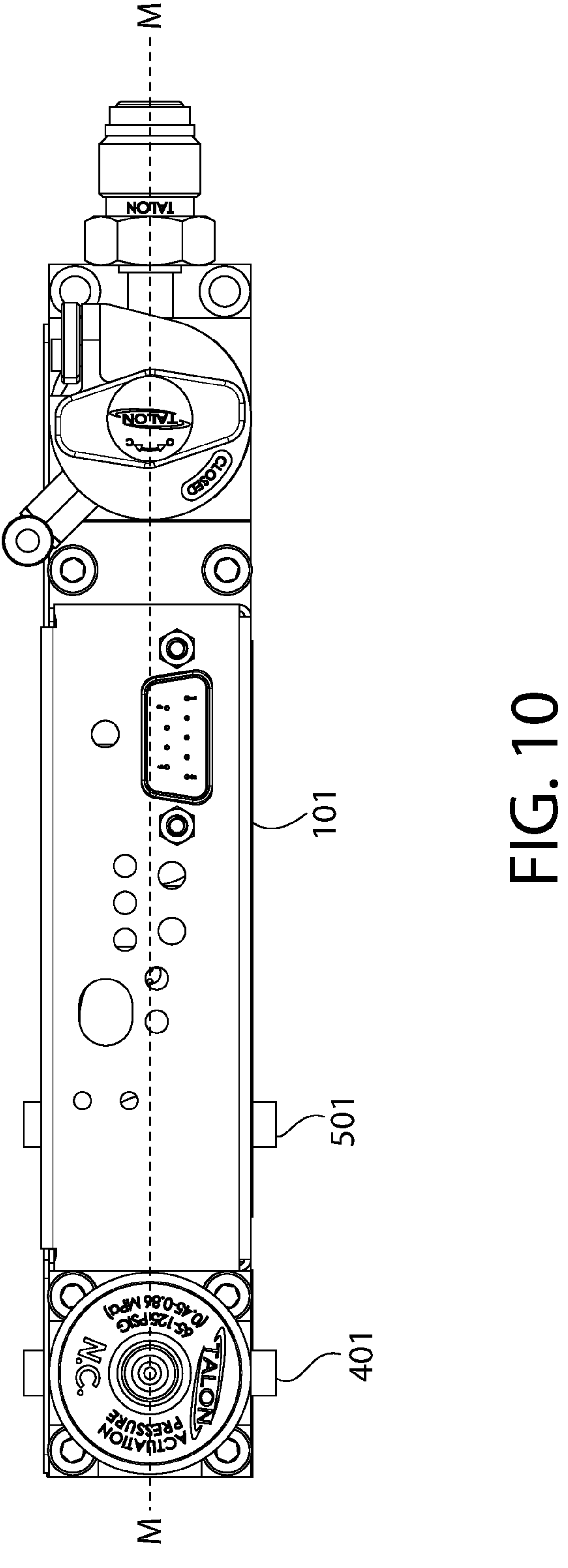
FIG. 10 is a top view of the mass flow controller and the portion of the manifold system of FIG. 4.
Figure 11:
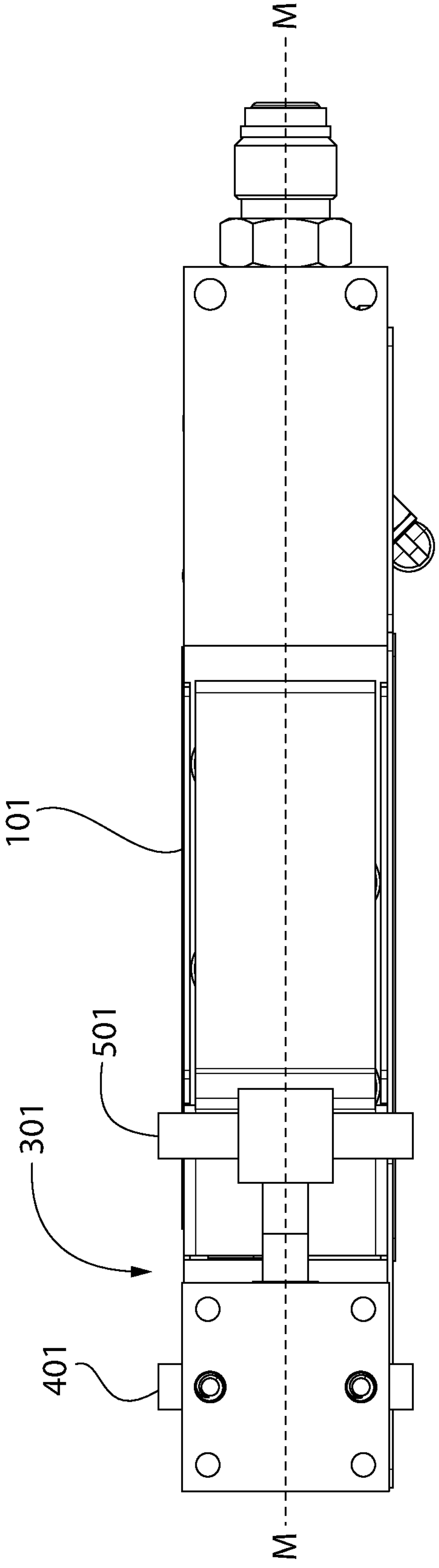
FIG. 11 is a bottom view of the mass flow controller and the portion of the manifold system of FIG. 4.

Turning to FIG. 3, a perspective view of a plurality of apparatuses for controlling flow 100 and a manifold system 300 are shown. As can be seen, six apparatuses 100 are provided in a row. In this example, each of the apparatuses 100 are mass flow controllers 101, but each of the apparatuses 100 could be different devices. Furthermore, not every mass flow controller 101 need be identical. Some may support different fluids, different ranges of flow capability, or any other variation necessary to implement the desired process. As can be seen, the mass flow controllers 101 are mounted to the manifold system 300.

FIGS. 4-12 show a single mass flow controller 101 in greater detail, along with a portion 301 of the manifold system 300. The portion 301 provides the necessary attachment features to mount the mass flow controller 101 or other apparatuses 100 in a standardized configuration. The manifold system enables both vacuum and outlet manifolds to be connected with a minimum of complexity as will be described in greater detail below.

Figure 12:
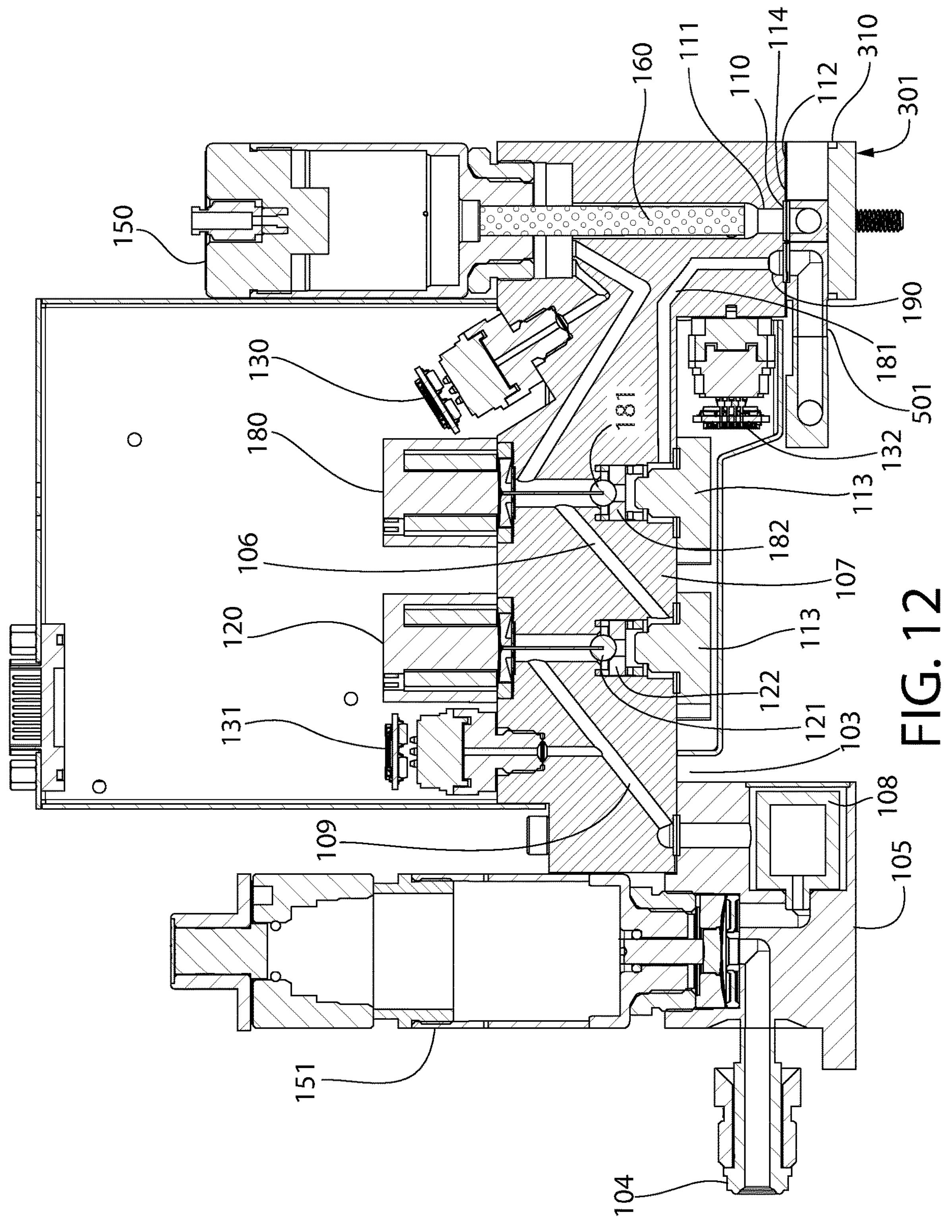
FIG. 12 is a cross-sectional view of the mass flow controller and the portion of the manifold system of FIG. 8, taken along line XII-XII.

Turning to FIG. 12, a cross-section of the mass flow controller 101 and the portion 301 of the manifold system 300 are shown. The mass flow controller 101 comprises a base 103 formed of a first portion 105 and a second portion 107. In some embodiments the base 103 is unitary and monolithic, while in other instances the base 103 may be formed of more than two portions. The base 103 comprises an inlet 104 and an outlet 110, a flow path extending from the inlet 104 to the outlet 110. The inlet 104 is fluidly coupled to a fluid supply 102 as discussed above. Process fluids flow from the inlet 104 to the outlet 110 along the flow path, the inlet 104 being referred to as upstream and the outlet 110 being referred to as downstream, as this is the ordinary direction for fluid flow during operation of the mass flow controller 101. Both the inlet 104 and the outlet 110 lie in a plane M-M which extends through the center of the mass flow controller 101 as shown in FIGS. 4-11. The base 103 further comprises valve caps 113 which close off passages. The valve caps 113 are used to facilitate manufacturing of the base 103 and aid in assembly of the mass flow controller 101.

The inlet 104 is fluidly coupled to an inlet control valve 151, the inlet control valve 151 serving to control the flow of fluid into the mass flow controller 101. The primary function of the inlet control valve 151 is to provide guaranteed shutoff of the mass flow controller 101 for maintenance, service, calibration, etc. The inlet control valve 151 may be manually or automatically operated. In some embodiments, the inlet control valve 151 may be omitted.

Downstream of the inlet control valve 151, an integrated particle filter 108 is installed in the first portion 105 of the base 103. Optionally, the integrated particle filter 108 may be omitted. Alternatively, it may be located upstream of the inlet control valve 151 or elsewhere in the flow path. In yet other embodiments, the integrated particle filter 108 may be omitted. Fluid flows past a P0 pressure transducer 131, which is fluidly coupled to a P0 volume 109 located between the inlet control valve 151 and a proportional valve 120. The P0 volume 109 comprises all volume in the flow path between the inlet control valve 151 and a valve seat 122 of the proportional control valve.

The proportional valve 120 comprises the valve seat 122 and a closure member 121. The proportional valve is configured to transition from a closed state to an open state as well as any intermediate position between the open and the closed states. This allows a variable volume of gas or liquid to pass the proportional valve 120. Downstream of the proportional valve 120 is a shutoff valve 150 and a characterized restrictor 160. As discussed above, the shutoff valve 150 may be upstream or downstream of the characterized restrictor 160. In this embodiment, the volume between the proportional valve 120 and the characterized restrictor 160 is referred to as a P1 volume 106. The P1 volume 106 comprises all volume in the flow path between the valve seat 122 of the proportional valve 120 and the characterized restrictor 160.

A bleed valve 180 and a P1 pressure transducer 130 are fluidly coupled to the P1 volume 106 between the proportional valve 120 and the characterized restrictor 160. The bleed valve 180 comprises a closure member 181 and a valve seat 182. The P1 pressure transducer 130 measures the pressure of the fluid in the P1 volume 106. The bleed valve 180 is configured to vent fluid from the P1 volume 106 to a bleed port 190. The bleed port 190 must be connected to a vacuum manifold to dispose of process fluids. The vacuum manifold is discussed below in greater detail.

The characterized restrictor 160 is located downstream of the shutoff valve 150 and upstream of the outlet 110 as discussed above. The characterized restrictor 160 is configured such that it provides a restriction to fluid flow to provide a pressure differential between the P1 volume 106 and a P2 volume 111. The P2 volume 111 comprises the volume of the flow path between the characterized restrictor 160 and the outlet 110. The P2 volume 111 is fluidly coupled to a P2 pressure transducer 132, the P2 pressure transducer 132 measuring the pressure of the fluid in the P2 volume 111. The restriction to fluid flow of the characterized restrictor 160 may also be referred to as a flow impedance, the flow impedance being sufficiently high that the pressure drop across the characterized restrictor 160 can be measured using the P1 and P2 pressure transducers 130, 132.

In some embodiments, the characterized restrictor 160 may be upstream of the shutoff valve 150. In some embodiments, the characterized restrictor 160 may be at least partially located within the shutoff valve 150. In yet other embodiments, the shutoff valve 150 may be omitted. The P1 and P2 pressure transducers 130, 132 may also be omitted in certain embodiments. In yet other embodiments, one or more of the P0, P1, and P2 pressure transducers 131, 130, 132 may be differential pressure sensors, and may be fluidly coupled to more than one of the P0, P1, and P2 volumes 109, 106, 111 to permit differential pressure measurement between the P0, P1, and P2 volumes 109, 106, 111.

Returning to the bleed valve 180 and the bleed port 190, it can be seen that the bleed valve 180 controls flow through a bleed passage 181 that connects the bleed valve 180 to the bleed port 190. This bleed passage 181 may take any required path to reach a mounting portion 112. The mounting portion 112 forms a portion of the base 103 and has a surface 114 comprising the bleed port 190 and the outlet 110. In a preferred embodiment, the surface 114 of the mounting portion 112 is planar. The mounting portion 112 enables connection of the mass flow controller 101 to the portion 301 of the manifold system 300.

The portion 301 of the manifold system 300 comprises a portion 501 of the vacuum manifold 500 and a portion 401 of the outlet manifold 400. The portion 301 of the manifold system 300 further comprises a mounting substrate 310. The 3 310 provides the mechanical connection for the mounting portion 112 of the mass flow controller 101. The mounting substrate 310 provides both structural strength and rigidity to the mass flow controller 101 and ensures robust fluid connection between the two components. The mounting portion 112 of the mass flow controller 101 is configured to engage the mounting substrate 310 to fluidly couple the outlet 110 and the bleed port 190 to the vacuum manifold 500 and the outlet manifold 400. The surface 114 of the mounting portion 112 may incorporate features necessary to ensure that the bleed port 190 and outlet 110 can be adequately sealed to ensure liquid and/or gas tight connections between the mounting portion 112 and the mounting substrate 310. These features may include recesses or any other feature necessary to provide room for scaling features, seals, or other components that provide a fluid-tight connection.

Figure 13:
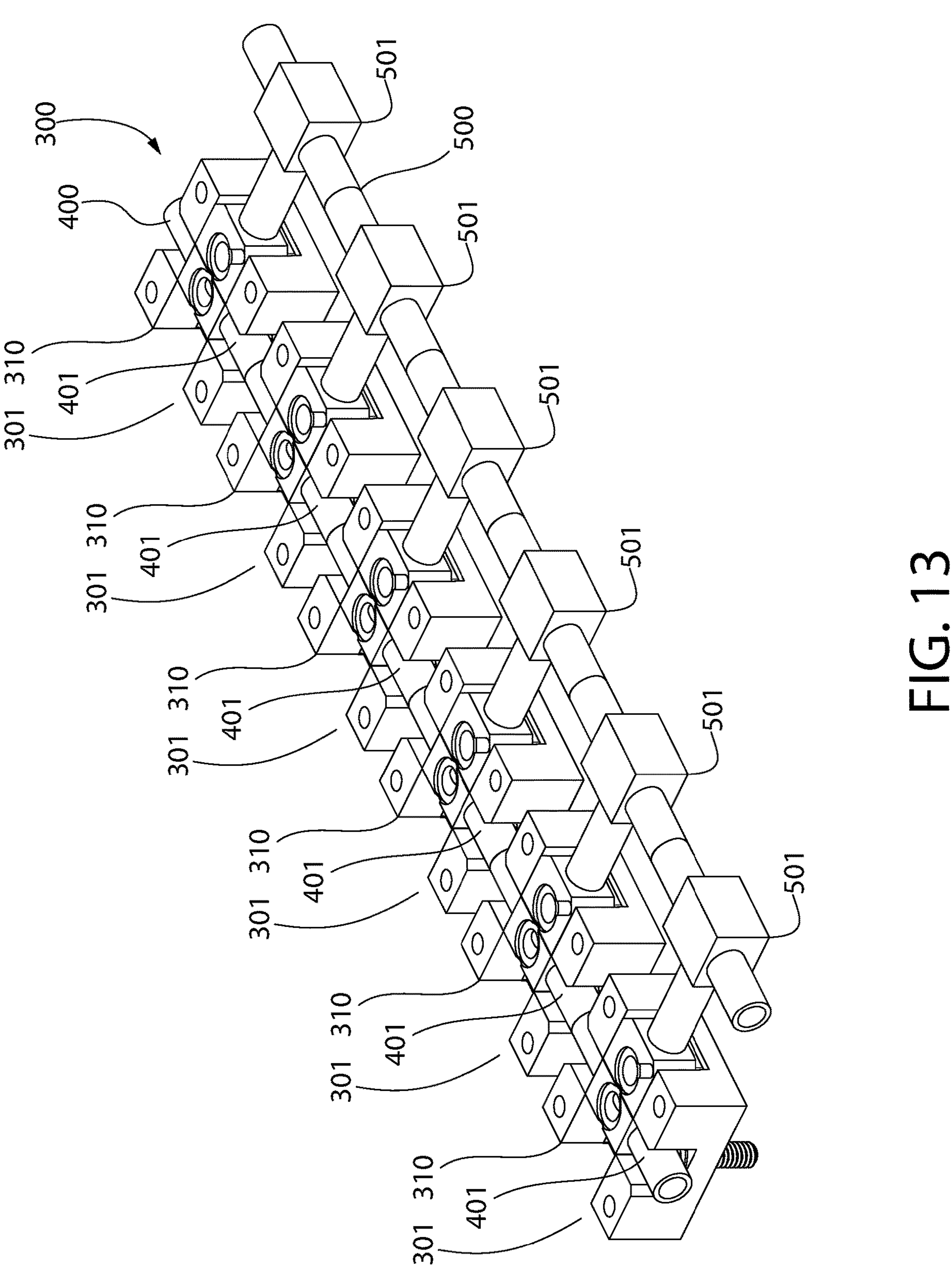
FIG. 13 is a perspective view of the manifold system of FIG. 3.
Figure 14:
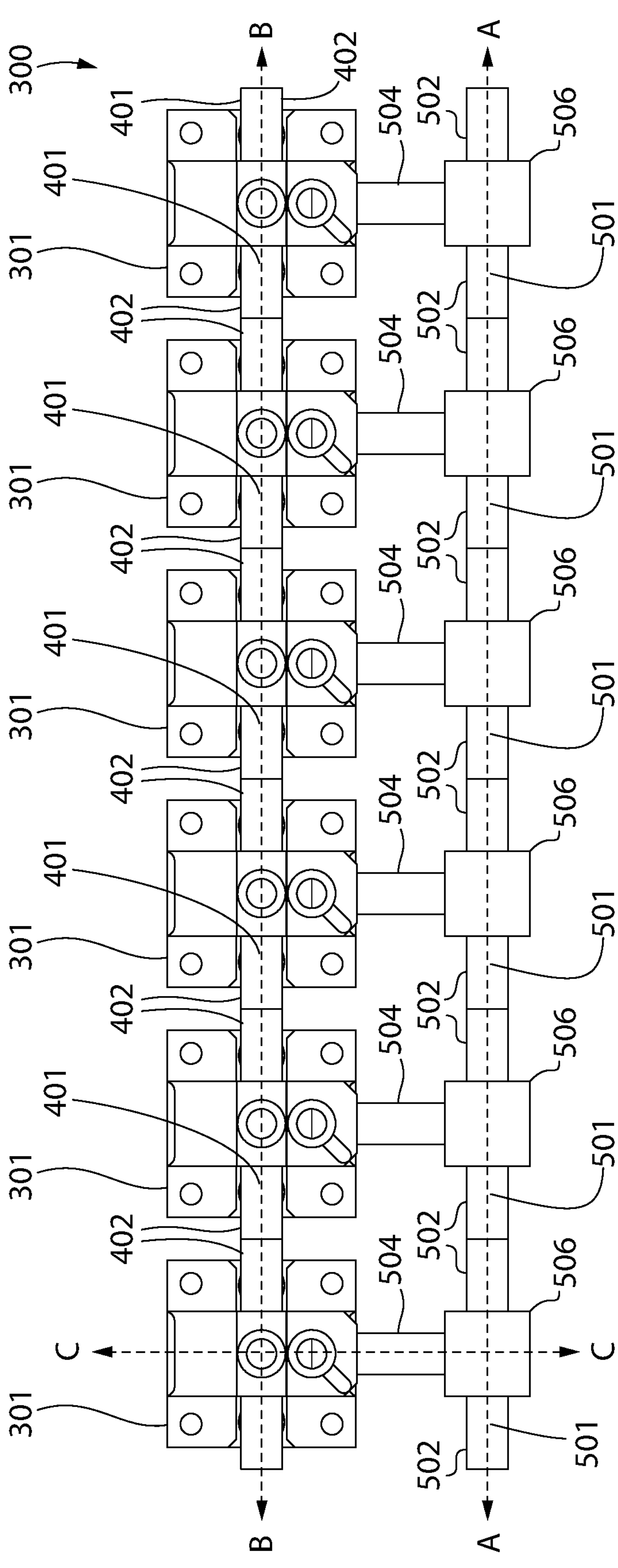
FIG. 14 is a top view of the manifold system of FIG. 3.

Turning to FIGS. 13 and 14, the manifold system 300 is shown in greater detail. The manifold system 300 comprises a plurality of portions 301, each portion 301 being substantially identical. Each of the portions 301 comprises a portion 401 of the outlet manifold 400 and a portion 501 of the vacuum manifold 500. As can be seen, the portions 401 of the outlet manifold 400 collectively form the outlet manifold 400 and the portions 501 of the vacuum manifold 500 collectively form the vacuum manifold 500. Each portion 301 comprises a mounting substrate 310.

The vacuum manifold 500 extends along a longitudinal axis A-A, the longitudinal axis A-A being coaxial with a plurality of primary channels 502. The longitudinal axis A-A extends perpendicular to the plane M-M, which extends through the inlet 104 and the outlet 110 of the mass flow controller 101. Optionally, a first one of the portions 301 of the manifold system 300 may not comprise a primary channel 502 so that it may be sealed and may terminate the vacuum manifold 500. The first one of the portions 301 may also comprise a primary channel 502 that is coupled to another tubing system or may be coupled to the vacuum source 1200 as discussed above. A last one of the portions 301 comprises a primary channel 502 that is fluidly coupled to the vacuum source 1200 to ensure that the vacuum manifold 500 is under vacuum.

The primary channels 502 are coupled to a plurality of feed channels 504 via a plurality of tee fittings 506. The feed channels 504 extend along a longitudinal axis C-C, the longitudinal axis C-C being perpendicular to the longitudinal axis A-A. The longitudinal axis C-C extends parallel to the plane M-M, which extends through the inlet 104 and the outlet 110 of the mass flow controller 101. The feed channels 504 couple to the mounting substrates 310 and permit fluid connection of the mounting substrates 310 to the plurality of primary channels 502. Thus, fluid flows from the bleed ports 190 of the plurality of apparatuses 100, through the mounting substrates 310, through the feed channels 504 to the primary channels 502, and then on to the vacuum source. The primary channels 502 and the feed channels 504 may be pipe nipples, lengths of pipe, or other tubular members that conduct fluids. They may be coupled to the mounting substrates 310 and the tec fittings 506 via any known method, including threading, welding, soldering, slip fits, compression fits, mounting flanges, monolithic construction, and the like. Although the primary channels 502 are shown in two parts, each primary channel 502 may be integrally formed such that it extends between adjacent tec fittings 506. In some embodiments, the feed channels 504 may not extend perpendicular to the longitudinal axis A-A and may be angled with respect to the longitudinal axis A-A at an angle other than 90 degrees.

The outlet manifold 400 extends along a longitudinal axis B-B, the longitudinal axis B-B being parallel to the longitudinal axis A-A and spaced from the longitudinal axis A-A. The longitudinal axis B-B extends perpendicular to the plane M-M, which extends through the inlet 104 and the outlet 110 of the mass flow controller 101. The outlet manifold 400 comprises a plurality of primary channels 402 which connect the mounting substrates 310. They may be attached to the mounting substrates via any known method, including threading, welding, soldering, slip fits, compression fits, mounting flanges, monolithic construction, and the like. Although the primary channels 402 are shown in two parts, each primary channel 402 may be integrally formed such that it extends between adjacent mounting substrates 310. In some embodiments, the longitudinal axis B-B may not extend parallel to the longitudinal axis A-A and may be angled with respect to the longitudinal axis A-A.

Turning to FIGS. 15-18, the portions 301 of the manifold system 300 are discussed in greater detail. A single portion 301 is shown in FIGS. 15-18, but the other portions 301 are substantially identical. As can be seen, the single portion 301 comprises the portion 401 of the outlet manifold 400 and the portion 5101 of the vacuum manifold. The portion 301 also comprises the mounting substrate 310. The mounting substrate 310 comprises a cradle 320 and a port block 330. The port block 330 comprises a first portion 340 and a second portion 350. The first portion 340 comprises an outlet port 341 while the second portion 350 comprises a vacuum port 351. In some embodiments, the port block 330 is formed as a single unitary monolithic component, with the first and second portions 340, 350 being portions of a single component. In other embodiments, such as the one shown, the port block 330 is formed such that the first and second portions 340, 350 are individual components.

The mounting substrate 310 further comprises a 312, the surface 312 being substantially planar. The cradle 320 and the port block 330 each form a portion of the surface 312, permitting the mounting portion 112 of the mass flow controller 101 to seal against the surface 312. The outlet port 341 and the vacuum port 351 are formed into the surface 312. Four mounting holes 322 are provided in the cradle 320 to permit attachment of an apparatus for controlling flow 100 such as the mass flow controller 101. Two bolts 314 are provided for attaching the mounting substrate 310 to another object such as a bench, frame, or other structure within the factory where the system is installed. These bolts 314 may be installed in counterbored through-holes which extend through the cradle 320. Alternatively, any other known attachment technique may be used.

Figure 15:
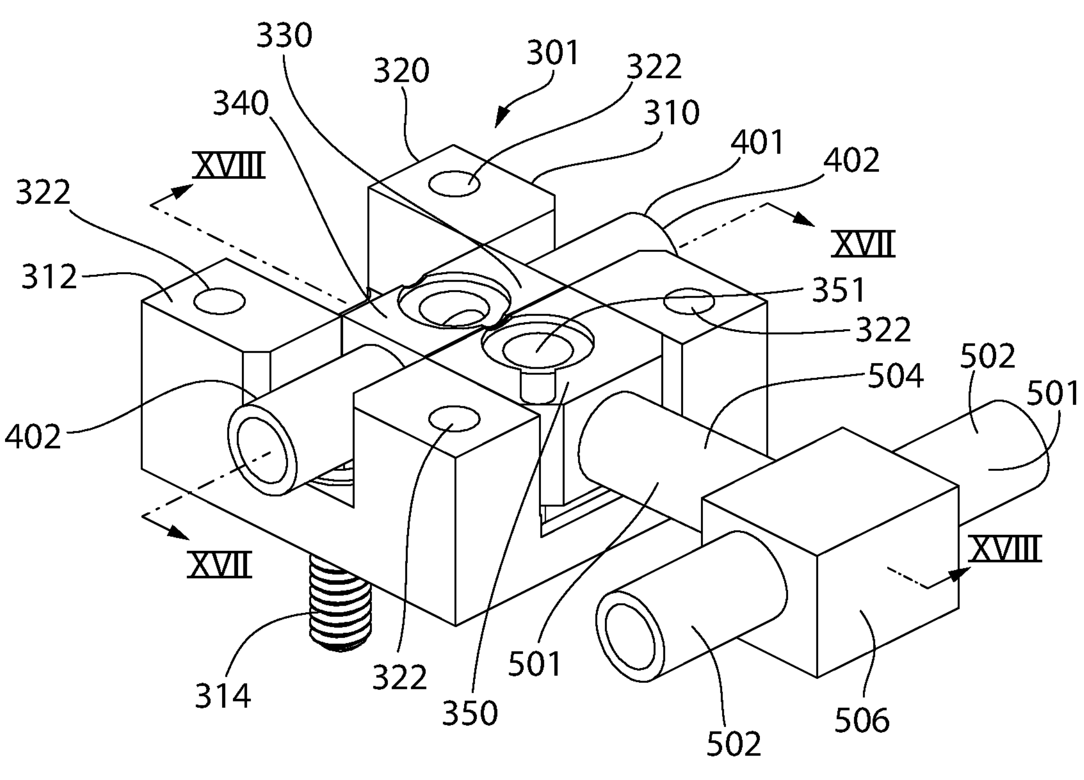
FIG. 15 is a perspective view of a mounting substrate of the manifold system of FIG. 3 and portions of the vacuum and outlet manifolds.
Figure 16:
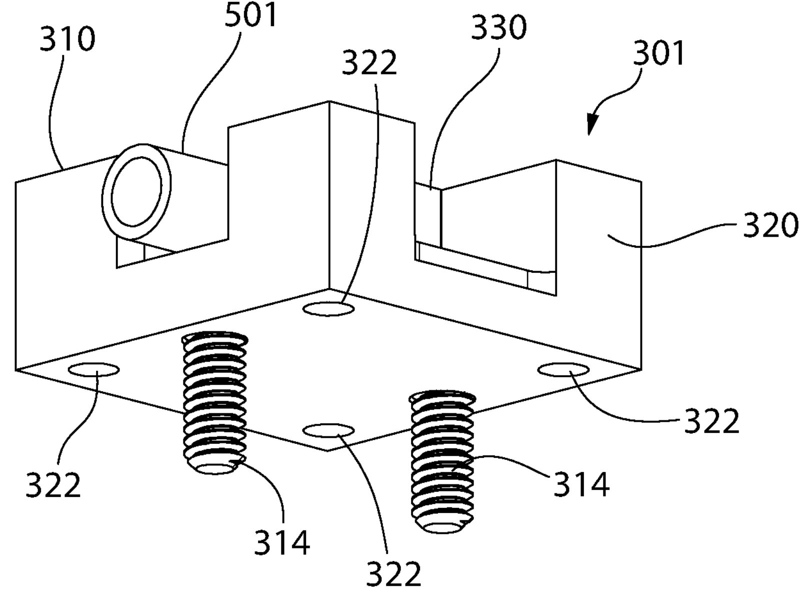
FIG. 16 is a bottom perspective view of the mounting substrate of FIG. 15.
Figure 17:
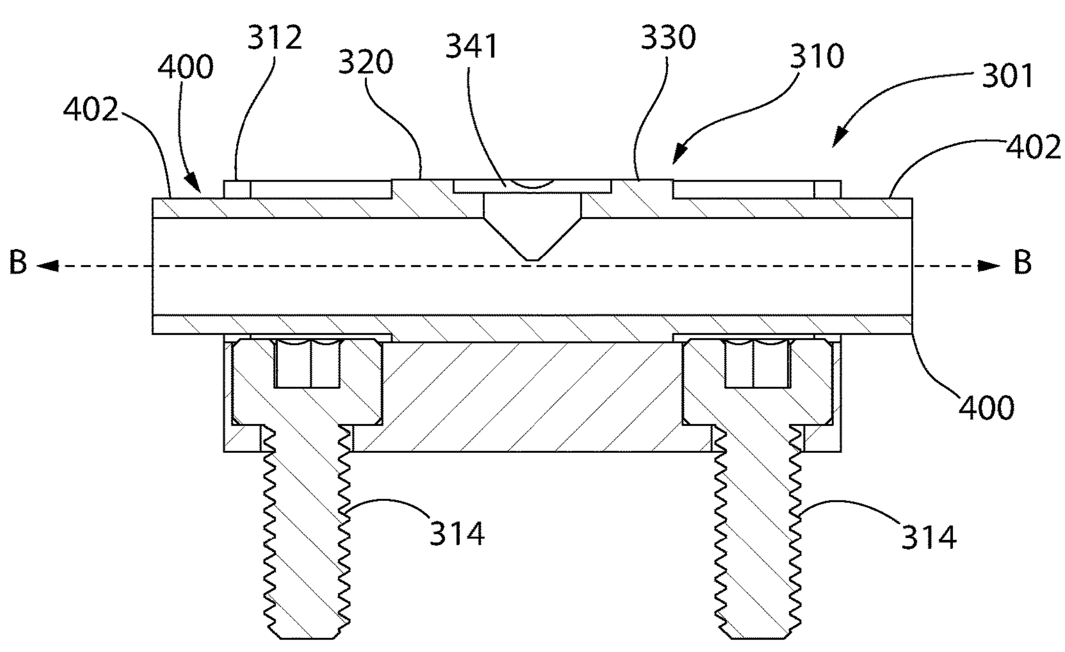
FIG. 17 is a cross-sectional view of the mounting substrate of FIG. 15, taken along line XVII-XVII.

Turning to FIG. 17, a cross-section along the line XVII-XVII of FIG. 15 is shown. In FIG. 17, the portion 301 is shown cut through the outlet manifold 400 and associated portions of the mounting substrate 310. As can be seen, the outlet manifold 400 extends along the axis B-B. The cradle 320 supports the outlet manifold 400 and the port block 320, with the first portion 340 of the port block 330 being visible. The fluid flow path from the outlet port 341 of the first portion 340 of the port block 330 to the primary channels 402 of the outlet manifold 400 is best shown in this view.

Figure 18:
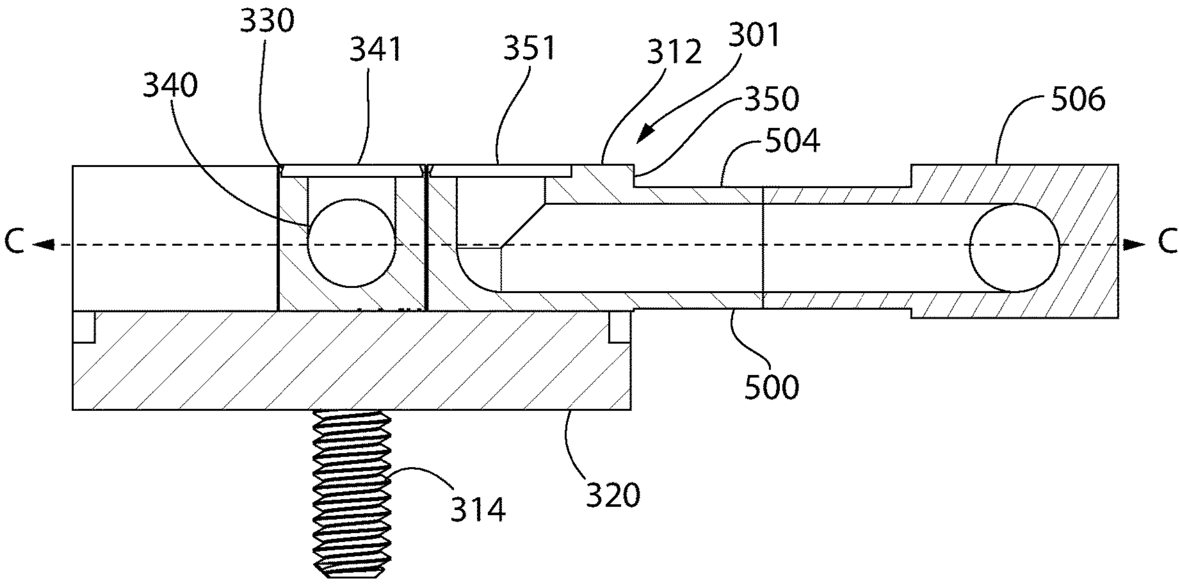
FIG. 18 is a cross-sectional view of the mounting substrate of FIG. 15, taken along line XVIII-XVIII.

FIG. 18 shows a cross-section along the line XVIII-XVIII of FIG. 15. In FIG. 18, the portion 301 is shown sectioned through the first and second portions 340, 350 of the port block 330. As can be seen, the vacuum port 351 of the second portion 350 is fluidly coupled to one of the feed channels 504 of the vacuum manifold 500. Fluid from the vacuum port 351 travels into the second portion 350, turning a right angle and then proceeding along the feed channel 504 until it reaches the tec fitting 506. The outlet port 341 of the first portion 340 is also shown, with the fluid turning at a right angle until it reaches the outlet manifold 400. The cradle 320 supports the port block 330 such that the surface 312 is substantially planar, ensuring effective sealing of the mass flow controller 101 with the mounting substrate 110.

Figures 19, 20, 21:
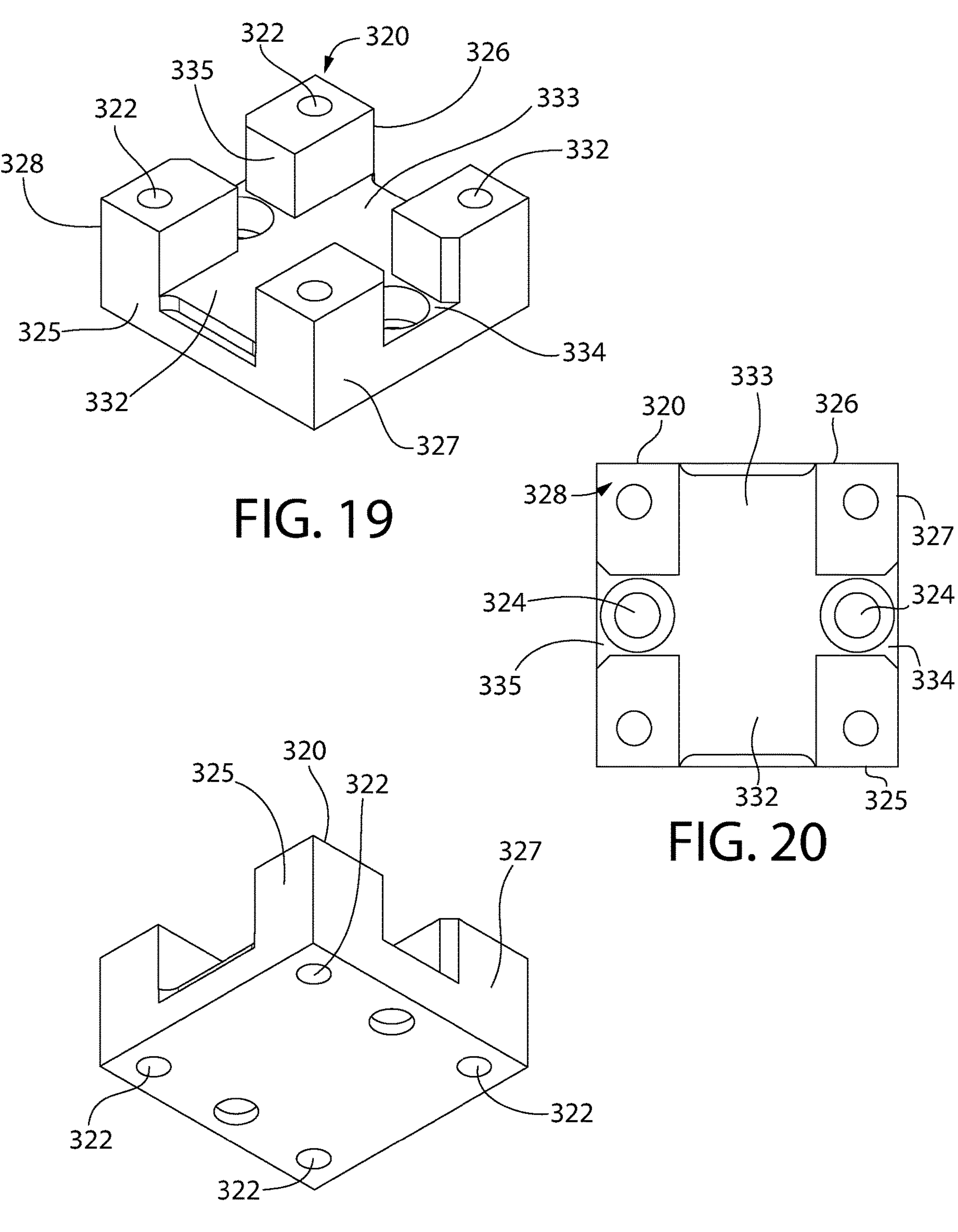
FIG. 19 is a perspective view of a cradle of the mounting substrate of FIG. 15.
FIG. 20 is a top view of a cradle of the mounting substrate of FIG. 15.
FIG. 21 is a bottom perspective view of a cradle of the mounting substrate of FIG. 15.

Turning to FIGS. 19-21, the cradle 320 is shown in greater detail. The cradle 320 has mounting holes 322 as discussed previously, which are used to attach apparatuses for controlling flow 100. Counterbored holes 324 are used to attach the cradle 320 to a substrate such as a frame, table, or other component to provide mechanical support for the mounting substrate 310 and the apparatus 100. The cradle 320 also has a first side 325, a second side 326, a third side 327, and a fourth side 328. The first side 325 and the second side 326 are opposite one another and the third side 327 and fourth side 328 are opposite one another. A first slot 332 extends through the cradle 320 from the first side 325 toward the second side 326. A second slot 333 extends through the cradle 320 from the second side 326 toward the first side 325. Collectively, the first and second slots 332, 333 extend from the first side 325 to the second side 326.

A third slot 334 extends through the cradle 320 from the third side 327 toward the fourth side 328. A fourth slot 335 extends through the cradle 320 from the fourth side 328 toward the third side 327. Collectively, the third and fourth slots 334, 335 extend from the third side 327 to the fourth side 328. The first and second sides 325, 326 are perpendicular to the third and fourth sides 327, 328. The first and second slots 332, 333 receive the primary channels 402 while the third slot 334 receives the feed channel 504. The fourth slot 335 is left unoccupied. Thus, the outlet manifold 400 extends through the first and second slots 332, 333 and the vacuum manifold 500 extends through one of the third and fourth slots 334, 335. Providing the fourth slot 335 allows greater flexibility in manifold configuration. It is conceived that the vacuum manifold 500 might extend through the fourth slot 335 instead of the third slot 334. It is also conceivable that a third port could be added to the port block 330 to enable connection of three manifolds, allowing different process chambers to be served by the same equipment or providing multiple vacuum manifolds for different fluids or different purposes.

Generally, the first and second slots 332, 333 are wider than the third and fourth slots 334, 335. Generally, the first and second slots 332, 333 are perpendicular to the third and fourth slots 334, 335. However, the slots 332, 333, 334, 335 could be of the same width or the first and second slots 332, 333 could be narrower than the third and fourth slots 334, 335. The slots 332, 333, 334, 335 also need not be parallel or perpendicular to one another and may be arranged at different angles to accommodate manifold channels which are angled at other than right angles.

Figure 22:
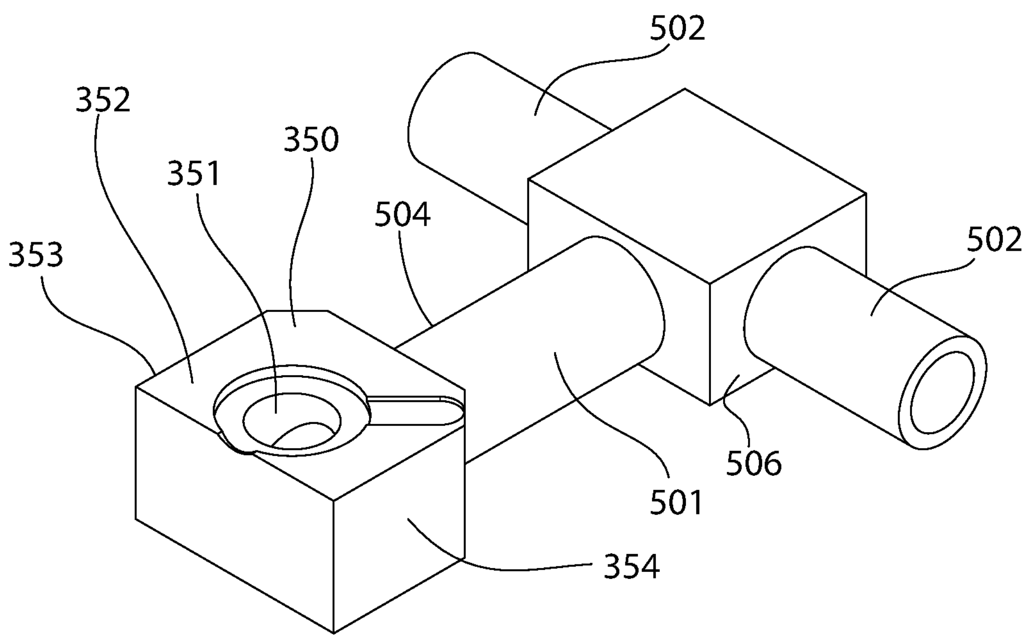
FIG. 22 is a perspective view of a first portion of a port block of the mounting substrate of FIG. 15.
Figure 23:
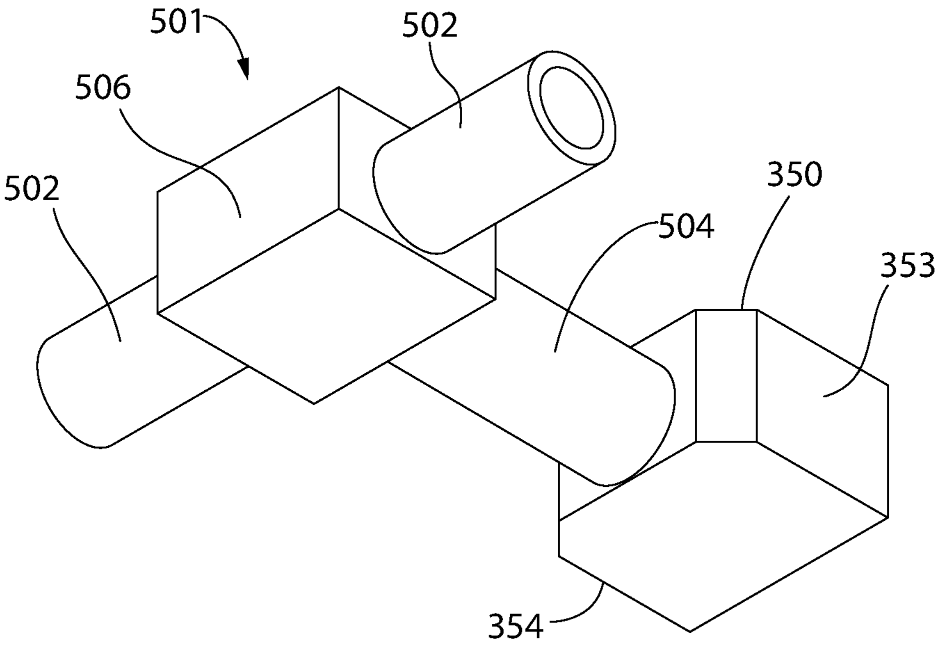
FIG. 23 is a bottom perspective view of the first portion of the port block of the mounting substrate of FIG. 15.

FIGS. 22 and 23 show the second portion 350 of the port block 330 with the portion 501 of the vacuum manifold 500. The vacuum port 351 of the second portion is located on a top surface 352, which can be clearly seen in FIG. 22. The feed channel 504, tee fitting 506, and the primary channels 502 can be seen extending from the second portion 350. The second portion 350 is configured to fit within the third slot 334 and has a width which is approximately equal to the width of the third slot 334 as measured from a first side 353 to a second side 354. The second portion 350 has a height which is substantially equal to a depth of the third slot 334.

Figure 24:
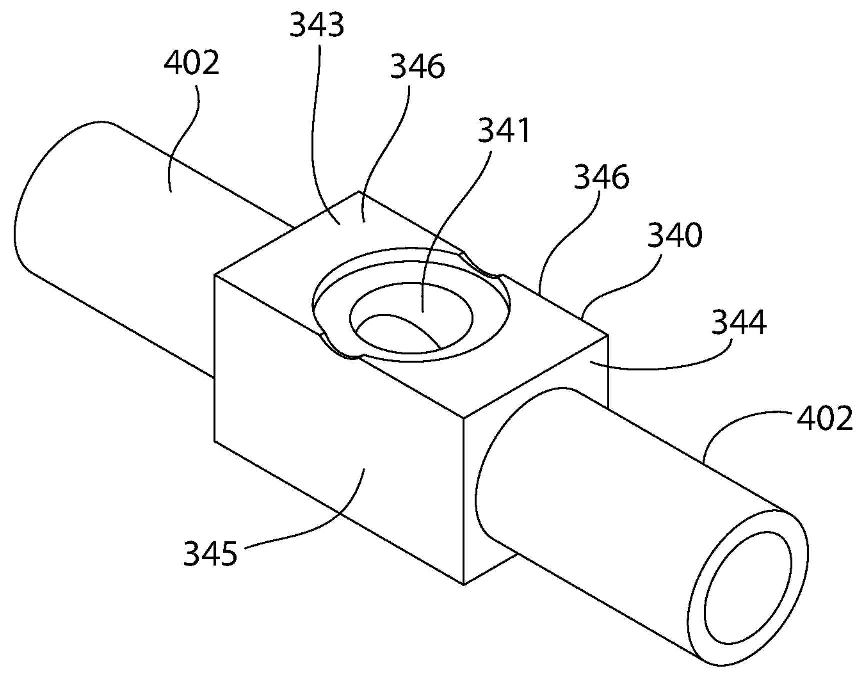
FIG. 24 is a perspective view of a second portion of the port block of the mounting substrate of FIG. 15.
Figure 25:
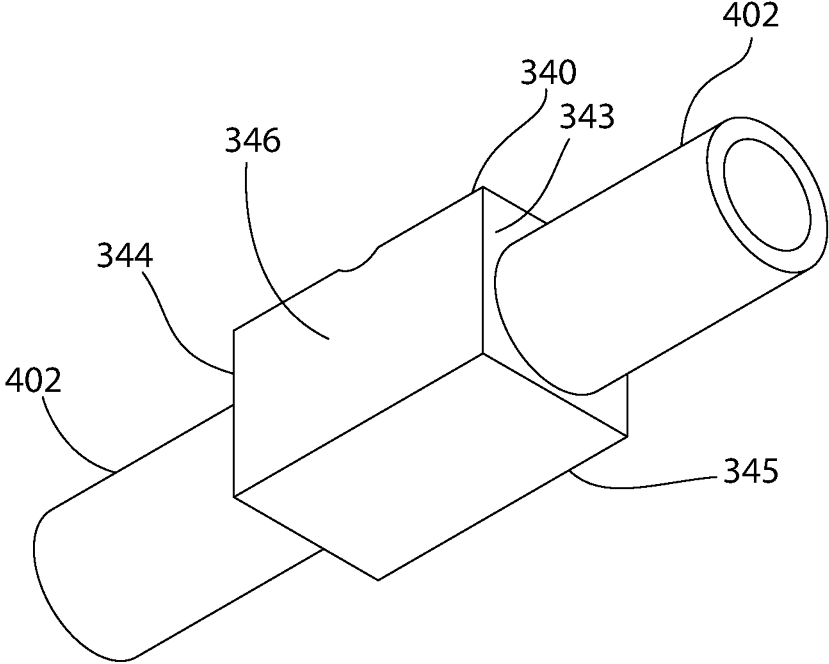
FIG. 25 is a bottom perspective view of the second portion of the port block of the mounting substrate of FIG. 15.

FIGS. 24 and 25 show the first portion 340 of the port block 330 with the portion 401 of the outlet manifold 400. The vacuum port 341 is located on a top surface 342, which can be best seen in FIG. 24. The primary channels 402 can be seen extending from first and second ends 343, 344. The first portion 340 has a width which is approximately equal to the width of the first and second slots 332, 334, the width being measured from a third side 345 to a fourth side 346. The first portion 340 has a height which is substantially equal to a depth of the first and second slots 332, 333.

A method of utilizing the systems described above will now be discussed in greater detail. In a preferred embodiment, the aforementioned systems are used to implement a method of manufacturing articles such as semiconductor devices. In this method, an apparatus for controlling flow 100 is provided, the apparatus 100 comprising a mounting portion 112. A mounting substrate 312 is also provided, the mounting substrate having a surface 312 having an outlet port 341 and a vacuum port 351 formed therein. The outlet port 341 is fluidly coupled to an outlet manifold 400 and the vacuum port 351 is fluidly coupled to a vacuum manifold 500. The outlet manifold 400 is fluidly coupled to a processing chamber 1300 and the vacuum manifold 500 is fluidly coupled to a vacuum source 1200.

A process fluid is supplied to the apparatus 100, the process fluid flows through the apparatus 100 and is delivered to a bleed port 190. The process fluid then flows from the bleed port 190 to the vacuum port 351 because the mounting portion 112 of the apparatus 100 is mounted to the mounting substrate 312 such that the vacuum port 351 is in fluid communication with the bleed port 190. Similarly, the outlet port 341 is in fluid communication with the outlet 110 of the apparatus 100. Process fluid flows from the vacuum port 351 to the vacuum manifold 500 and on to the vacuum source 1200. Similarly, the process fluid flows through the apparatus 100 and is delivered to the outlet 110. In turn, the process fluid flows from the outlet 110 through the outlet port 341 of the mounting substrate and on to the outlet manifold 400. Process fluid then flows to the processing chamber 1300. The process fluid is used to perform a process on an article within the processing chamber. In some embodiments, the article being processed is a semiconductor device or is manufactured into a semiconductor device as a result of the processing performed in the method.

In some embodiments, the process fluid is flowed through the vacuum port 351 before it is flowed through the outlet port 341. In other embodiments the process fluid flows through both the vacuum port 351 simultaneously with flowing through the outlet port 341. In yet other embodiments, the process fluid flows through the outlet port 341 before it flows through the vacuum port 351. In yet further embodiments, a plurality of apparatuses 100 and mounting substrates 312 may be utilized. In these embodiments, a plurality of process fluids may be used, or the same process fluid may be used in more than one apparatus 100. In those embodiments utilizing a plurality of apparatuses 100, more than one apparatus 100 may be active simultaneously. In some embodiments, more than one process fluid may flow through the corresponding vacuum ports 351 and outlet ports 341 simultaneously.

Section II

The present invention is directed to a seal retainer for use in installing fluid flow components to form a flow control apparatus. Semiconductor fabrication is one industry which demands high performance in control of fluid flows. As semiconductor fabrication techniques have advanced, customers have recognized the need for flow control devices with decreased space requirements. Thus, servicing and maintenance of flow control equipment has grown increasingly difficult as packaging of flow control devices grows denser than ever. The present invention facilitates efficient assembly of a flow control component within a flow control apparatus.

Figure 26:
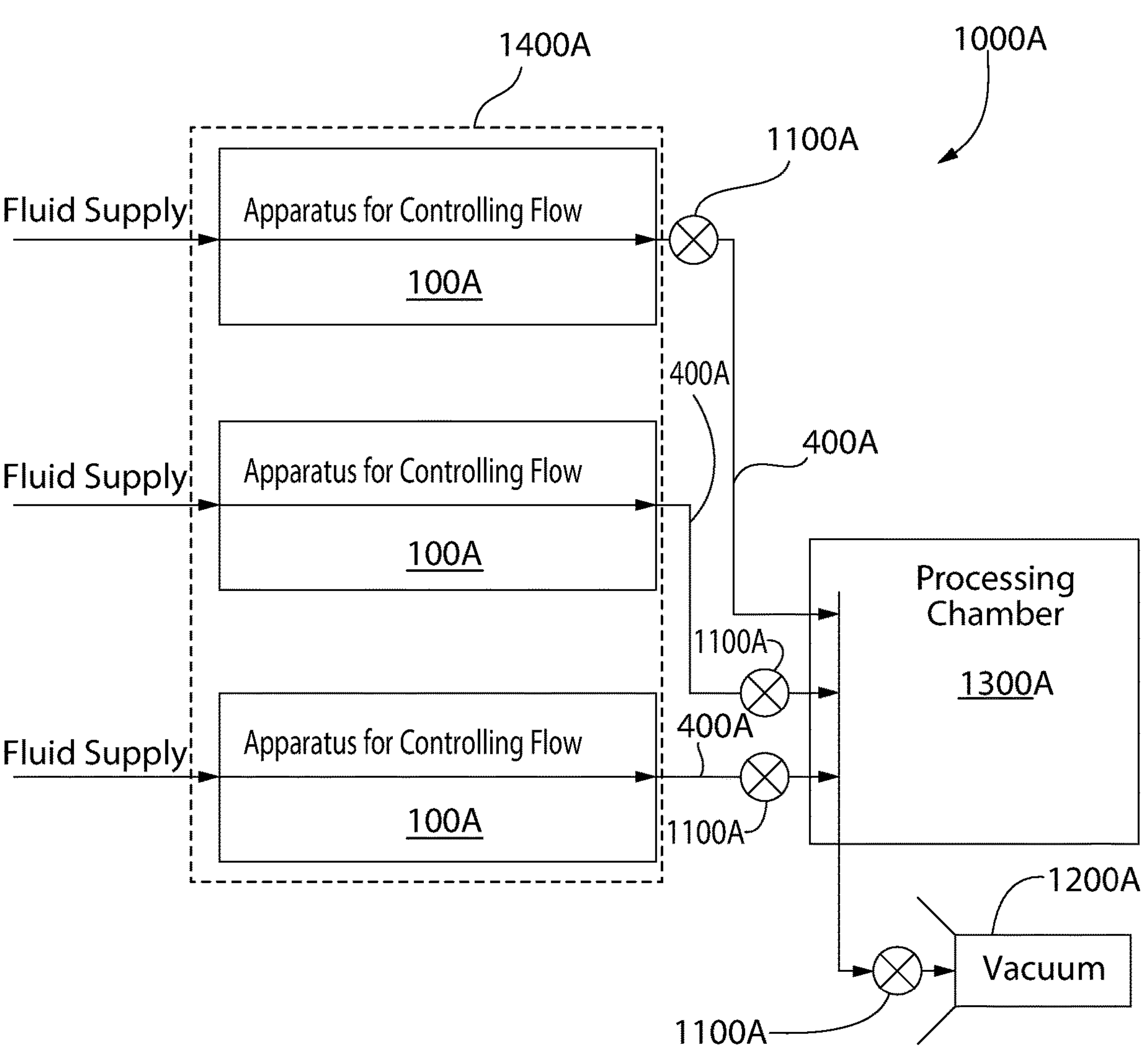
FIG. 26 is a schematic of a system for manufacturing semiconductor devices utilizing one or more apparatuses for controlling flow.

FIG. 26 shows a schematic of an exemplary processing system 1000A. The processing system 1000A may utilize a plurality of apparatus for controlling flow 100A fluidly coupled to a processing chamber 1300A. The plurality of apparatus for controlling flow 100A are used to supply one or more different process fluids to the processing chamber 1300A. Fluids are provided by a plurality of fluid supplies, or fluid sources. Collectively, the plurality of apparatus for controlling flow 100A belong to a fluid delivery module 1400A. Optionally, more than one fluid delivery module 1400A may be utilized in the processing system 100A. The plurality of apparatus for controlling flow 100A are connected to the processing chamber 1300A by an outlet manifold 400A. Articles such as semiconductors and integrated circuits may be processed within the processing chamber 1300A.

Valves 1100A isolate each of the apparatus for controlling flow 100A from the processing chamber 1300A, enabling each of the apparatus for controlling flow 100A to be selectively connected or isolated from the processing chamber 1300A, facilitating a wide variety of different processing steps. The processing chamber 1300A may contain an applicator to apply process fluids delivered by the plurality of apparatus for controlling flow 100A, enabling selective or diffuse distribution of the fluids supplied by the plurality of apparatus for controlling flow 100A. Optionally, the processing chamber 1300A may be a vacuum chamber or may be a tank or bath for immersing articles in the fluids supplied by the plurality of apparatus for controlling flow 100A. A fluid supply line is formed by the flow path from each of the respective fluid supplies to the processing chamber 1300A.

In addition, the processing system 1000A may further comprise a vacuum source 1200A which is isolated from the processing chamber 1300A by a valve 1100A to enable evacuation of process fluids or facilitate purging one or more of the apparatus for controlling flow 100A. This enables maintenance, switching between process fluids in the same apparatus for controlling flow 100A, or other tasks. Optionally, the vacuum source 1200A may be a liquid drain configured to remove liquids from the processing chamber 1300A instead of a vacuum source for removing gases. Optionally, the apparatus for controlling flow 100A may be mass flow controllers, flow splitters, or any other device which controls the flow of a process fluid in a processing system. Furthermore, the valves 1100A may be integrated into the apparatus for controlling flow 100A if so desired. The processing chamber 1300A may house a semiconductor wafer for processing, among other articles.

Processes that may be performed in the processing system 1000A may include wet cleaning, photolithography, ion implantation, dry etching, atomic layer etching, wet etching, plasma ashing, rapid thermal annealing, furnace annealing, thermal oxidation, chemical vapor deposition, atomic layer deposition, physical vapor deposition, molecular beam epitaxy, laser lift-off, electrochemical deposition, chemical-mechanical polishing, wafer testing, electroplating, or any other process utilizing gases or liquids.

Figure 27:
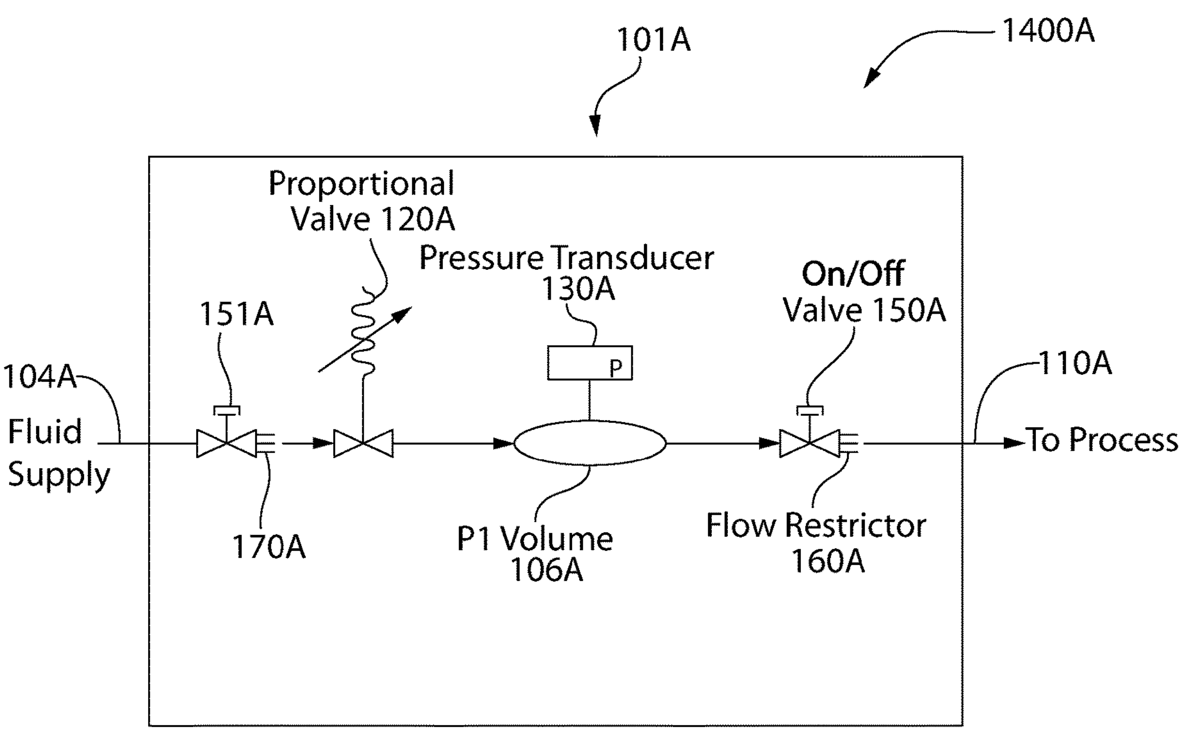
FIG. 27 is a schematic of a fluid delivery module comprising a mass flow controller incorporating a plurality of valve assemblies, the mass flow controller being one of the apparatuses for controlling flow as may be utilized in the process of FIG. 26.

FIG. 27 shows a schematic of an exemplary fluid delivery module 1400A comprising a mass flow controller 101A. The mass flow controller 101A is one type of apparatus for controlling flow 100A that may be utilized in the processing system 1000A. The mass flow controller 101A has a fluid supply of a process fluid fluidly coupled to an inlet 104A. The inlet is fluidly coupled to an inlet control valve 151A, which is then coupled to a proportional valve 120A. The inlet control valve 151A provides shutoff capability for the mass flow controller 101A. Preferably, the inlet control valve 151A is an on/off valve capable of either permitting or preventing flow of a fluid without any intervening states. However, it is conceived that the inlet control valve 151A may be a proportional valve capable of varying flow from an open state to a closed state.

Between the inlet control valve 151A and the proportional valve 120A is a filter media 170A. The filter media 170A will be discussed in greater detail below, but serves to filter the incoming fluid from the fluid supply to ensure reliable operation of the apparatus for controlling flow 100A, among other purposes. The filter media 170A may be any known filtering material, such as a porous structure, fiber metal structure, woven metal structure, fiber or woven paper or fabric material, foam material, or any other known filtering media. The filter media 170A may be located upstream or down-stream of the inlet control valve 151A with respect to the fluid supply.

The proportional valve 120A is capable of varying the volume of process fluid flowing through the proportional valve 120A. The proportional valve 120A meters the mass flow of process fluid which passes to the P1 volume 106A. The proportional valve 120A is capable of providing proportional control of the process gas such that it need not be fully open or closed, but instead may have intermediate states to permit control of the mass flow rate of process gas. Similarly, the inlet control valve 151A may also be used to provide proportional control of fluid flow if so desired. In other embodiments, the inlet control valve 151A may be combined with the proportional valve 120A. In that configuration, the filter media 170A may be located either upstream or downstream of the inlet control valve 151A and the proportional valve 120A may be omitted.

A P1 volume 106A is fluidly coupled to the proportional valve 120A, the P1 volume 106A being the sum of all the volume within the mass flow controller 101A between the proportional valve 120A and a flow restrictor 160A. A pressure transducer 130A is fluidly coupled to the P1 volume 106A to enable measurement of the pressure within the P1 volume 106A. An on/off valve 150A is located between the flow restrictor 160A and the proportional valve 120A and may be used to completely halt flow of the process gas out of the P1 volume 106A. Optionally, the flow restrictor 160A may be located between the on/off valve 150A and the proportional valve 120A in an alternate configuration. Finally, the flow restrictor 160A is fluidly coupled to an outlet 110A of the mass flow controller 101A. In the processing system, the outlet 110A is fluidly coupled to a valve 1100A or directly to the processing chamber 1300A.

The flow restrictor 160A is used, in combination with the proportional valve 120A, to meter flow of the process gas. In most embodiments, the flow restrictor 160A provides a known restriction to fluid flow. The first characterized flow restrictor 160A may be selected to have a specific flow impedance so as to deliver a desired range of mass flow rates of a given process gas. The flow restrictor 160A has a greater resistance to flow than the passages upstream and downstream of the flow restrictor 160A.

Optionally, the mass flow controller 101A comprises one or more P2 pressure transducers downstream of the flow restrictor 160A and the on/off valve 150A. The P2 pressure transducer is used to measure the pressure differential across the flow restrictor 160A. In some embodiments, the P2 pressure downstream of the flow restrictor 160A may be obtained from another apparatus 100A connected to the processing chamber, with the readings communicated to the mass flow controller 101A.

Optionally, temperature sensors may be employed to further enhance the accuracy of the mass flow controller 101A. They may be mounted in the base of the mass flow controller 101A near the P1 volume 106A. Additional temperature sensors may be employed in a variety of locations, including the proportional valve 120A, the pressure transducer 130A, and the on/off valve 150A.

Figure 28:
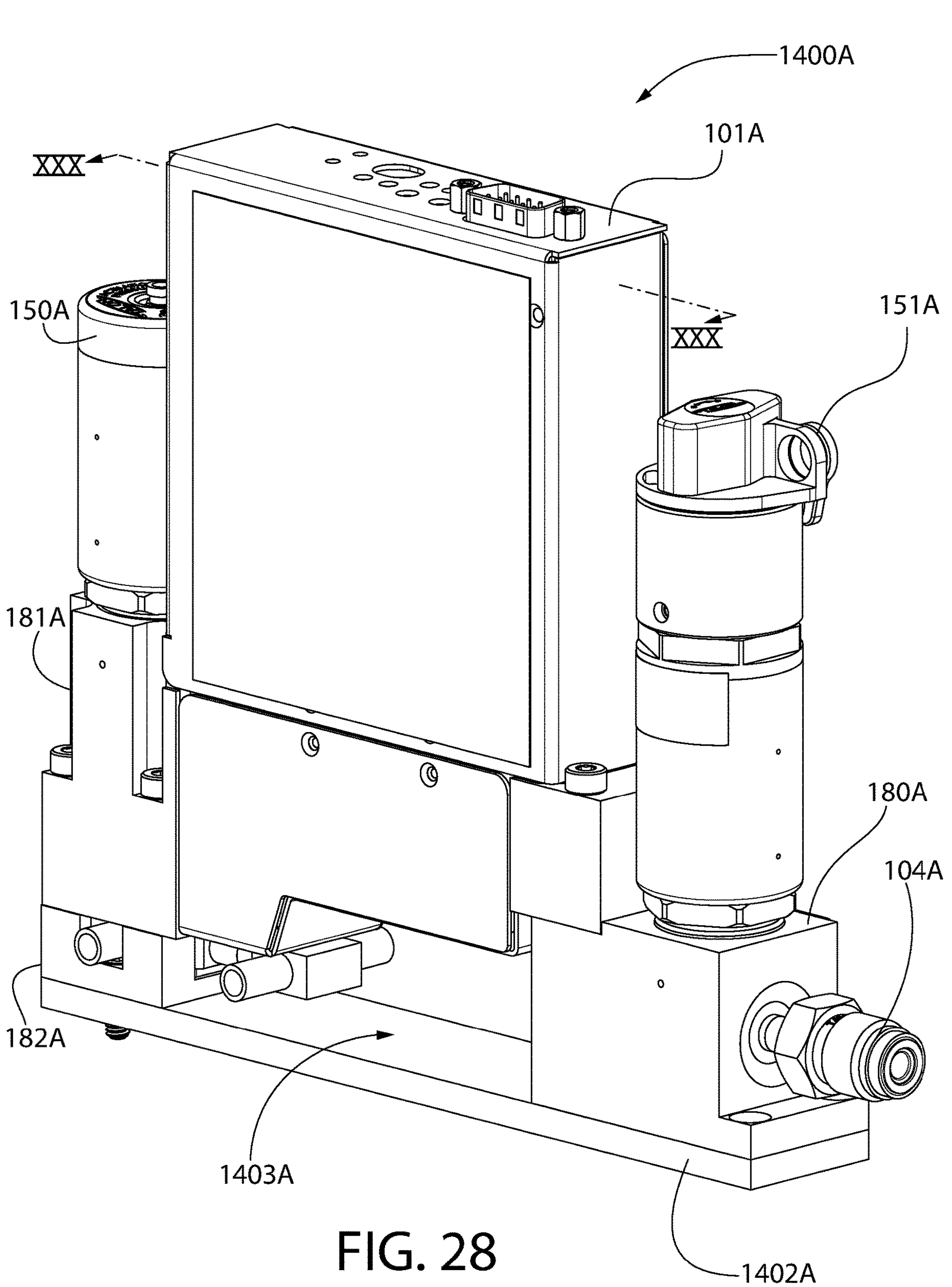
FIG. 28 is a perspective view of the fluid delivery module of FIG. 27.
Figure 29:
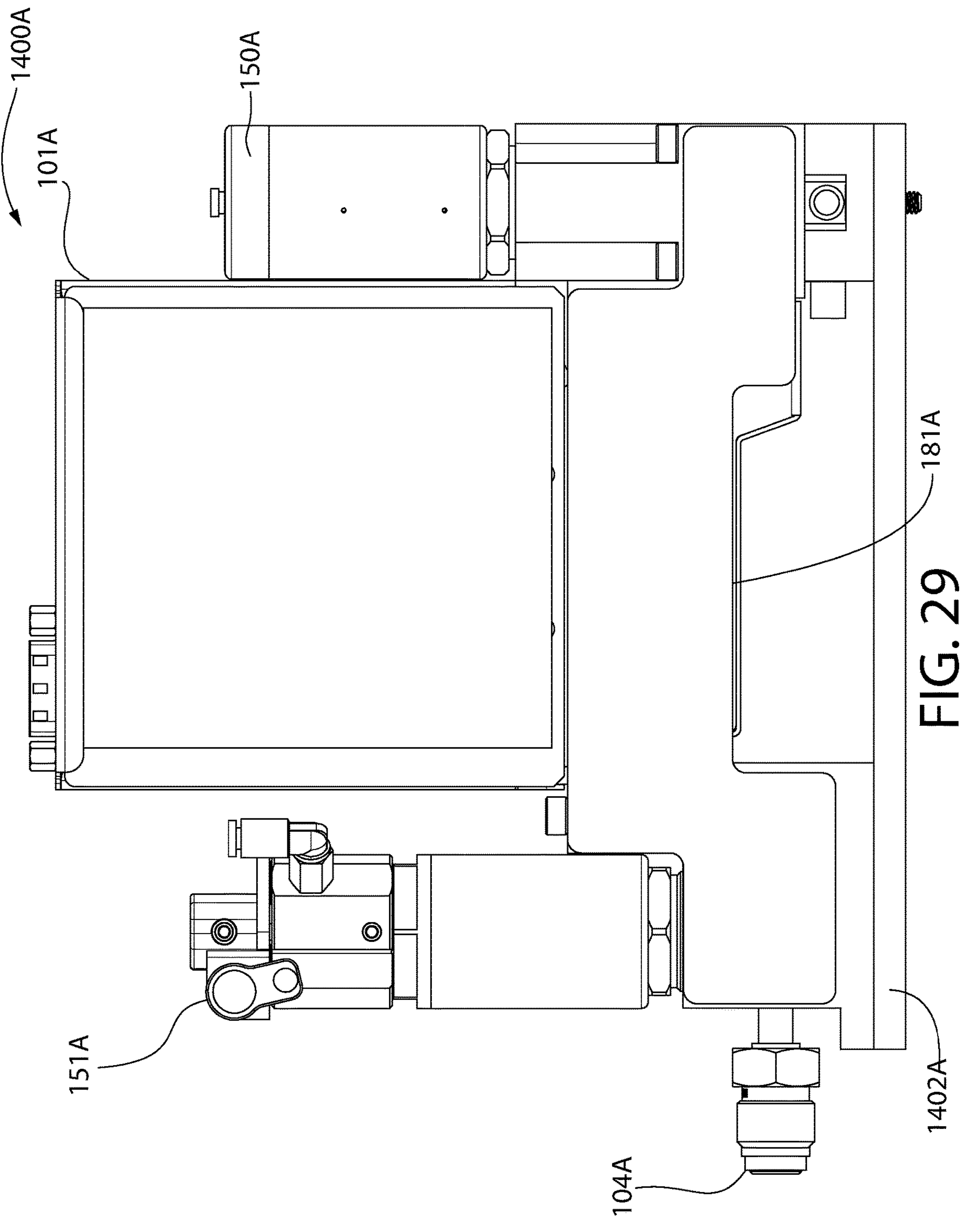
FIG. 29 is a left side view of the fluid delivery module of FIG. 27.
Figure 30:
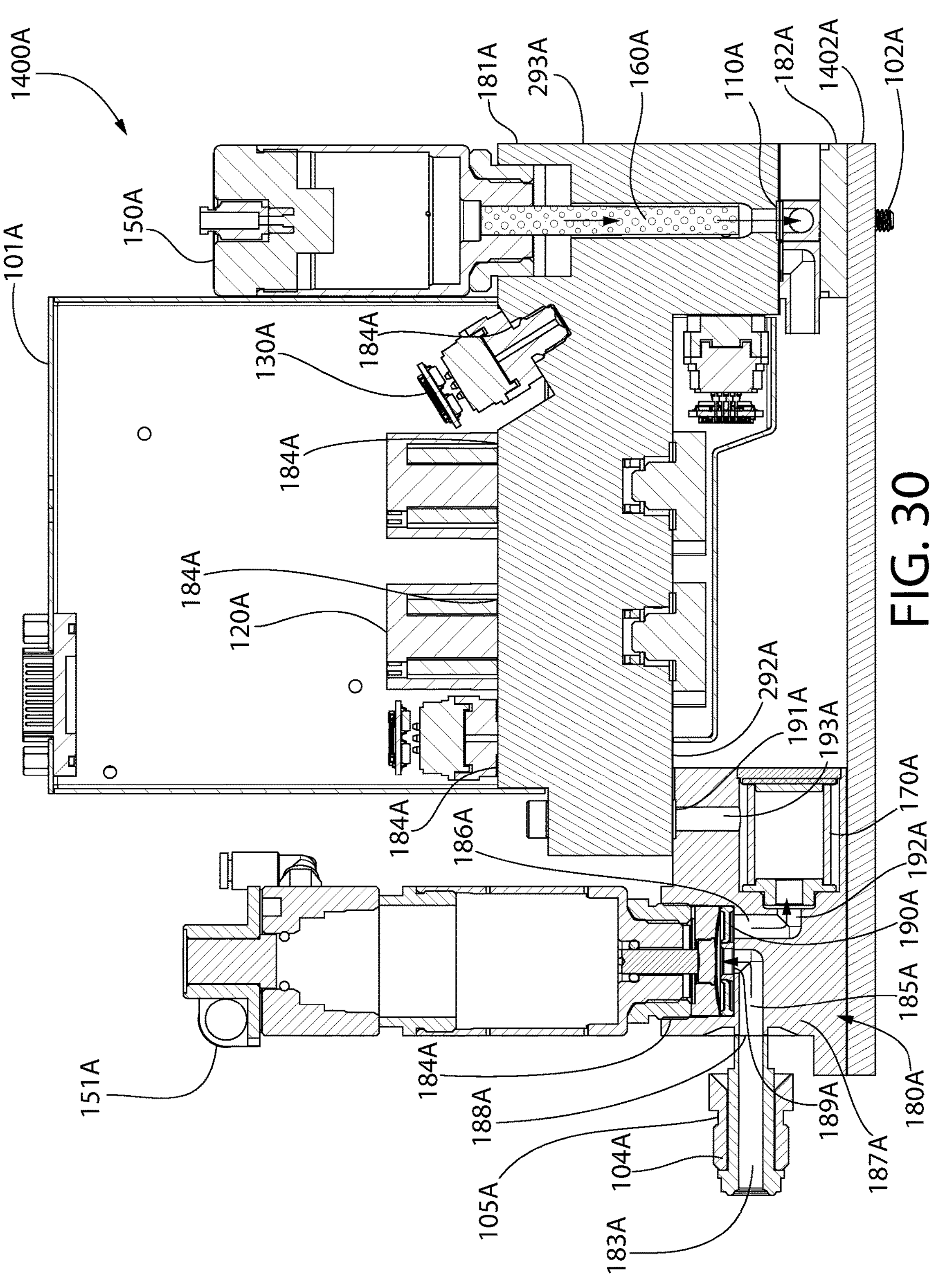
FIG. 30 is a cross-sectional view of the fluid delivery module of FIG. 28, taken along line XXX-XXX.
Figure 31:
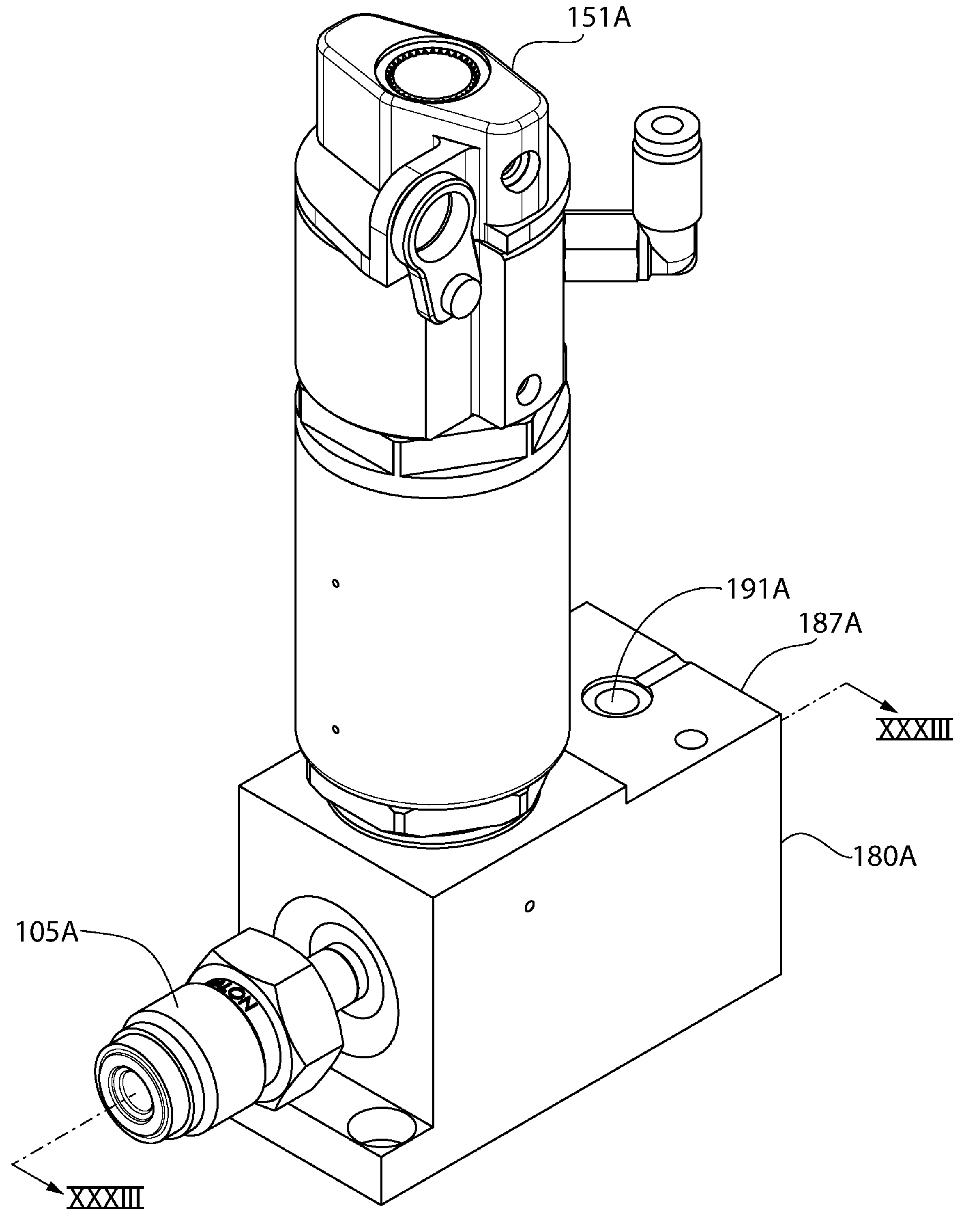
FIG. 31 is a perspective view of a substrate block and an active fluid flow component, the substrate block and active fluid flow component forming a portion of the mass flow controller of FIG. 27.
Figure 32:
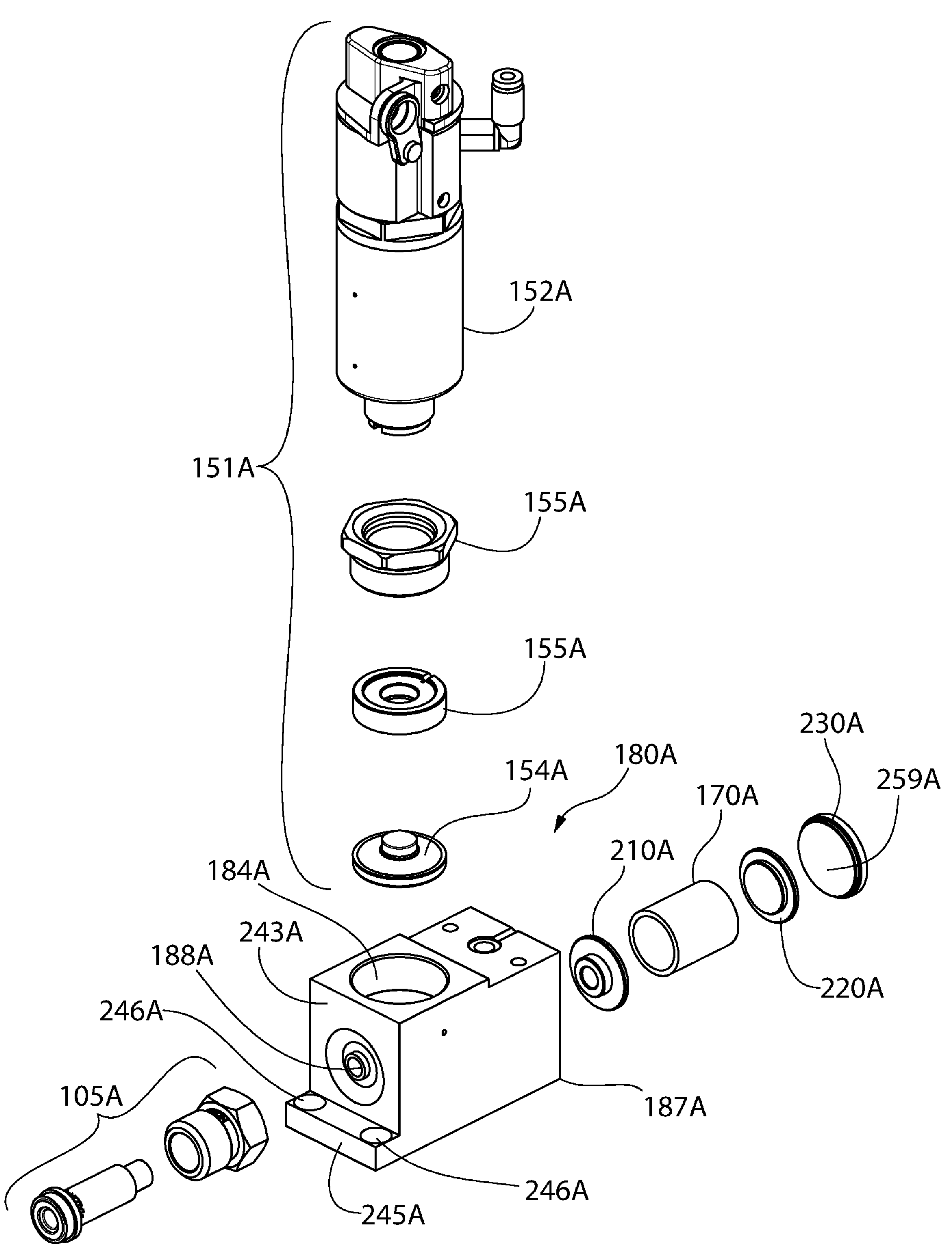
FIG. 32 is an exploded view of the substrate block and active fluid flow component of FIG. 31.
Figure 33:
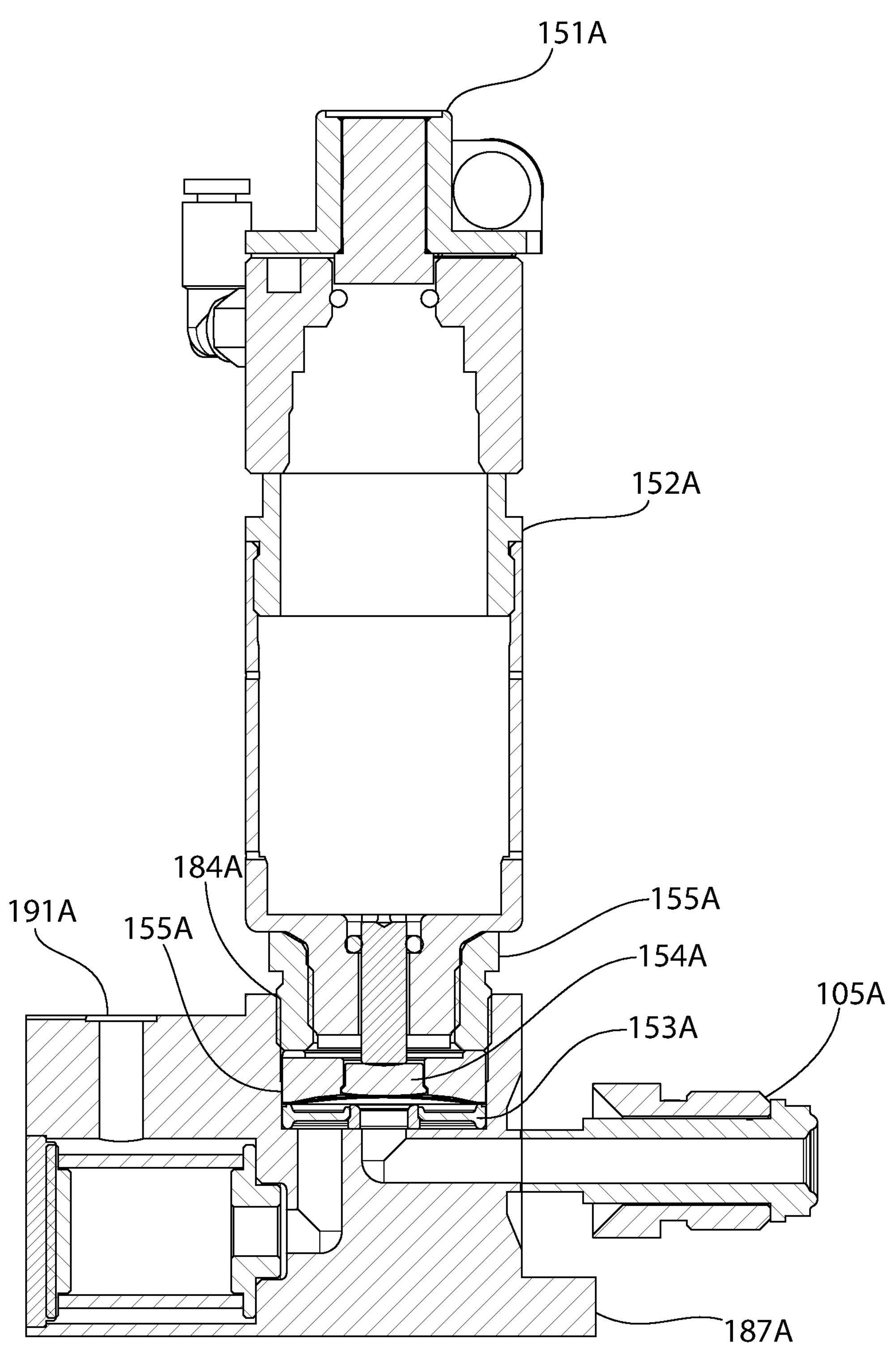
FIG. 33 is a cross-sectional view of the substrate block and active fluid flow component of FIG. 31 taken along the line XXXIII-XXXIII.
Figure 34:
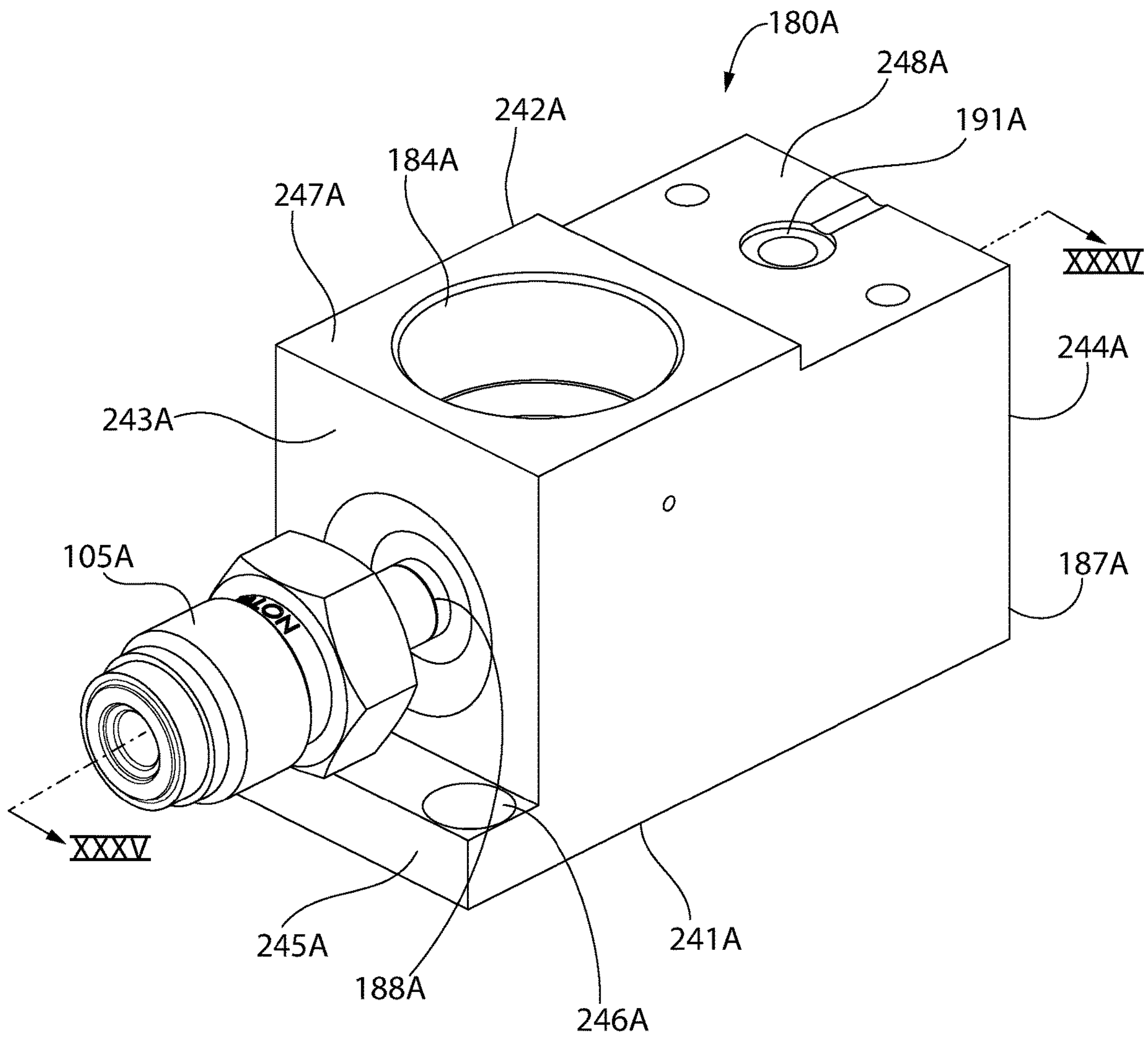
FIG. 34 is a perspective view of the substrate block of FIG. 31.
Figure 35:
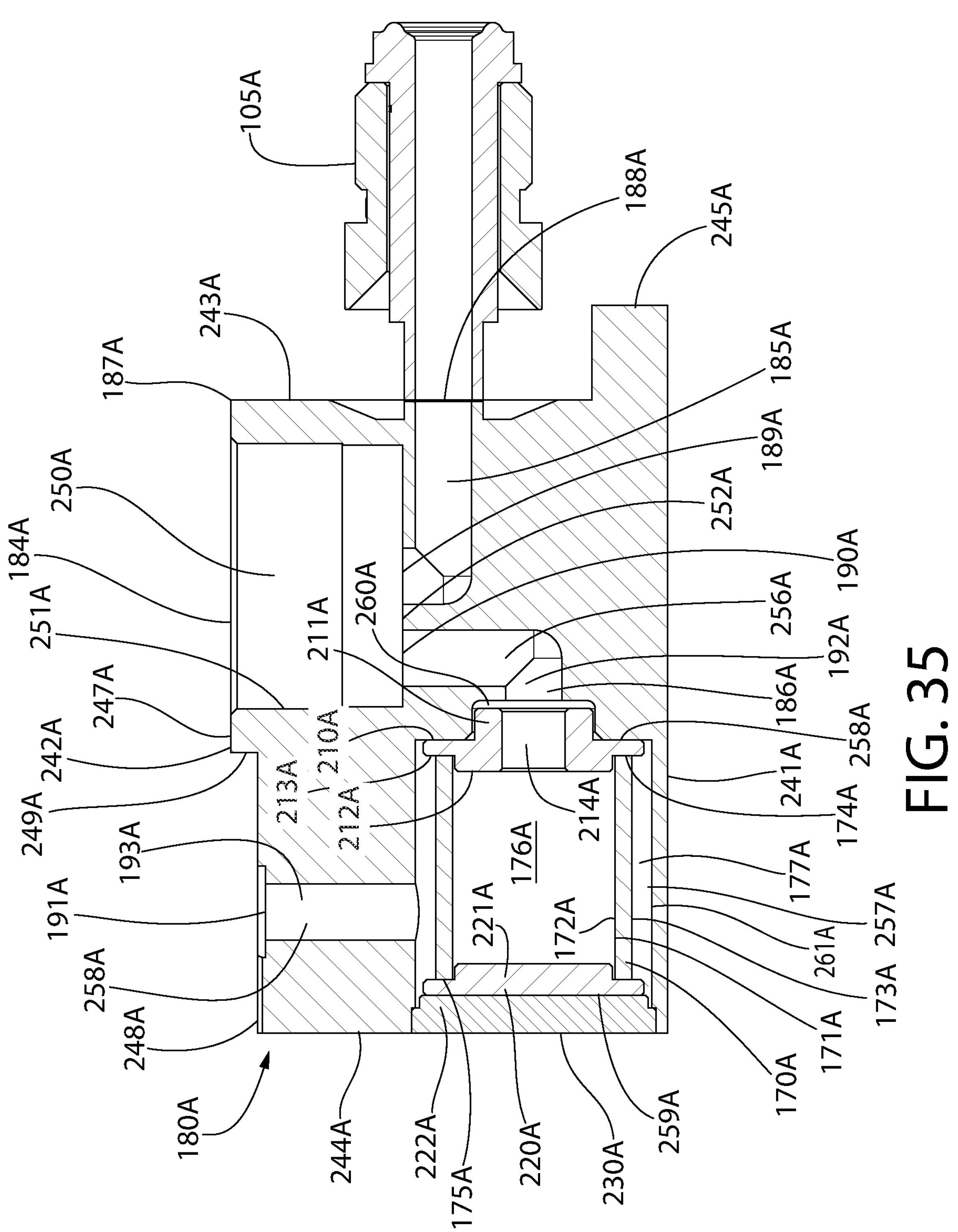
FIG. 35 is a cross-sectional view of the substrate block of FIG. 34 taken along the line XXXV-XXXV.

Turning to FIGS. 28-30, the fluid delivery module 1400A comprising the mass flow controller 101A is shown in greater detail. The fluid delivery module 1400A comprises a support structure 1402A. The support structure 1402A may be referred to as a base substrate and is generally a flat plate or sheet with one or more apparatuses for controlling flow 100A mounted thereon. In the present example, the mass flow controller 101A is mounted to the support structure 1402A. The support structure 1402A has a top surface 1403A onto which the apparatuses for controlling flow 100A are mounted.

The mass flow controller 101A comprises an inlet 104A, an inlet control valve 151A, a proportional valve 120A, a P1 volume 106A, a P1 pressure transducer 130A, a valve 150A, a flow restrictor 160A, and an outlet 110A. Fluid flows from the inlet 104A to the outlet 110A as discussed above with respect to FIG. 27. A first substrate block 180A, component block 181A, and a second substrate block 182A receive the inlet control valve 151A, proportional valve 120A, P1 pressure transducer 130A, valve 150A, and flow restrictor 160A. A flow path 183A extends from the inlet 104A to the outlet 110A.

The first substrate block 180A, the inlet control valve 151A, and the filter media 170A may be collectively referred to as the first active component assembly 280A. The first active component assembly 280A also includes those supporting components required to mount and seal the filter media 170A as will be discussed in detail below. The component block 181A, the second substrate block, the proportional valve 120A, P1 volume 106A, P1 pressure transducer 130A, valve 150A, and flow restrictor 160A all form a second active flow component assembly 290A.

Each of the inlet control valve 151A, proportional valve 120A, P1 pressure transducer 130A, and valve 150A are located at component receiving ports 184A. Each of the component receiving ports 184A is configured to receive an active flow component such as the inlet control valve 151A, proportional valve 120A, P1 pressure transducer 130A, and valve 150A. The active flow components may include sensors, valves, or other components which actively control or measure flow. The component receiving ports 184A may have a variety of configurations so that some active flow components may only be mounted in certain component receiving ports 184A. Thus, the component receiving ports 184A need not all be identical. In other embodiments, the component receiving ports 184A are configured to accept a variety of different active components to permit reconfiguring the apparatus for controlling flow 100A.

The first substrate block 180A comprises a monolithic body 187A. The monolithic body 187A is an integrally formed, monolithic, component which is formed as a single piece. The monolithic body 187A comprises a component receiving port 184A. An inlet fitting 105A forms the inlet 104A and is coupled to the monolithic body 187A by welding, bonding, compression or interference fitting, or any other known means. The monolithic body 187A comprises a first fluid pathway 185A of the fluid flow path 183A extending from a first inlet opening 188A to a first outlet opening 189A. The first outlet opening 189A is formed in the component receiving port 184A of the monolithic body 187A. A second fluid pathway 186A extends through the monolithic body 187A from a second inlet opening 190A formed in the component receiving port 184A to a second outlet opening 191A formed in the monolithic body 187A. The second outlet opening 191A fluidly connects the fluid flow path 183A from the inlet 104A to the component block 181A, ensuring that fluid can flow from the inlet 104A to the active components mounted on the component block 181A.

As can be seen, the filter media 170A is located within the second fluid pathway 186A. The filter media 170A divides the second fluid pathway 186A into a pre-filter section 192A and a post-filter section 193A. The inlet control valve 151A is mounted to the component receiving port 184A of the monolithic body 187A and fluidly coupled to each of the first outlet opening 189A and the second inlet opening 190A. Thus, the inlet control valve 151A controls flow of fluid from the inlet 104A to the second outlet opening 191A. In addition, the filter media 170A filters the fluid to ensure that the other active components receive filtered fluid, improving reliability of the apparatus 100A and ensuring a minimum of contaminants reach the process chamber 1300A.

The flow path 183A further comprises fluid pathways (not shown) which conduct fluid from the first substrate block 180A to the outlet 110A. The fluid pathways extend through the component block 181A and, optionally, through the second substrate block 182A. The component block 181A has a first end portion 292A and a second end portion 293A, with the second end portion protruding horizontally beyond the first substrate block 181A. The first end portion 292A is coupled to the first substrate block 180A so that the fluid pathways of the second active flow component assembly 290A are fluidly coupled to the second outlet opening 191A. Thus, the second fluid pathway 186A of the first substrate block 180A is fluidly coupled to the fluid pathways of the second active flow component assembly 290A via the second outlet opening 191A.

The flow path 183A extends from the inlet 104A to the outlet 110A via the first fluid pathway 185A, the second fluid pathway 186A, and the fluid pathways of the second active flow component assembly 290A. The second end portion 293A of the component block 181A is coupled to the second substrate block 182A, and the second substrate block 182A is fastened to the top surface 1403A of the support structure 1402A, typically via fasteners 102A extending into the support structure 1402A. Stated differently, the second end portion 293A of the component block is mounted to the support structure 1402A via the second substrate block 182A.

Turning to FIGS. 31-35, the inlet control valve 151A and the first substrate block 180A will be described in greater detail. The inlet control valve 151A comprises a valve body 152A, a valve seat, 153A, and a closure member 154A in addition to various mounting components 155A required to position and secure the valve body 152A, valve seat 153A, and closure member 154A and permit operation of the inlet control valve 151A. The inlet control valve 151A moves the closure member 154A such that it moves from an open state where it is spaced from the valve seat 153A to a closed state where it is in contact with the valve seat 153A. The inlet control valve 151A is directly mounted to the component receiving port 184A, with the inlet control valve 151A solely and exclusively supported by the first substrate block 180A.

The inlet control valve 151A may be referred to as the first active component. The inlet control valve 151A may be a lock out tag out valve. Such valves are used to ensure safety when equipment is being serviced. In this implementation, the inlet control valve 151A may be locked out with a mechanical lock, ensuring that the inlet control valve 151A remains in the closed state. The inlet control valve 151A may also be tagged so that it is readily apparent to an equipment technician that the inlet control valve 151A is in the closed state. Typically, any device which is locked out and tagged is described generally with the term "lock out tag out." Lock out tag out valves may be referred to as "LOTO" valves.

The first substrate block 180A comprises the inlet fitting 105A, which is formed of two separate components as shown. The first substrate block 180A also comprises the monolithic body 187A and the filter media 170A as discussed above. In addition, the first substrate block 180A comprises a first annular gasket 210A, a second gasket 220A, and an end cap 230A.

Turning to the monolithic body 187A, the monolithic body has a bottom surface 241A, a top surface 242A, a first sidewall surface 243A, and a second sidewall surface 244A. The first inlet opening 188A is formed into the first sidewall surface 243A. A flange portion 245A extends horizontally from a bottom of the first sidewall surface 243A. A plurality of fasteners extend through the flange portion 245A to join the first substrate block 180A to the support structure 1402A. The fasteners secure the bottom surface 241A of the monolithic body 187A to the top surface 1403A of the support structure 1402A and extend through fastener passageways 246A formed in the flange portion 245A. Fasteners such as the fasteners 102A discussed above may be utilized. The fasteners 102A may be threaded or may be any other type of fastener suitable for attaching the first substrate block 180A to the support structure 1402A.

The top surface 242A comprises a first section 247A, and a second section 248A. The component receiving port 184A is formed into the first section 247A while the second outlet opening 191A is formed into the second section 248A. The first section 247A is vertically offset from the second section 248A. The first section 247A is higher than the second section 248A. An upstanding wall 249A is located between the first and second sections 247A, 248A of the top surface 242A. The first and second sections 247A, 248A are substantially parallel.

The component receiving port 184A comprises a basin 250A, the basin having a basin floor 252A and a collar portion 251A extending from the basin floor 252A to the first section 247A of the top surface 242A. The first outlet opening 189A and the second inlet opening 190A are formed into the basin floor 252A of the component receiving port 184A. The collar portion 251A forms at least a portion of the component receiving port 184A as noted above, the collar portion 251A being located between the basin floor 252A and the first section 247A of the top surface 242A.

Turning to the second fluid pathway 186A, the second fluid pathway 186A comprises the pre-filter section 192A and the post-filter section 193A as discussed above. The second fluid pathway 186A comprises a pre-filter passage 256A, a filter chamber 257A, and a post-filter passage 258A. The pre-filter passage 256A extends from the second inlet opening 190A to the filter chamber 257A. The post-filter passage 258A extends from the filter chamber 257A to the second outlet opening 191A. The filter media 170A is positioned within the filter chamber 257A.

The filter chamber 257A is bounded by a pocket formed into the second sidewall surface 244A of the monolithic body 187A and the end cap 230A. The filter media 170A is positioned within the filter chamber 257A. The filter media 170A comprises a tubular filter body 171A, the tubular filter body 171A having an inner surface 172A, an outer surface 173A, a first edge 174A, and a second edge 175A. The inner surface 172A of the tubular body defines a central filter cavity 176A. A post-filter annulus 177A is formed between the outer surface 173A and an inner surface 261A of the filter chamber 257A. Thus, the central filter cavity 176A forms a portion of the pre-filter section 192A while the post-filter annulus 177A forms a portion of the post-filter section 193A. The filter media 170A divides the pre-filter section 192A and the post-filter section 193A.

The filter media 170A is supported within the filter chamber 257A so that the post-filter annulus 177A is maintained. The post-filter annulus 177A is spaced and isolated from the inner surface 261A so that fluid can pass through the post-filter annulus 177A to the post-filter passage 258A. The pre-filter passage 256A is in fluid communication with the central filter cavity 176A while the post-filter annulus 177A is in fluid communication with the post-filter passage 258A.

The first annular gasket 210A is positioned within the filter chamber 257A and abuts a first end wall 258A of the filter chamber 257A. The second gasket 220A is positioned within the filter chamber 257A and abuts a second end wall 259A of the filter chamber 257A. The end cap 230A forms the second end wall 259A, the end cap 230A being secured to the monolithic body 187A by welding, gluing, brazing, a threaded or press-fit connection, or any other known means. The end cap 230A encloses the filter chamber 257A so that it is isolated from the ambient environment.

The first annular gasket 210A has a first hub portion 211A, second hub portion 212A, and a flange portion 213A between and protruding from the first and second hub portions 211A, 212A. A central passage 214A extends through the first and second hub portions 211A, 212A. The central passage 214A fluidly couples the pre-filter passage 256A with the central filter cavity 176A. The first annular gasket 210A is positioned such that the first hub portion 211A fits within a depression 260A formed in the first end wall 258A of the filter chamber 257A. In other words, the first annular gasket 210A is positioned so that the first hub portion 211A nests within the depression 260A. The second hub portion 212A extends into the central filter cavity 176A, providing positioning of the filter media 171A. A first seal is formed between the first end wall 258A and the first edge 174A of the tubular filter body 171A. The first seal is formed by compressing the flange portion 213A of the first annular gasket 210A between the first end wall 258A and the first edge 174A of the tubular filter body 171A.

The second gasket 220A is positioned within the filter chamber 257A. The second gasket 220A comprises a hub portion 221A and a flange portion 222A. The second gasket 220A is positioned within the filter chamber 257A such that the flange portion 222A abuts the second end wall 259A of the filter chamber 257A. The second edge 175A of the tubular filter body 171A engages the flange portion 222A of the second gasket 220A and the flange portion 222A is in contact with the second end wall 259A. The flange portion 222A is compressed between the second edge 175A of the tubular filter body 171A and the second end wall 259A of the filter chamber 257A. This forms a second seal between the second edge 175A of the tubular filter body 171A and the second end wall 259A of the filter chamber 257A. Thus, the filter media 170A is under compression within the filter chamber 257A and is sealed at the first edge 174A and the second edge 175A by virtue of the first annular gasket 210A and the second gasket 210A. The hub portion 221A extends into the central filter cavity 176A and provides positioning for the filter media 170A.

Figure 36:
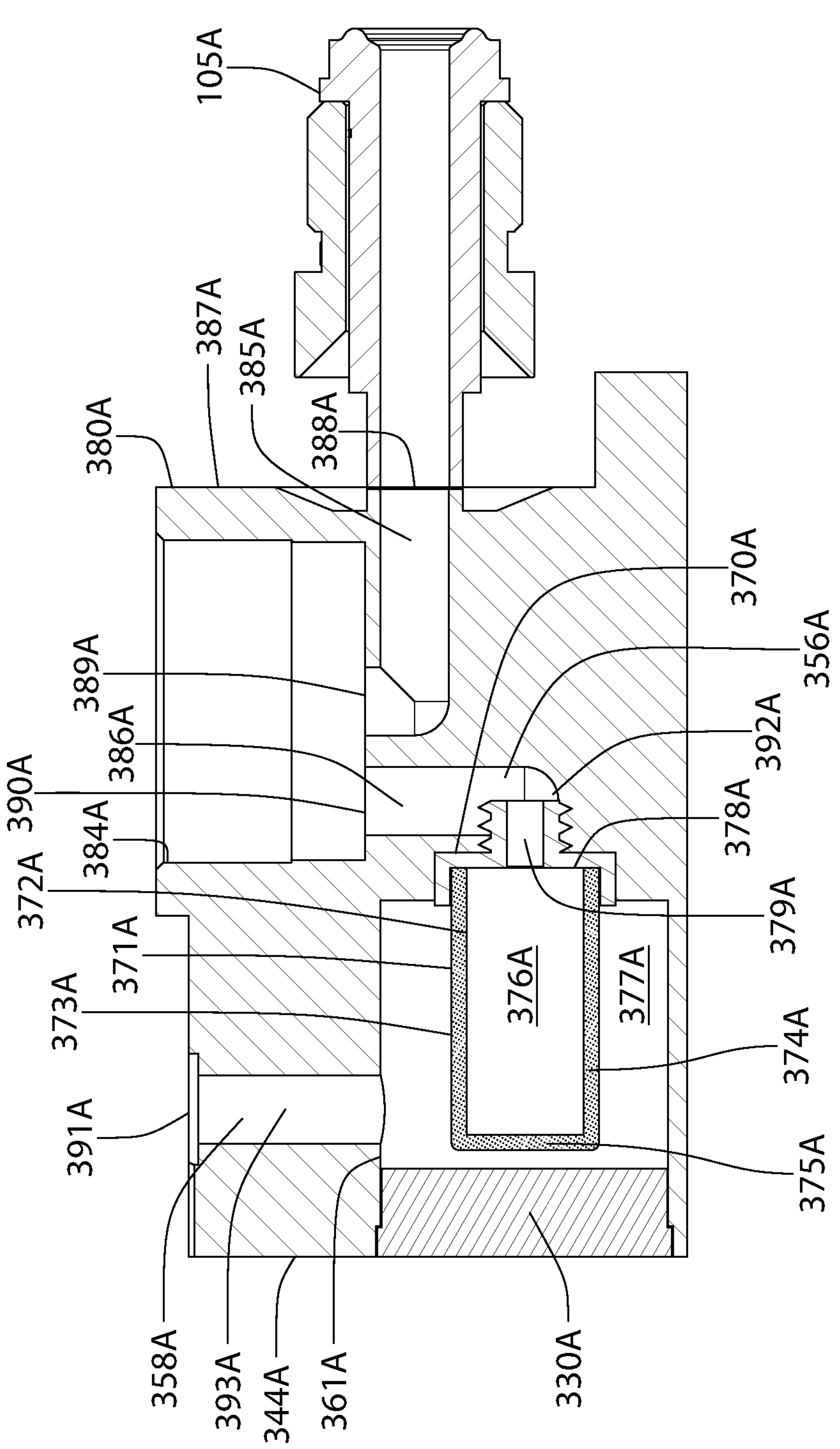
FIG. 36 is a schematic cross-sectional view of an alternate embodiment of the substrate block of FIG. 34 taken along the line XXXVI-XXXVI.

Turning to FIG. 36, an alternate embodiment of a first substrate block 380A and filter media 370A are illustrated. In the present embodiment, the filter media 370A is configured as a cup filter rather than a cylindrical filter. The first substrate block 380A is identical to the first substrate block 180A with the exception of changes to accommodate the filter media 370A. Once again, the first substrate block 380A comprises a monolithic body 387A, the filter media 370A, an end cap 330A, and the inlet fitting 105A, the inlet fitting 105A coupled to the monolithic body 387A by welding, bonding, compression or interference fitting, or any other known means. The monolithic body 387A is an integrally formed, monolithic, component which is formed as a single piece. The monolithic body 387A comprises a component receiving port 384A to receive a fluid flow component such as the inlet control valve 151A.

The monolithic body 387A further comprises a first fluid pathway 385A of the fluid flow path 183A extending from a first inlet opening 388A to a first outlet opening 389A. The first outlet opening 389A is formed in the component receiving port 384A of the monolithic body 387A. A second fluid pathway 386A extends through the monolithic body 387A from a second inlet opening 390A formed in the component receiving port 384A to a second outlet opening 391A formed in the monolithic body 387A. The second outlet opening 391A fluidly connects the fluid flow path 183A from the inlet 104A to the component block 181A, ensuring that fluid can flow from the inlet 104A to the active components mounted on the component block 181A.

As can be seen, the filter media 370A is located within the second fluid pathway 386A. The filter media 370A divides the second fluid pathway 386A into a pre-filter section 392A and a post-filter section 393A. The inlet control valve 151A is mounted to the component receiving port 384A of the monolithic body 387A and fluidly coupled to each of the first outlet opening 389A and the second inlet opening 390A. Thus, the inlet control valve 151A controls flow of fluid from the inlet 104A to the second outlet opening 391A. In addition, the filter media 370A filters the fluid to ensure that the other active components receive filtered fluid, improving reliability of the apparatus 100A and ensuring a minimum of contaminants reach the process chamber 1300A.

Discussing the second fluid pathway 386A in greater detail, the second fluid pathway 386A comprises the pre-filter section 392A and the post-filter section 393A as discussed above. The second fluid pathway 386A comprises a pre-filter passage 356A, a filter chamber 357A, and a post-filter passage 358A. The pre-filter passage 356A extends from the second inlet opening 390A to the filter chamber 357A. The post-filter passage 358A extends from the filter chamber 357A to the second outlet opening 391A. The filter media 370A is positioned within the filter chamber 357A.

The filter chamber 357A is bounded by a pocket formed into a second sidewall surface 344A of the monolithic body 387A and the end cap 330A. The filter media 370A is positioned within the filter chamber 357A. The filter media 370A comprises a cup-shaped filter body 371A, the filter body 371A having an inner surface 372A, an outer surface 373A, a cylindrical portion 374A, a first end portion 375A, and a second end portion 378A. The inner surface 372A of the filter body 371A defines a central filter cavity 376A. A post-filter annulus 377A is formed between the outer surface 373A and an inner surface 361A of the filter chamber 357A. Thus, the central filter cavity 376A forms a portion of the pre-filter section 392A while the post-filter annulus 377A forms a portion of the post-filter section 393A. The filter media 370A divides the pre-filter section 392A and the post-filter section 393A.

The filter media 370A is supported within the filter chamber 357A by the second end portion 378A so that the post-filter annulus 377A is maintained. The post-filter annulus 377A is spaced and isolated from the inner surface 361A so that fluid can pass through the post-filter annulus 377A to the post-filter passage 358A. The pre-filter passage 356A is in fluid communication with the central filter cavity 376A while the post-filter annulus 377A is in fluid communication with the post-filter passage 358A. In addition, the first end portion 375A is spaced and isolated from the end cap 330A, maximizing the area for fluid flow through the filter media 370A.

The second end portion 378A is formed of a solid material that is non-permeable to fluid and has an aperture 379A arranged therethrough. The second end portion 378A engages the inner surface 361A of the filter chamber 357A such that the aperture 379A and the second fluid pathway 386A is aligned with the aperture 379A to permit passage of fluid therethrough. The second end portion 378A may incorporate a threaded portion to engage the monolithic body 387A, or it may be pressed, welded, bonded, or otherwise attached in any known means to secure the filter media 370A within the filter chamber 357A.

Figure 37:
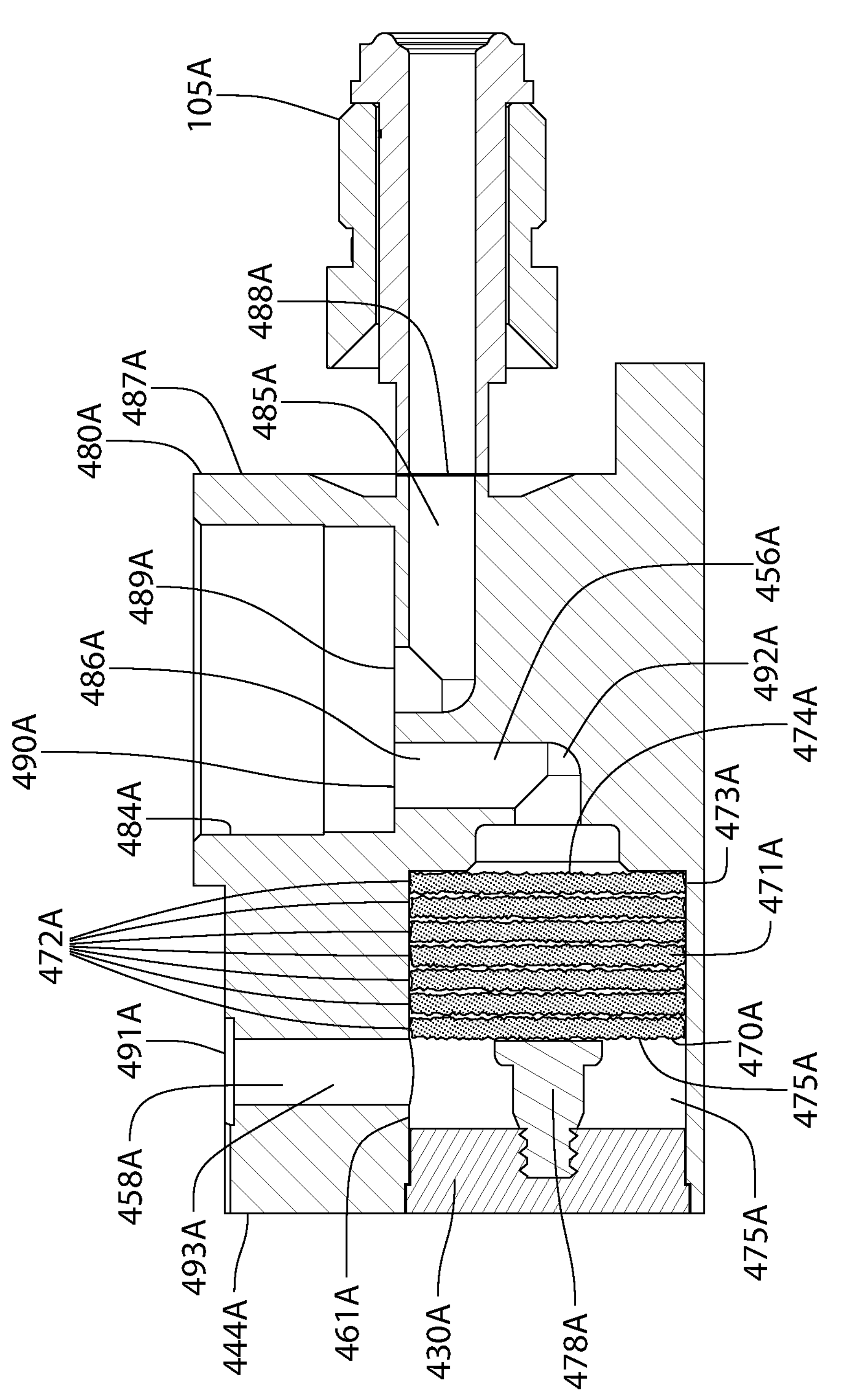
FIG. 37 is a schematic cross-sectional view of an alternate embodiment of the substrate block of FIG. 34 taken along the line XXXVII-XXXVII.

Turning to FIG. 37, yet another embodiment of a first substrate block 480A and filter media 470A are illustrated. In the present embodiment, the filter media 470A is configured as a disc filter comprising a plurality of stacked discs. The substrate block 480A is identical to the substrate block 180A with the exception of changes to accommodate the filter media 470A. Once again, the first substrate block 480A comprises a monolithic body 487A, the filter media 470A, an end cap 430A, and the inlet fitting 105A, the inlet fitting 105A coupled to the monolithic body 487A by welding, bonding, compression or interference fitting, or any other known means. The monolithic body 487A is an integrally formed, monolithic, component which is formed as a single piece. The monolithic body 487A comprises a component receiving port 484A to receive a fluid flow component such as the inlet control valve 151A.

The monolithic body 487A further comprises a first fluid pathway 485A of the fluid flow path 183A extending from a first inlet opening 488A to a first outlet opening 489A. The first outlet opening 489A is formed in the component receiving port 484A of the monolithic body 487A. A second fluid pathway 486A extends through the monolithic body 487A from a second inlet opening 490A formed in the component receiving port 484A to a second outlet opening 491A formed in the monolithic body 487A. The second outlet opening 491A fluidly connects the fluid flow path 183A from the inlet 104A to the component block 181A, ensuring that fluid can flow from the inlet 104A to the active components mounted on the component block 181A.

As can be seen, the filter media 470A is located within the second fluid pathway 486A. The filter media 470A divides the second fluid pathway 486A into a pre-filter section 492A and a post-filter section 493A. The inlet control valve 151A is mounted to the component receiving port 484A of the monolithic body 487A and fluidly coupled to each of the first outlet opening 489A and the second inlet opening 490A. Thus, the inlet control valve 151A controls flow of fluid from the inlet 104A to the second outlet opening 491A. In addition, the filter media 470A filters the fluid to ensure that the other active components receive filtered fluid, improving reliability of the apparatus 100A and ensuring a minimum of contaminants reach the process chamber 1300A.

Discussing the second fluid pathway 486A in greater detail, the second fluid pathway 486A comprises the pre-filter section 492A and the post-filter section 493A as discussed above. The second fluid pathway 486A comprises a pre-filter passage 456A, a filter chamber 457A, and a post-filter passage 458A. The pre-filter passage 456A extends from the second inlet opening 490A to the filter chamber 457A. The post-filter passage 458A extends from the filter chamber 457A to the second outlet opening 491A. The filter media 470A is positioned within the filter chamber 457A.

The filter chamber 457A is bounded by a pocket formed into a second sidewall surface 444A of the monolithic body 487A and the end cap 430A. The filter media 470A is positioned within the filter chamber 457A. The filter media 470A comprises a disc-shaped filter body 471A, the filter body 471A having a plurality of filter discs 472A, an outer surface 473A, a first end 474A, a second end 475A, and a retention portion 478A. The filter discs 472A may be formed of a porous or woven material to permit fluid to flow axially along the filter body 471A from the first end 474A to the second end 475A. Alternately, a passage may be formed through a center of the filter discs 472A and fluid may flow through the passage, then radially outward between the filter discs 472A, then flow between the outer surface 473A and an inner surface 461A of the filter chamber 457A. In either configuration, the filter media 470A is installed within the filter chamber 457A such that fluid must flow through the filter media 470A to exit the filter chamber 457A. In the present configuration, the first end 474A defines the end of the pre-filter section 492A while the second end 475A defines the beginning of the post-filter section 393A. Thus, the filter media 470A divides the pre-filter section 492A and the post-filter section 493A.

The filter media 470A is supported within the filter chamber 457A by the retention portion 478A so that the filter media 470A is maintained in position with the filter chamber 457A. The retention portion incorporates threads which engage corresponding threads in the end cap 430A. In alternate embodiments, the retention portion 478A may omit the threads and simply abut the end cap 430A or be omitted. The filter media 470A may be retained by press-fit, adhesive, or other means. In yet other embodiments, the retention portion 478A may be omitted and retention features may be incorporated into the end cap 430A. The retention portion 478A retains the filter media in position within the filter chamber 457A so that fluid can pass through the filter media 470A to the post-filter passage 458A. The pre-filter passage 456A is in fluid communication with the first end 474A while the second end 475A is in fluid communication with the post-filter passage 458A. As can be seen, the second end 475A is spaced and isolated from the end cap 430A, maximizing the area for fluid flow through the filter media 470A.

Figure 38:
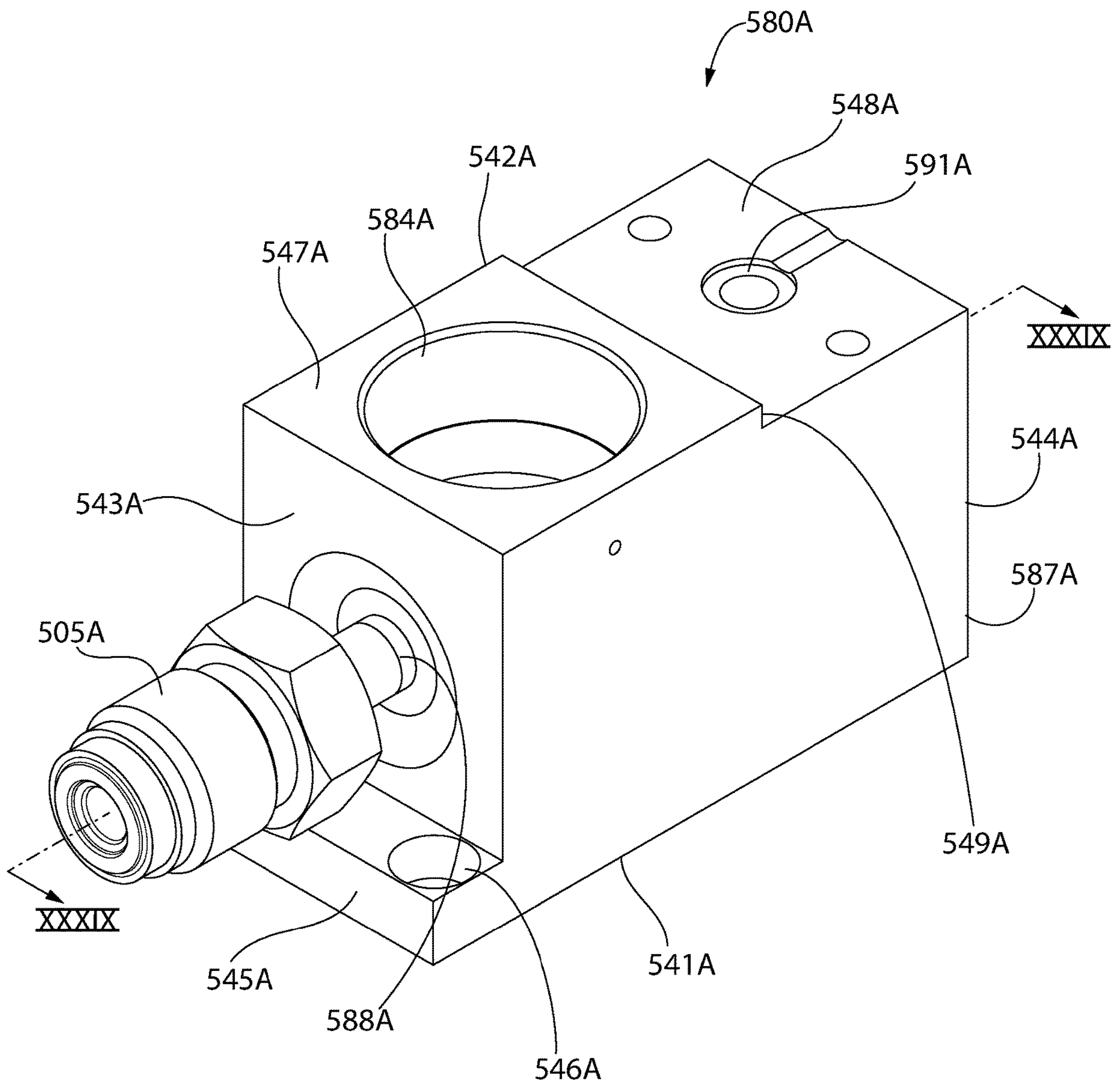
FIG. 38 is a perspective view of another embodiment of a substrate block as may be utilized in an active fluid flow component.
Figure 39:
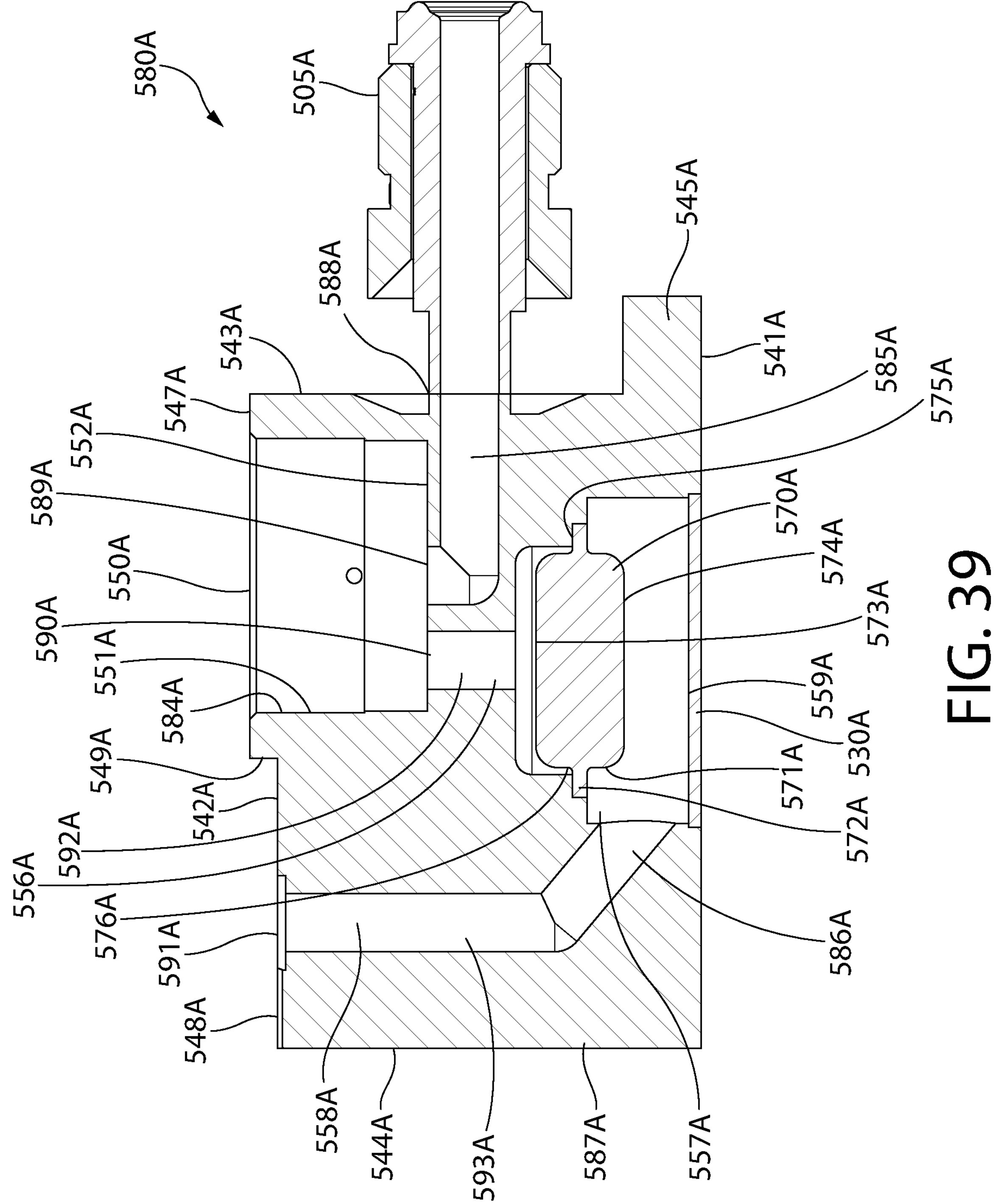
FIG. 39 is a cross-sectional view of the substrate block of FIG. 38 taken along the line XXXIX-XXXIX.

FIGS. 38 and 39 illustrate another alternate embodiment of a first substrate block 580A. The first substrate block 580A comprises the inlet fitting 505A. The inlet fitting 505A is identical to the inlet fitting 105A, which is formed of two separate components as discussed above. The first substrate block 580A also comprises a monolithic body 587A and a filter media 570A.

Turning to the monolithic body 587A, the monolithic body has a bottom surface 541A, a top surface 542A, a first sidewall surface 543A, and a second sidewall surface 544A. The first inlet opening 588A is formed into the first sidewall surface 543A. A flange portion 545A extends horizontally from a bottom of the first sidewall surface 543A. A plurality of fasteners extend through the flange portion 545A to join the first substrate block 580A to the support structure 1402A. The fasteners secure the bottom surface 541A of the monolithic body 587A to the top surface 1403A of the support structure 1402A and extend through fastener passageways 546A formed in the flange portion 545A. Fasteners such as the fasteners 102A discussed above may be utilized. The fasteners 102A may be threaded or may be any other type of fastener suitable for attaching the first substrate block 580A to the support structure 1402A.

The top surface 542A comprises a first section 547A, and a second section 548A. A component receiving port 584A is formed into the first section 547A while a second outlet opening 591A is formed into the second section 548A. The first section 547A is vertically offset from the second section 548A. The first section 547A is higher than the second section 548A. An upstanding wall 549A is located between the first and second sections 547A, 548A of the top surface 542A. The first and second sections 547A, 548A are substantially parallel.

The component receiving port 584A comprises a basin 550A, the basin having a basin floor 552A and a collar portion 551A extending from the basin floor 552A to the first section 547A of the top surface 542A. A first outlet opening 589A and a second inlet opening 590A are formed into the basin floor 552A of the component receiving port 584A. The collar portion 551A forms at least a portion of the component receiving port 584A as noted above, the collar portion 551A being located between the basin floor 552A and the first section 547A of the top surface 542A. A first fluid pathway 586A is formed between the first outlet opening 589A and the first inlet opening 588A.

A second fluid pathway 586A comprises a pre-filter section 592A and a post-filter section 593A similar to the embodiments discussed above. The second fluid pathway 586A comprises a pre-filter passage 556A, a filter chamber 557A, and a post-filter passage 558A. The pre-filter passage 556A extends from the second inlet opening 590A to the filter chamber 557A. The post-filter passage 558A extends from the filter chamber 557A to the second outlet opening 591A. The filter media 570A is positioned within the filter chamber 557A.

The filter chamber 557A is bounded by a pocket formed into the bottom surface 541A of the monolithic body 587A and an end cap 530A. The filter media 570A is positioned within the filter chamber 557A. The filter media 570A comprises a generally disc-shaped filter body 571A and an annular flange 572A extending from the filter body 571A. The filter body 571A extends from a top surface 573A to a bottom surface 574A, fluid flowing through the filter media 570A from the top surface 573A to the bottom surface 574A. Thus, the top surface 573A of the filter media defines a boundary of the pre-filter section 592A while the bottom surface 574A defines a boundary of the post-filter section 593A. The filter media 570A divides the pre-filter section 592A and the post-filter section 593A. The filter body 571A of the filter media 570A has a generally cylindrical profile, with radii transitioning between an outer diameter 576A and the top and bottom surfaces 573A, 574A. The annular flange 572A extends from the outer diameter 576A of the filter body 571A. The radii may be of a variety of sizes, and the outer diameter 576A may be omitted, with the radii transitioning directly into the annular flange 572A.

The filter media 570A may be porous, woven, or otherwise have open passages which allow fluid flow therethrough. The annular flange 572A is preferably formed of the same material as the rest of the filter media 570A. In other words, the filter media 570A is an integrally formed, monolithic, component. The annular flange 572A may be pressed or welded into a recess 575A formed into the filter chamber 557A. This allows the filter media 570A to seal against the monolithic body 587A without the need for additional seals to ensure that all fluid flows through the filter media 570A. The end cap 530A forms a bottom wall 559A of the filter chamber 557A. The end cap 530A is secured to the monolithic body 587A by welding, gluing, brazing, a threaded or press-fit connection, or any other known means suitable to provide a fluid-tight seal. The end cap 530A encloses the filter chamber 557A so that it is isolated from the ambient environment. Thus, no additional seals are required in order to couple the filter media 570A and the end cap 530A to the monolithic body 587A and ensure that no fluid bypasses the filter media 570A or escapes from the monolithic body 587A proximate the end cap 530A.

Figure 40:
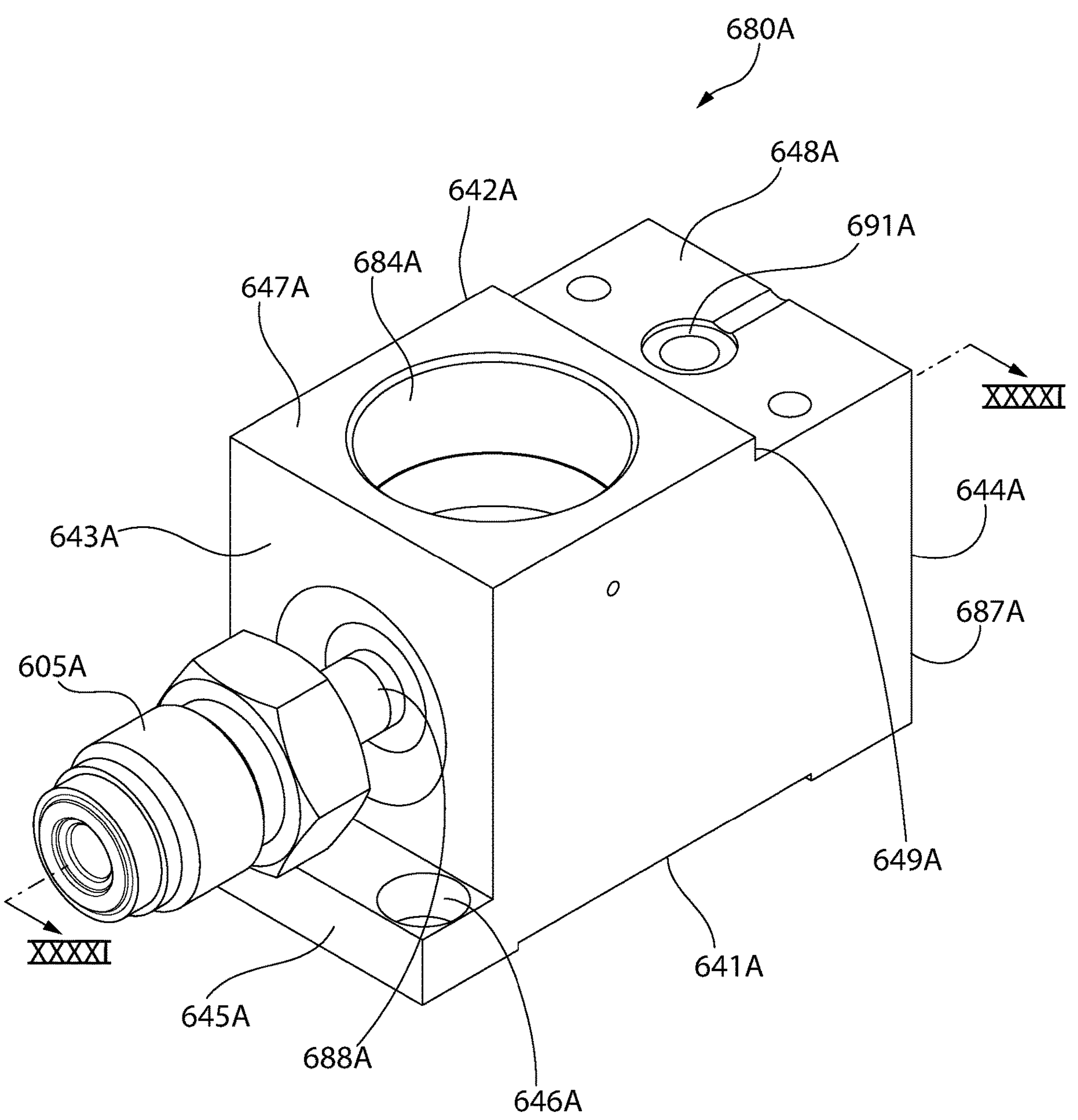
FIG. 40 is a perspective view of another embodiment of a substrate block as may be utilized in an active fluid flow component.
Figure 41:
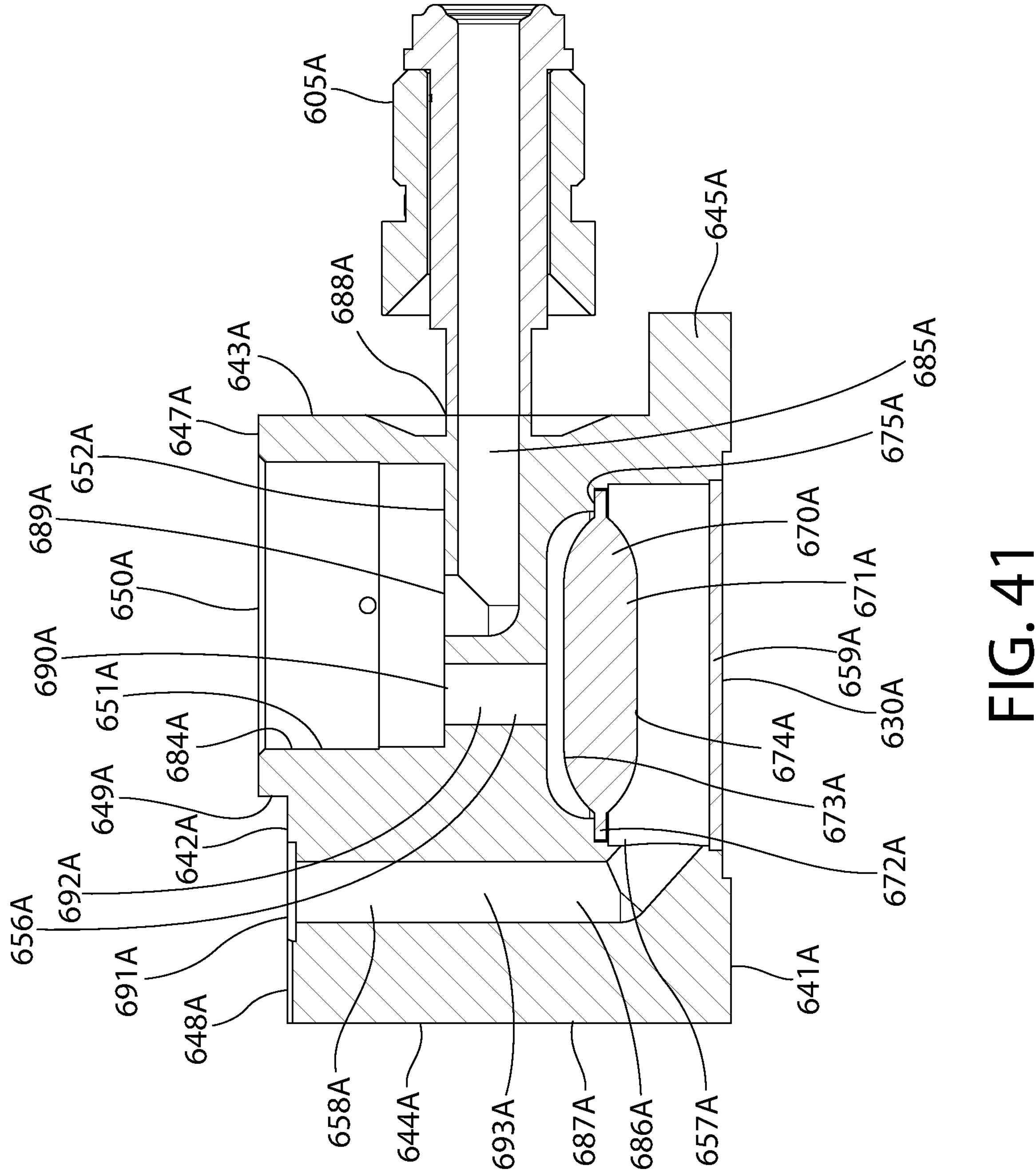
FIG. 41 is a cross-sectional view of the substrate block of FIG. 40 taken along the line XXXXI-XXXXI.

FIGS. 40 and 41 illustrate another alternate embodiment of a first substrate block 680A. The first substrate block 680A comprises the inlet fitting 605A. The inlet fitting 605A is identical to the inlet fitting 105A, which is formed of two separate components as discussed above. The first substrate block 680A also comprises a monolithic body 687A and a filter media 670A.

Turning to the monolithic body 687A, the monolithic body has a bottom surface 641A, a top surface 642A, a first sidewall surface 643A, and a second sidewall surface 644A. The first inlet opening 688A is formed into the first sidewall surface 643A. A flange portion 645A extends horizontally from a bottom of the first sidewall surface 643A. A plurality of fasteners extend through the flange portion 645A to join the first substrate block 680A to the support structure 1402A. The fasteners secure the bottom surface 641A of the monolithic body 687A to the top surface 1403A of the support structure 1402A and extend through fastener passageways 646A formed in the flange portion 645A. Fasteners such as the fasteners 102A discussed above may be utilized. The fasteners 102A may be threaded or may be any other type of fastener suitable for attaching the first substrate block 680A to the support structure 1402A.

The top surface 642A comprises a first section 647A, and a second section 648A. A component receiving port 684A is formed into the first section 647A while a second outlet opening 691A is formed into the second section 648A. The first section 647A is vertically offset from the second section 648A. The first section 647A is higher than the second section 648A. An upstanding wall 649A is located between the first and second sections 647A, 648A of the top surface 642A. The first and second sections 647A, 648A are substantially parallel.

The component receiving port 684A comprises a basin 650A, the basin having a basin floor 652A and a collar portion 651A extending from the basin floor 652A to the first section 647A of the top surface 642A. A first outlet opening 689A and a second inlet opening 690A are formed into the basin floor 652A of the component receiving port 684A. The collar portion 651A forms at least a portion of the component receiving port 684A as noted above, the collar portion 651A being located between the basin floor 652A and the first section 647A of the top surface 642A. A first fluid pathway 686A is formed between the first outlet opening 689A and the first inlet opening 688A.

A second fluid pathway 686A comprises a pre-filter section 692A and a post-filter section 693A similar to the embodiments discussed above. The second fluid pathway 686A comprises a pre-filter passage 656A, a filter chamber 657A, and a post-filter passage 658A. The pre-filter passage 656A extends from the second inlet opening 690A to the filter chamber 657A. The post-filter passage 658A extends from the filter chamber 657A to the second outlet opening 691A. The filter media 670A is positioned within the filter chamber 657A.

The filter chamber 657A is bounded by a pocket formed into the bottom surface 641A of the monolithic body 687A and an end cap 630A. The filter media 670A is positioned within the filter chamber 657A. The filter media 670A comprises a generally disc-shaped filter body 671A and an annular flange 672A extending from the filter body 671A. The filter body 671A extends from a top surface 673A to a bottom surface 674A, fluid flowing through the filter media 670A from the top surface 673A to the bottom surface 674A. Thus, the top surface 673A of the filter media defines a boundary of the pre-filter section 692A while the bottom surface 674A defines a boundary of the post-filter section 693A. The filter media 670A divides the pre-filter section 692A and the post-filter section 693A. The filter body 671A of the filter media 670A has a generally cylindrical profile, with radii transitioning between the annular flange 672A and the top and bottom surfaces 673A, 674A. The annular flange 672A extends from the filter body 671A, with no distinct outer surface due to the large radii used to transition between the annular flange 672A and the top and bottom surfaces 673A, 674A. The radii may be of a variety of sizes.

The filter media 670A may be porous, woven, or otherwise have open passages which allow fluid flow therethrough. The annular flange 672A is preferably formed of the same material as the rest of the filter media 670A. In other words, the filter media 670A is an integrally formed, monolithic, component. The annular flange 672A may be pressed or welded into a recess 675A formed into the filter chamber 657A. This allows the filter media 670A to seal against the monolithic body 687A without the need for additional seals to ensure that all fluid flows through the filter media 670A. The end cap 630A forms a bottom wall 659A of the filter chamber 657A. The end cap 630A is secured to the monolithic body 687A by welding, gluing, brazing, a threaded or press-fit connection, or any other known means suitable to provide a fluid-tight seal. The end cap 630A encloses the filter chamber 657A so that it is isolated from the ambient environment. Thus, no additional seals are required in order to couple the filter media 670A and the end cap 630A to the monolithic body 687A and ensure that no fluid bypasses the filter media 670A or escapes from the monolithic body 687A proximate the end cap 630A.

Figure 42:
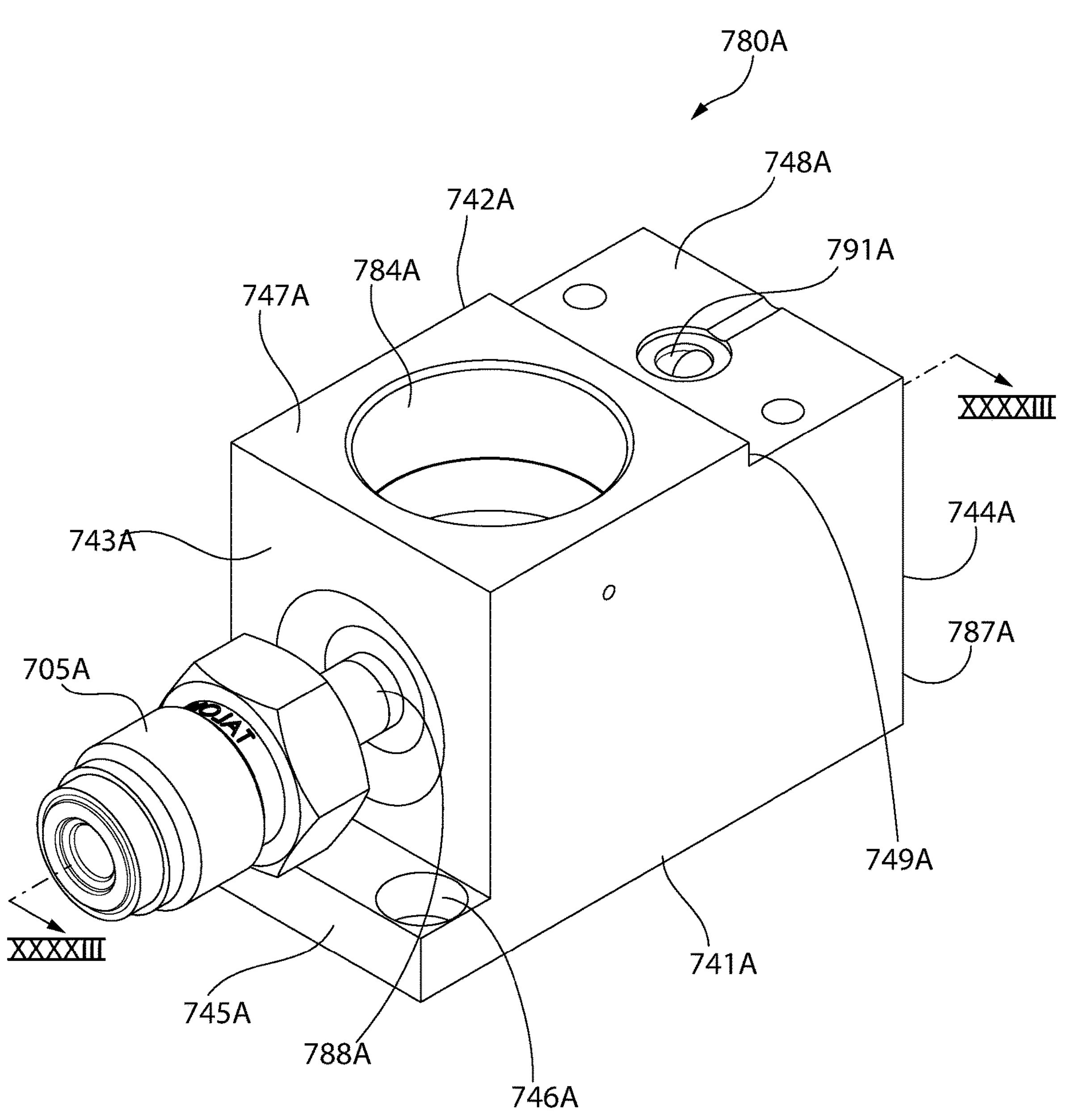
FIG. 42 is a perspective view of another embodiment of a substrate block as may be utilized in an active fluid flow component.
Figure 43:
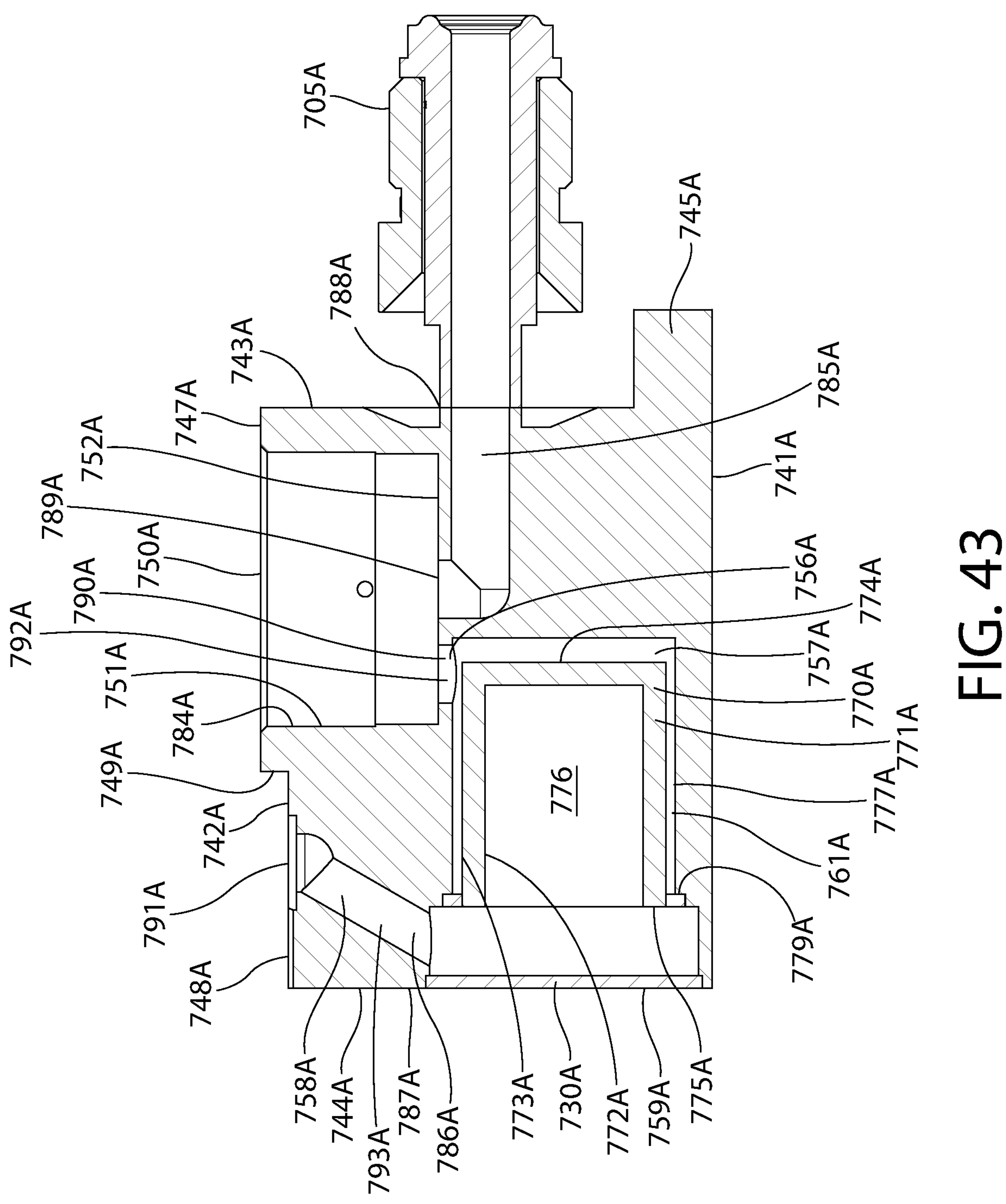
FIG. 43 is a cross-sectional view of the substrate block of FIG. 42 taken along the line XXXXIII-XXXXIII.

FIGS. 42 and 43 illustrate another alternate embodiment of a first substrate block 780A. The first substrate block 780A comprises the inlet fitting 705A. The inlet fitting 705A is identical to the inlet fitting 105A, which is formed of two separate components as discussed above. The first substrate block 780A also comprises a monolithic body 787A and a filter media 770A.

Turning to the monolithic body 787A, the monolithic body has a bottom surface 741A, a top surface 742A, a first sidewall surface 743A, and a second sidewall surface 744A. The first inlet opening 788A is formed into the first sidewall surface 743A. A flange portion 745A extends horizontally from a bottom of the first sidewall surface 743A. A plurality of fasteners extend through the flange portion 745A to join the first substrate block 780A to the support structure 1402A. The fasteners secure the bottom surface 741A of the monolithic body 787A to the top surface 1403A of the support structure 1402A and extend through fastener passageways 746A formed in the flange portion 745A. Fasteners such as the fasteners 102A discussed above may be utilized. The fasteners 102A may be threaded or may be any other type of fastener suitable for attaching the first substrate block 780A to the support structure 1402A.

The top surface 742A comprises a first section 747A, and a second section 748A. A component receiving port 784A is formed into the first section 747A while a second outlet opening 791A is formed into the second section 748A. The first section 747A is vertically offset from the second section 748A. The first section 747A is higher than the second section 748A. An upstanding wall 749A is located between the first and second sections 747A, 748A of the top surface 742A. The first and second sections 747A, 748A are substantially parallel.

The component receiving port 784A comprises a basin 750A, the basin having a basin floor 752A and a collar portion 751A extending from the basin floor 752A to the first section 747A of the top surface 742A. A first outlet opening 789A and a second inlet opening 790A are formed into the basin floor 752A of the component receiving port 784A. The collar portion 751A forms at least a portion of the component receiving port 784A as noted above, the collar portion 751A being located between the basin floor 752A and the first section 747A of the top surface 742A. A first fluid pathway 786A is formed between the first outlet opening 789A and the first inlet opening 788A.

A second fluid pathway 786A comprises a pre-filter section 792A and a post-filter section 793A similar to the embodiments discussed above. The second fluid pathway 786A comprises a pre-filter passage 756A, a filter chamber 757A, and a post-filter passage 758A. The pre-filter passage 756A extends from the second inlet opening 790A to the filter chamber 757A. The post-filter passage 758A extends from the filter chamber 757A to the second outlet opening 791A. The filter media 770A is positioned within the filter chamber 757A.

The filter chamber 757A is bounded by a pocket formed into the second sidewall surface 744A of the monolithic body 787A and an end cap 730A. The filter media 770A is positioned within the filter chamber 757A. The filter media 770A comprises a cup-shaped filter body 771A, the filter body 771A having an inner surface 772A, an outer surface 773A, a closed bottom end 774A, and a second edge 775A. An annular flange 778A is formed at the second edge 775A, the annular flange 778A forming a flange which extends beyond the filter body 771A. The annular flange 778A engages a recess 775A formed into the filter chamber 757A.

The inner surface 772A of the tubular body defines a central filter cavity 776A. A pre-filter annulus 777A is formed between the outer surface 773A and an inner surface 761A of the filter chamber 757A. Thus, the central filter cavity 776A forms a portion of the post-filter section 793A while the pre-filter annulus 777A forms a portion of the pre-filter section 792A. The filter media 770A divides the pre-filter section 792A and the post-filter section 793A.

The filter media 770A is supported within the filter chamber 757A so that the pre-filter annulus 777A is maintained. The pre-filter annulus 777A is spaced and isolated from the inner surface 761A so that fluid can pass through the pre-filter annulus 777A, the filter media 770A, and then the post-filter passage 758A. The post-filter passage 758A is in fluid communication with the central filter cavity 776A while the pre-filter annulus 777A is in fluid communication with the pre-filter passage 756A.

The filter media 770A may be porous, woven, or otherwise have open passages which allow fluid flow therethrough. The annular flange 778A is preferably formed of the same material as the rest of the filter media 770A. In other words, the filter media 770A is an integrally formed, monolithic, component. The annular flange 772A may be pressed or welded into the recess 779A formed into the filter chamber 757A. This allows the filter media 770A to seal against the monolithic body 787A without the need for additional seals to ensure that all fluid flows through the filter media 770A. The end cap 730A forms an end wall 759A of the filter chamber 757A. The end cap 730A is secured to the monolithic body 787A by welding, gluing, brazing, a threaded or press-fit connection, or any other known means suitable to provide a fluid-tight seal. The end cap 730A encloses the filter chamber 757A so that it is isolated from the ambient environment. Thus, no additional seals are required in order to couple the filter media 770A and the end cap 730A to the monolithic body 787A and ensure that no fluid bypasses the filter media 770A or escapes from the monolithic body 787A proximate the end cap 730A.

Figure 44:
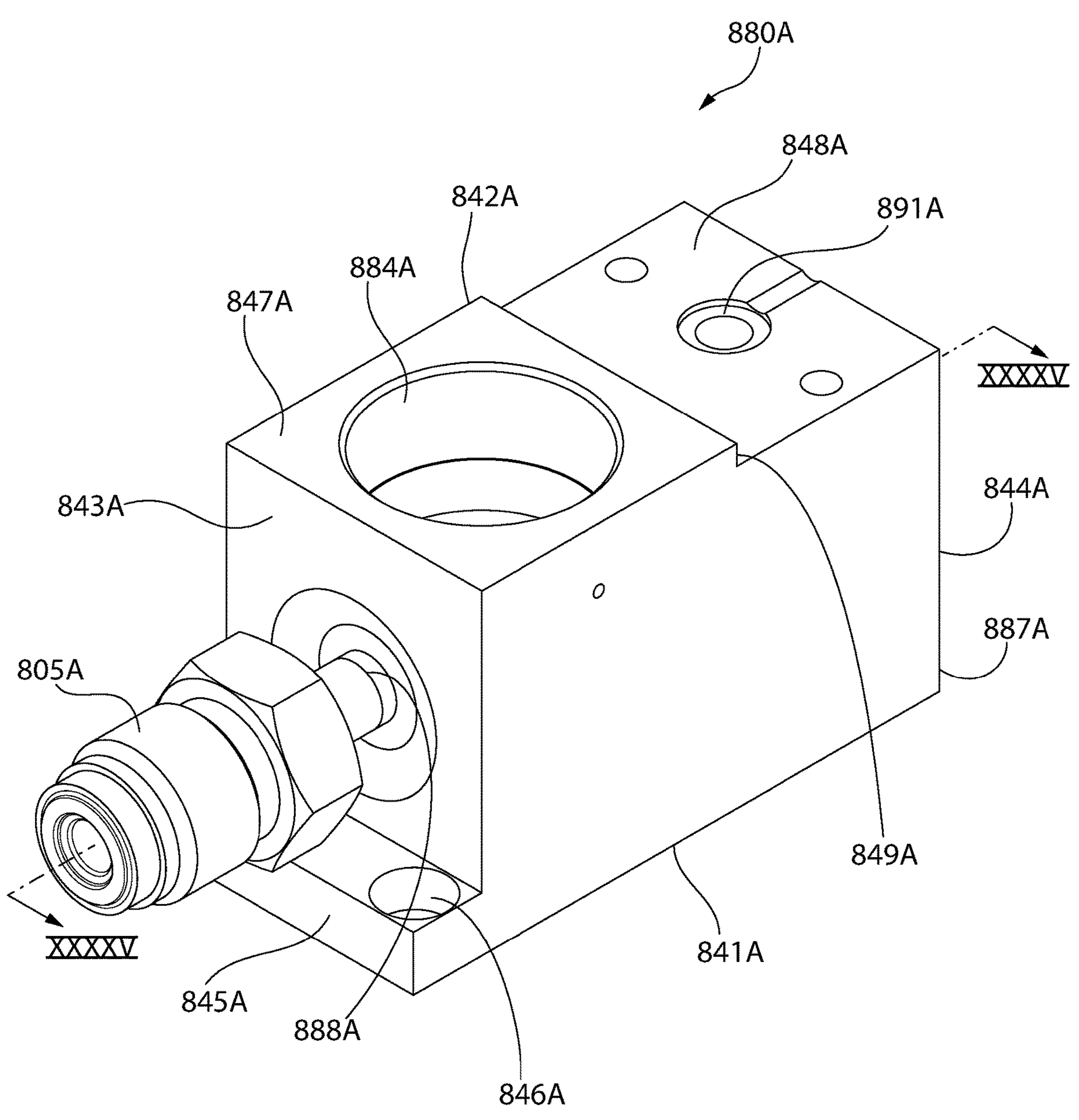
FIG. 44 is a perspective view of another embodiment of a substrate block as may be utilized in an active fluid flow component.
Figure 45:
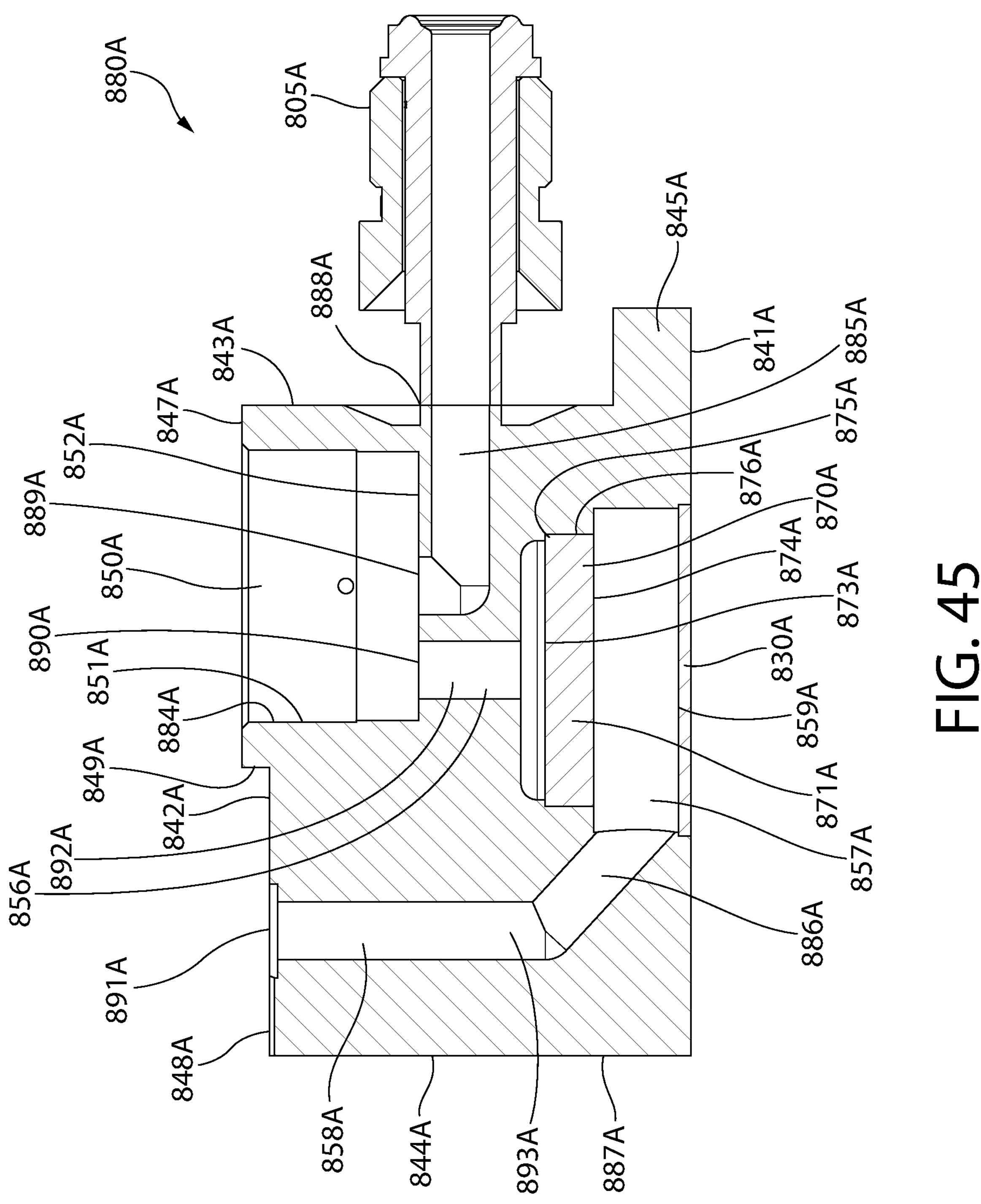
FIG. 45 is a cross-sectional view of the substrate block of FIG. 44 taken along the line XXXXV-XXXXV.

FIGS. 44 and 45 illustrate another alternate embodiment of a first substrate block 880A. The first substrate block 880A comprises the inlet fitting 805A. The inlet fitting 805A is identical to the inlet fitting 105A, which is formed of two separate components as discussed above. The first substrate block 880A also comprises a monolithic body 887A and a filter media 870A.

Turning to the monolithic body 887A, the monolithic body has a bottom surface 841A, a top surface 842A, a first sidewall surface 843A, and a second sidewall surface 844A. The first inlet opening 888A is formed into the first sidewall surface 843A. A flange portion 845A extends horizontally from a bottom of the first sidewall surface 843A. A plurality of fasteners extend through the flange portion 845A to join the first substrate block 880A to the support structure 1402A. The fasteners secure the bottom surface 841A of the monolithic body 887A to the top surface 1403A of the support structure 1402A and extend through fastener passageways 846A formed in the flange portion 845A. Fasteners such as the fasteners 102A discussed above may be utilized. The fasteners 102A may be threaded or may be any other type of fastener suitable for attaching the first substrate block 880A to the support structure 1402A.

The top surface 842A comprises a first section 847A, and a second section 848A. A component receiving port 884A is formed into the first section 847A while a second outlet opening 891A is formed into the second section 848A. The first section 847A is vertically offset from the second section 848A. The first section 847A is higher than the second section 848A. An upstanding wall 849A is located between the first and second sections 847A, 848A of the top surface 842A. The first and second sections 847A, 848A are substantially parallel.

The component receiving port 884A comprises a basin 850A, the basin having a basin floor 852A and a collar portion 851A extending from the basin floor 852A to the first section 847A of the top surface 842A. A first outlet opening 889A and a second inlet opening 890A are formed into the basin floor 852A of the component receiving port 884A. The collar portion 851A forms at least a portion of the component receiving port 884A as noted above, the collar portion 851A being located between the basin floor 852A and the first section 847A of the top surface 842A. A first fluid pathway 886A is formed between the first outlet opening 889A and the first inlet opening 888A.

A second fluid pathway 886A comprises a pre-filter section 892A and a post-filter section 893A similar to the embodiments discussed above. The second fluid pathway 886A comprises a pre-filter passage 856A, a filter chamber 857A, and a post-filter passage 858A. The pre-filter passage 856A extends from the second inlet opening 890A to the filter chamber 857A. The post-filter passage 858A extends from the filter chamber 857A to the second outlet opening 891A. The filter media 870A is positioned within the filter chamber 857A.

The filter chamber 857A is bounded by a pocket formed into the bottom surface 841A of the monolithic body 887A and an end cap 830A. The filter media 870A is positioned within the filter chamber 857A. The filter media 870A comprises a generally disc-shaped filter body 871A. Unlike previous embodiments, there is no annular flange extending from the filter body 871A. The filter body 871A extends from a top surface 873A to a bottom surface 874A, fluid flowing through the filter media 870A from the top surface 873A to the bottom surface 874A. Thus, the top surface 873A of the filter media defines a boundary of the pre-filter section 892A while the bottom surface 874A defines a boundary of the post-filter section 893A. The filter media 870A divides the pre-filter section 892A and the post-filter section 893A. The filter body 871A of the filter media 870A has a generally cylindrical profile. There are no radii transitioning between an outer diameter 876A and the top and bottom surfaces 873A, 874A. Instead, the outer diameter 876A forms sharp edges with the top and bottom surfaces 873A, 874A.

The filter media 870A may be porous, woven, or otherwise have open passages which allow fluid flow therethrough. The filter media 870A is an integrally formed, monolithic, component. The filter body 871A may be pressed or welded into a recess 875A formed into the filter chamber 857A. This allows the filter media 870A to seal against the monolithic body 887A without the need for additional seals to ensure that all fluid flows through the filter media 870A. The end cap 830A forms a bottom wall 859A of the filter chamber 857A. The end cap 830A is secured to the monolithic body 887A by welding, gluing, brazing, a threaded or press-fit connection, or any other known means suitable to provide a fluid-tight seal. The end cap 830A encloses the filter chamber 857A so that it is isolated from the ambient environment. Thus, no additional seals are required in order to couple the filter media 870A and the end cap 830A to the monolithic body 887A and ensure that no fluid bypasses the filter media 870A or escapes from the monolithic body 887A proximate the end cap 830A.

In yet other configurations, the first substrate blocks discussed above may incorporate other known filter arrangements, and they need not be installed via the second sidewall surface or the bottom surface of the monolithic body. Instead, the filter chamber may be formed into one of the lateral surfaces of the first substrate blocks as desired. In yet other embodiments, the filter chamber may be formed into more than one surface. The exact arrangement of the filter media and the filter chamber may vary depending on application requirements.

While the invention has been described with respect to specific examples including presently preferred modes of carrying out the invention, those skilled in the art will appreciate that there are numerous variations and permutations of the above described systems and techniques. It is to be understood that other embodiments may be utilized, and structural and functional modifications may be made without departing from the scope of the present invention. Thus, the spirit and scope of the invention should be construed broadly as set forth in the appended claims.

What is claimed is:

1. An apparatus for controlling flow of a process fluid, the apparatus comprising:
- an inlet;
- an outlet;
- a bleed port;
- a flow path extending from the inlet to the outlet;
- a bleed path extending from the flow path, the bleed path comprising the bleed port;
- a first valve operably coupled to the flow path and located between the inlet and the outlet, the first valve configured to control flow of the process fluid in the flow path;
- a flow restrictor having a flow impedance, the flow restrictor operably coupled to the flow path and located between the inlet and the outlet;
- a second valve operably coupled to the flow path and located between the inlet and the outlet, the second valve configured to control flow of the process fluid from the flow path to the bleed port, wherein the second valve comprises:
  - a valve seat; and
  - a closure element configured to sealingly engage the valve seat, wherein the valve seat is positioned in the bleed path and not the flow path; and
- a mounting portion, the mounting portion comprising the outlet and the bleed port.

2. The apparatus of claim 1, wherein the mounting portion comprises a sealing surface and a plurality of mounting holes.

3. The apparatus of claim 1, wherein the mounting portion comprises a planar surface.

4. The apparatus of claim 1, wherein the mounting portion comprises:
- a first portion, wherein the inlet is defined in the first portion; and
- a second portion, wherein the outlet and the bleed port are defined in the second portion, and wherein the first portion and the second portion are separated by a gap.

5. The apparatus of claim 1, wherein the flow path comprises:
- a first angled segment extending intermediate the inlet and the first valve; and
- a second angled segment extending intermediate the first valve and the second valve.

6. The apparatus of claim 5, wherein the flow path comprises a third angled segment extending intermediate the second valve and the outlet.

7. An apparatus for controlling flow of a process fluid, the apparatus comprising:
- an inlet;
- an outlet;
- a flow path extending from the inlet to the outlet;
- a bleed path extending from the flow path to a bleed port;
- a first valve configured to control flow of the process fluid in the flow path;
- a flow restrictor having a flow impedance, the flow restrictor being positioned in the flow path between the inlet and the outlet;
- a second valve configured to control flow of the process fluid from the flow path to the bleed port, wherein the second valve comprises:
  - a valve seat; and
  - a closure element configured to sealingly engage the valve seat, wherein the valve seat is positioned in the bleed path and is offset from the flow path; and
- a mounting portion comprising the outlet and the bleed port.

* * * * *